(12) United States Patent
Chatterjee et al.

(10) Patent No.: US 8,688,037 B2
(45) Date of Patent: Apr. 1, 2014

(54) MAGNETIC LATCHING MECHANISM FOR USE IN MATING A MOBILE COMPUTING DEVICE TO AN ACCESSORY DEVICE

(75) Inventors: Manjirnath Chatterjee, San Francisco, CA (US); Eric Liu, Santa Clara, CA (US); Mark Corbridge, Weymouth (GB); Mukul Kumar, San Diego, CA (US); Wim Crooijmans, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1233 days.

(21) Appl. No.: 12/478,763

(22) Filed: Jun. 4, 2009

(65) Prior Publication Data

US 2010/0081377 A1 Apr. 1, 2010

Related U.S. Application Data

(63) Continuation-in-part of application No. 12/239,656, filed on Sep. 26, 2008.

(60) Provisional application No. 61/142,602, filed on Jan. 5, 2009.

(51) Int. Cl.
 *H04B 5/00* (2006.01)
(52) U.S. Cl.
 USPC .................. 455/41.1; 359/214.1; 320/107
(58) Field of Classification Search
 USPC ........................................... 455/41.1
 See application file for complete search history.

(56) References Cited

U.S. PATENT DOCUMENTS

| | | | |
|---|---|---|---|
| 5,136,414 A * | 8/1992 | Jenkins ...................... 359/214.1 |
| 5,375,226 A | 12/1994 | Sano et al. |
| 5,455,466 A | 10/1995 | Parks et al. |
| 5,596,567 A | 1/1997 | de Muro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,958,051 A | 9/1999 | Renaud et al. |
| 6,006,274 A | 12/1999 | Hawkins et al. |
| 6,091,965 A | 7/2000 | Voroba et al. |
| 6,138,245 A | 10/2000 | Son et al. |
| 6,184,651 B1 | 2/2001 | Fernandez et al. |

(Continued)

FOREIGN PATENT DOCUMENTS

| | | |
|---|---|---|
| CN | 1204929 A | 1/1999 |
| CN | 1592197 A | 3/2005 |

(Continued)

OTHER PUBLICATIONS

U.S. Appl. No. 12/916,388, filed Oct. 29, 2010, Chatterjee et al.

(Continued)

*Primary Examiner* — Ajibola Akinyemi

(57) ABSTRACT

A mobile computing device and an accessory device are individually equipped with features and components that enable magnetic coupling of the two devices. Specific embodiments provide for the use of one or more horseshoe magnets for use in the magnetic coupling mechanisms. As an addition or alternative, electromagnetic coupling may be used to selectively maintain and/or orient the two devices in a mated position.

24 Claims, 25 Drawing Sheets

(56) References Cited

U.S. PATENT DOCUMENTS

| | | | |
|---|---|---|---|
| 6,266,539 | B1 | 7/2001 | Pardo |
| 6,330,436 | B1 | 12/2001 | Zidel |
| 6,389,423 | B1 | 5/2002 | Sakakura |
| 6,405,049 | B2 | 6/2002 | Herrod et al. |
| 6,436,299 | B1 | 8/2002 | Baarman et al. |
| 6,445,936 | B1 | 9/2002 | Cannon et al. |
| 6,452,197 | B1 * | 9/2002 | Ito .................. 250/492.21 |
| 6,501,364 | B1 | 12/2002 | Hui et al. |
| 6,510,424 | B1 | 1/2003 | Ford et al. |
| 6,532,152 | B1 | 3/2003 | White et al. |
| 6,671,700 | B1 | 12/2003 | Creemer et al. |
| 6,673,250 | B2 | 1/2004 | Kuennen et al. |
| 6,731,071 | B2 | 5/2004 | Baarman |
| 6,795,110 | B1 | 9/2004 | Kossin |
| 6,803,744 | B1 | 10/2004 | Sabo |
| 6,806,649 | B2 | 10/2004 | Mollema et al. |
| 6,810,405 | B1 | 10/2004 | LaRue et al. |
| 6,812,645 | B2 | 11/2004 | Baarman |
| 6,825,620 | B2 | 11/2004 | Kuennen et al. |
| 6,831,417 | B2 | 12/2004 | Baarman |
| 6,850,986 | B1 | 2/2005 | Peacock |
| 6,888,438 | B2 | 5/2005 | Hui et al. |
| 6,892,052 | B2 | 5/2005 | Kotola et al. |
| 6,917,163 | B2 | 7/2005 | Baarman |
| 6,975,198 | B2 | 12/2005 | Baarman et al. |
| 6,986,051 | B2 | 1/2006 | Le Pennec et al. |
| 7,065,658 | B1 | 6/2006 | Baraban et al. |
| 7,116,200 | B2 | 10/2006 | Baarman et al. |
| 7,118,240 | B2 | 10/2006 | Baarman et al. |
| 7,126,450 | B2 | 10/2006 | Baarman et al. |
| 7,132,918 | B2 | 11/2006 | Baarman et al. |
| 7,149,473 | B1 | 12/2006 | Lindlar et al. |
| 7,164,255 | B2 | 1/2007 | Hui |
| 7,202,783 | B2 | 4/2007 | Want et al. |
| 7,236,742 | B2 | 6/2007 | Hall et al. |
| 7,248,017 | B2 | 7/2007 | Cheng et al. |
| 7,262,700 | B2 | 8/2007 | Hsu |
| 7,271,569 | B2 | 9/2007 | Oglesbee |
| 7,286,880 | B2 | 10/2007 | Olson et al. |
| 7,313,364 | B2 | 12/2007 | Morimoto |
| 7,331,793 | B2 | 2/2008 | Hernandez et al. |
| 7,352,567 | B2 | 4/2008 | Hotelling et al. |
| 7,375,492 | B2 | 5/2008 | Calhoon et al. |
| 7,382,636 | B2 | 6/2008 | Baarman et al. |
| 7,385,357 | B2 | 6/2008 | Kuennen et al. |
| 7,392,059 | B2 | 6/2008 | White et al. |
| 7,414,380 | B2 | 8/2008 | Tang et al. |
| 7,446,672 | B2 | 11/2008 | Johnson et al. |
| 7,454,170 | B2 | 11/2008 | Goossens et al. |
| 7,462,951 | B1 | 12/2008 | Baarman |
| 7,471,200 | B2 | 12/2008 | Otranen |
| 7,471,986 | B2 | 12/2008 | Hatlestad |
| 7,495,414 | B2 | 2/2009 | Hui |
| 7,509,432 | B1 | 3/2009 | Peacock |
| 7,521,890 | B2 | 4/2009 | Lee et al. |
| 7,565,108 | B2 | 7/2009 | Kotola et al. |
| 7,576,514 | B2 | 8/2009 | Hui |
| 7,576,657 | B2 | 8/2009 | Duron et al. |
| 7,589,285 | B2 | 9/2009 | Matsumoto et al. |
| 7,743,151 | B2 | 6/2010 | Vallapureddy et al. |
| 7,751,810 | B1 | 7/2010 | Bernoske et al. |
| 7,791,311 | B2 | 9/2010 | Sagoo |
| 7,800,044 | B1 | 9/2010 | Kahn et al. |
| 7,855,529 | B2 | 12/2010 | Liu |
| D640,976 | S | 7/2011 | Matsuoka |
| 8,026,693 | B2 | 9/2011 | Burley |
| 8,026,694 | B2 | 9/2011 | Kamijo et al. |
| 2002/0065045 | A1 | 5/2002 | Kim |
| 2002/0084698 | A1 | 7/2002 | Kelly et al. |
| 2002/0103008 | A1 | 8/2002 | Rahn et al. |
| 2003/0092389 | A1 | 5/2003 | Morimoto |
| 2003/0214255 | A1 | 11/2003 | Baarman et al. |
| 2003/0233455 | A1 | 12/2003 | Leber et al. |
| 2004/0088012 | A1 | 5/2004 | Kroll et al. |
| 2004/0130915 | A1 | 7/2004 | Baarman |
| 2004/0130916 | A1 | 7/2004 | Baarman |
| 2004/0150934 | A1 | 8/2004 | Baarman |
| 2004/0222751 | A1 | 11/2004 | Mollema et al. |
| 2004/0232845 | A1 | 11/2004 | Baarman et al. |
| 2004/0259499 | A1 | 12/2004 | Oba et al. |
| 2005/0007067 | A1 | 1/2005 | Baarman et al. |
| 2005/0030160 | A1 | 2/2005 | Goren et al. |
| 2005/0093475 | A1 | 5/2005 | Kuennen et al. |
| 2005/0116650 | A1 | 6/2005 | Baarman |
| 2005/0122058 | A1 | 6/2005 | Baarman et al. |
| 2005/0122059 | A1 | 6/2005 | Baarman et al. |
| 2005/0127849 | A1 | 6/2005 | Baarman et al. |
| 2005/0127850 | A1 | 6/2005 | Baarman et al. |
| 2005/0186903 | A1 | 8/2005 | Forbes et al. |
| 2006/0041420 | A1 | 2/2006 | Martin et al. |
| 2006/0061958 | A1 | 3/2006 | Solomon et al. |
| 2006/0094405 | A1 | 5/2006 | Dupont |
| 2006/0123055 | A1 | 6/2006 | Atkinson et al. |
| 2006/0132045 | A1 | 6/2006 | Baarman |
| 2006/0145660 | A1 | 7/2006 | Black et al. |
| 2006/0183462 | A1 | 8/2006 | Kolehmainen |
| 2006/0229027 | A1 | 10/2006 | Wang et al. |
| 2006/0258289 | A1 | 11/2006 | Dua |
| 2007/0024238 | A1 | 2/2007 | Nakade et al. |
| 2007/0035917 | A1 | 2/2007 | Hotelling et al. |
| 2007/0064406 | A1 | 3/2007 | Beart |
| 2007/0077965 | A1 | 4/2007 | Fox |
| 2007/0120752 | A1 | 5/2007 | Takasu |
| 2007/0182367 | A1 | 8/2007 | Partovi |
| 2007/0188284 | A1 | 8/2007 | Dobbs |
| 2007/0246546 | A1 | 10/2007 | Yoshida |
| 2007/0255435 | A1 | 11/2007 | Cohen et al. |
| 2007/0290654 | A1 | 12/2007 | Govari et al. |
| 2008/0133918 | A1 | 6/2008 | You et al. |
| 2008/0196086 | A1 | 8/2008 | Shintani et al. |
| 2008/0231537 | A1 | 9/2008 | Rofougaran et al. |
| 2008/0269927 | A1 | 10/2008 | Szolyga et al. |
| 2008/0278894 | A1 | 11/2008 | Chen et al. |
| 2009/0001932 | A1 | 1/2009 | Kamijo et al. |
| 2009/0001941 | A1 | 1/2009 | Hsu et al. |
| 2009/0008148 | A1 | 1/2009 | Mashino |
| 2009/0069869 | A1 | 3/2009 | Stouffer et al. |
| 2009/0088077 | A1 | 4/2009 | Brown et al. |
| 2009/0096413 | A1 | 4/2009 | Partovi et al. |
| 2009/0106567 | A1 | 4/2009 | Baarman |
| 2009/0170433 | A1 | 7/2009 | Rhodes et al. |
| 2009/0193500 | A1 | 7/2009 | Griffin et al. |
| 2009/0199219 | A1 | 8/2009 | Rofougaran et al. |
| 2009/0203399 | A1 | 8/2009 | Rofougaran |
| 2009/0212637 | A1 | 8/2009 | Baarman et al. |
| 2009/0212737 | A1 | 8/2009 | Johnson et al. |
| 2009/0233623 | A1 | 9/2009 | Johnson |
| 2009/0322278 | A1* | 12/2009 | Franks et al. .................. 320/107 |
| 2010/0007449 | A1 | 1/2010 | Tait et al. |
| 2010/0021176 | A1 | 1/2010 | Holcombe et al. |
| 2010/0023204 | A1 | 1/2010 | Basir et al. |
| 2010/0045269 | A1 | 2/2010 | LaFranchise et al. |
| 2010/0070219 | A1 | 3/2010 | Azancot et al. |
| 2010/0076524 | A1 | 3/2010 | Forsberg et al. |
| 2010/0081473 | A1 | 4/2010 | Chatterjee et al. |
| 2010/0081483 | A1 | 4/2010 | Chatterjee et al. |
| 2010/0083012 | A1 | 4/2010 | Corbridge et al. |
| 2010/0093279 | A1 | 4/2010 | Linsky et al. |
| 2010/0121965 | A1 | 5/2010 | Chatterjee |
| 2010/0131691 | A1 | 5/2010 | Chatterjee et al. |
| 2010/0146308 | A1 | 6/2010 | Gioscia et al. |
| 2010/0156193 | A1 | 6/2010 | Rhodes et al. |
| 2010/0172090 | A1 | 7/2010 | Chatterjee |
| 2010/0174801 | A1 | 7/2010 | Tabaaloute |
| 2010/0177476 | A1 | 7/2010 | Hotelling et al. |
| 2010/0194336 | A1 | 8/2010 | Azancot et al. |
| 2010/0198453 | A1 | 8/2010 | Dorogusker et al. |
| 2010/0211785 | A1 | 8/2010 | Park et al. |
| 2010/0250986 | A1 | 9/2010 | Black et al. |
| 2010/0283599 | A1 | 11/2010 | Ma et al. |

(56) References Cited

U.S. PATENT DOCUMENTS

| | | |
|---|---|---|
| 2011/0076941 A1 | 3/2011 | Taveau et al. |
| 2012/0077432 A1 | 3/2012 | Rose et al. |

FOREIGN PATENT DOCUMENTS

| | | |
|---|---|---|
| EP | 395469 A2 | 10/1990 |
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-2008-0036702 A | 4/2008 |
| KR | 10-0836634 B1 | 6/2008 |
| KR | 10-0863420 B1 | 10/2008 |
| KR | 10-2010-0136255 A | 12/2010 |
| WO | WO 95/03686 A1 | 2/1995 |
| WO | WO-02/093811 A2 | 11/2002 |
| WO | WO 2004/098079 A1 | 11/2004 |
| WO | WO 2005/024865 A2 | 3/2005 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO-2010/077994 A2 | 7/2010 |
| WO | WO 2010/091269 A1 | 8/2010 |

OTHER PUBLICATIONS

U.S. Appl. No. 12/975,335, filed Dec. 21, 2010, Oh et al.
U.S. Appl. No. 12/987,940, filed Jan. 10, 2011, Chatterjee et al.
Non-Final Office Action mailed Nov. 3, 2010 in U.S. Appl. No. 12/478,616 12 pgs.
U.S. Appl. No. 11/430,786, filed May 8, 2006, Baraban et al.
U.S. Appl. No. 12/628,401, filed Dec. 1, 2009, Chatterjee.
U.S. Appl. No. 12/840,241, filed Jul. 20, 2010, Chatterjee.
U.S. Appl. No. 12/841,001, filed Jul. 21, 2010, Chatterjee.
U.S. Appl. No. 29/323,688, filed Aug. 28, 2008, Matsuoka.
Final Office Action mailed Jan. 8, 2009 in U.S. Appl. No. 11/430,786.
Final Office Action mailed Oct. 25, 2004 in U.S. Appl. No. 09/861,658 10 pgs.
Final Office Action mailed Jul. 9, 2007 in U.S. Appl. No. 11/430,786.
Final Office Action mailed Jul. 19, 2010 in U.S. Appl. No. 11/430,786.
Final Office Action mailed Dec. 30, 2009 in U.S. Appl. No. 11/430,786.
Hui et al., "A New Generation of Universal Contactless Battery Charging Platform for Portable Consumer Electronic Equipment," IEEE Trans Power Electronics, 20(3):620-627 (2005).
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Writen Opinion dated Aug. 31, 2010 in International Application No. PCT/US2010/020054.
International Search Report and Written Opinion dated Apr. 20, 2010 in International Application No. PCT/US2009/055928.
Kean, Steven, "Powermat Portable Wireless Charging Mat", pp. 1-12 dwnloaded from http://www.bigbruin.com/content/powermat_1 on Sep. 29, 2010.
Liang et al., "An implantable bi-directional wireless transmission system for transcutaneous biological signal recording," Physiol. Meas. 26:83-97 (2005).
Mel, B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.
Non-Final Office Action mailed Mar. 24, 2010 in U.S. Appl. No. 11/430,786.
Non-Final Office Action mailed Jul. 25, 2008 in U.S. Appl. No. 11/430,786.
Non-Final Office Action mailed Sep. 30, 2010 in U.S. Appl. No. 11/430,786 7 pgs.
Non-Final Office Action mailed Jan. 25, 2008 in U.S. Appl. No. 11/430,786.
Non-Final Office Action mailed Oct. 5, 2006 in U.S. Appl. No. 11/430,786.
Non-Final Office Action mailed Apr. 22, 2004 in U.S. Appl. No. 09/861,658 7 pgs.
Non-Final Office Action mailed Apr. 7, 2005 in U.S. Appl. No. 09/861,658 11 pgs.
Non-Final Office Action mailed Jun. 11, 2009 in U.S. Appl. No. 11/430,786.
Notice of Allowance mailed Jan. 9, 2006 in U.S. Appl. No. 09/861,658 12 pgs.
Opticon Users manual DWT 7133, Nov. 2000.
U.S. Appl. No. 29/323,686, filed Aug. 28, 2008, Matsuoka et al.
AdvancedCardSystems, "ACR122U NFC Contactless Smart Card Reader—URL Transfer," available at URL < http://www.youtube.com/watch?v=USImfpCZaTo >, uploaded Oct. 12, 2010.
Extended European Search Report, European Application No. 11186983.0, Apr. 24, 2012, pp. 1-15.
International Search Report and Written Opinion, International Application No. PCT/US2011/058449, Date of Mailing: May 16, 2012, pp. 1-11.
International Search Report and Written Opinion, International Application No. PCT/US2012/024202, Date of Completion: Apr. 26, 2012, Date of Mailing: Apr. 27, 2012, pp. 1-9.
Search Report/Official Communication, CN Application No. 200980157817.7, Date Issued: Jun. 5, 2013, Date Received: Oct. 22, 2013, pp. 1-16 (including English Translation).

* cited by examiner

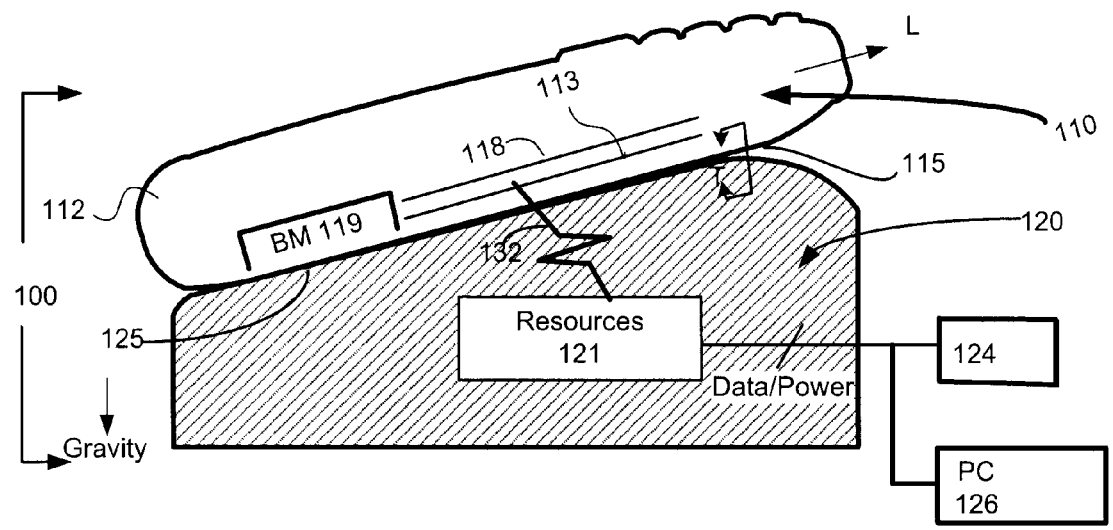
FIG. 1
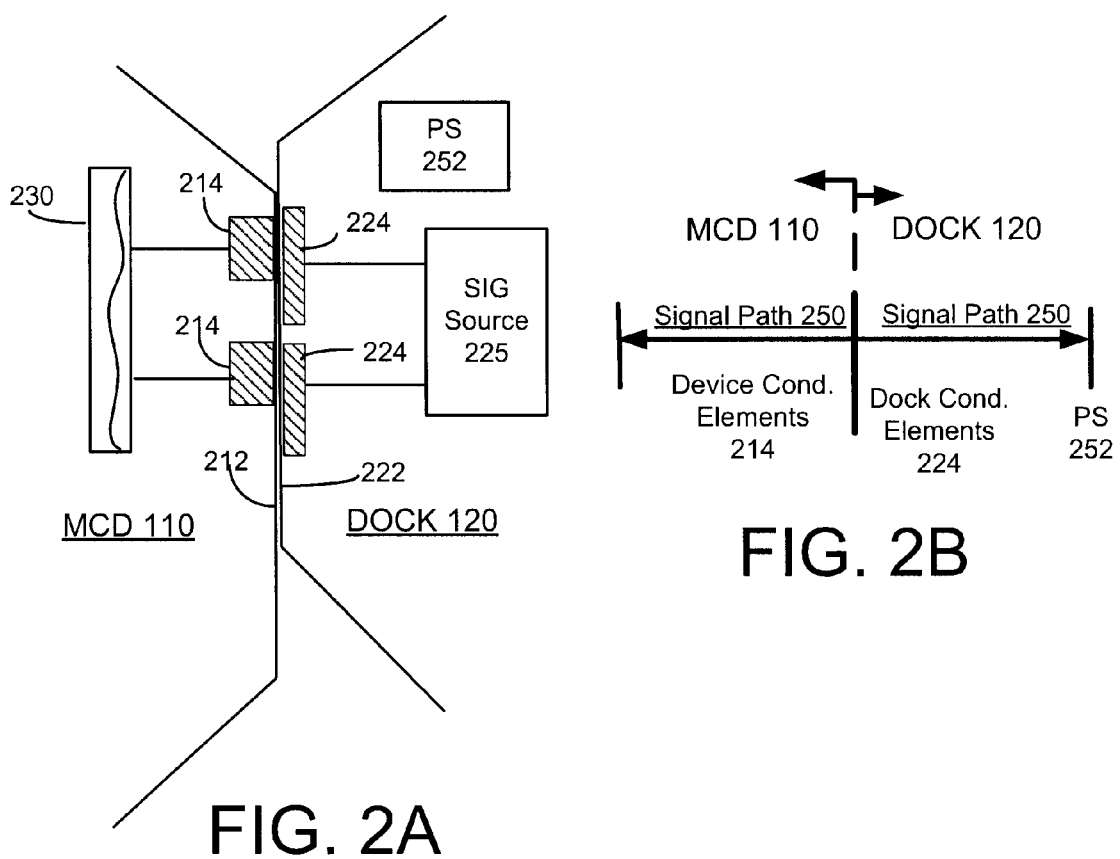
FIG. 2A
FIG. 2B

MAGNETIC LATCHING MECHANISM FOR USE IN MATING A MOBILE COMPUTING DEVICE TO AN ACCESSORY DEVICE

RELATED APPLICATIONS

This application is a continuation-in-part of U.S. patent application Ser. No. 12/239,656, filed Sep. 26, 2008, entitled ORIENTATION AND PRESENCE DETECTION FOR USE IN CONFIGURING OPERATIONS OF COMPUTING DEVICES IN DOCKED ENVIRONMENTS; the aforementioned application being hereby incorporated by reference in its entirety.

This application claims benefit of priority to Provisional U.S. Patent Application No. 61/142,602, filed Jan. 5, 2009, entitled MAGNETIC CLASP WITH MULTIPLE ORIENTATIONS AND ORIENTATION DETECTION, which is hereby incorporated by reference in its entirety.

TECHNICAL FIELD

The disclosed embodiments relate to mobile computing devices. In particular, the disclosed embodiments relate to orientation and presence detection for use in configuring operations of computing devices in docked environments.

BACKGROUND

The use of docking stations and other accessory devices in connection with mobile computing devices (e.g. smart phones, media players etc.) is well known. Traditionally, docking stations are used to (i) recharge or supply power to the mobile computing device, (ii) enable the computing device to communicate with other devices connected to the docking station (e.g. synchronization with a personal computer), or (iii) use additional resources provided with the docking station (e.g. speakers for audio output).

In a traditional scheme, docking stations and mobile computing devices connect using insertive male/female connectors. Numerous factors come into consideration when mobile devices are designed with connectors for use with docking stations. For example, such connectors typically take into account the ease by which users may establish the connection (e.g. can the user simply drop the device into the cradle), as well as the mechanical reliability of the connectors. When users repeatedly mate devices with docking stations, both the mating action and the removal of the device from the docking station can strain the connector structure and its elements.

Connectors also restrain the amount by which a device's form factor can be reduced in thickness and/or other dimensions. Connector schemes (particularly those that abide by an industry standard) have constraints that dictate the physical dimensions of the male and female ends of the connectors. As devices get smaller, accommodating the size constraints of the connectors has become more challenging.

BRIEF DESCRIPTION OF THE DRAWINGS

FIG. 1 is a representative illustration of two computing devices that can be positioned to enable one device to provide power and/or data to the other device, according to an embodiment.

FIG. 2A is a simplified block diagram of a mobile computing device and docking station configured to communicate signals on a continuously conductive signal path, according to an embodiment.

FIG. 2B illustrates a set of one or more continuously conductive signal paths, as extended from or between a docking station and a mobile computing device, under an embodiment.

DETAILED DESCRIPTION

Figures 3A, 3B:
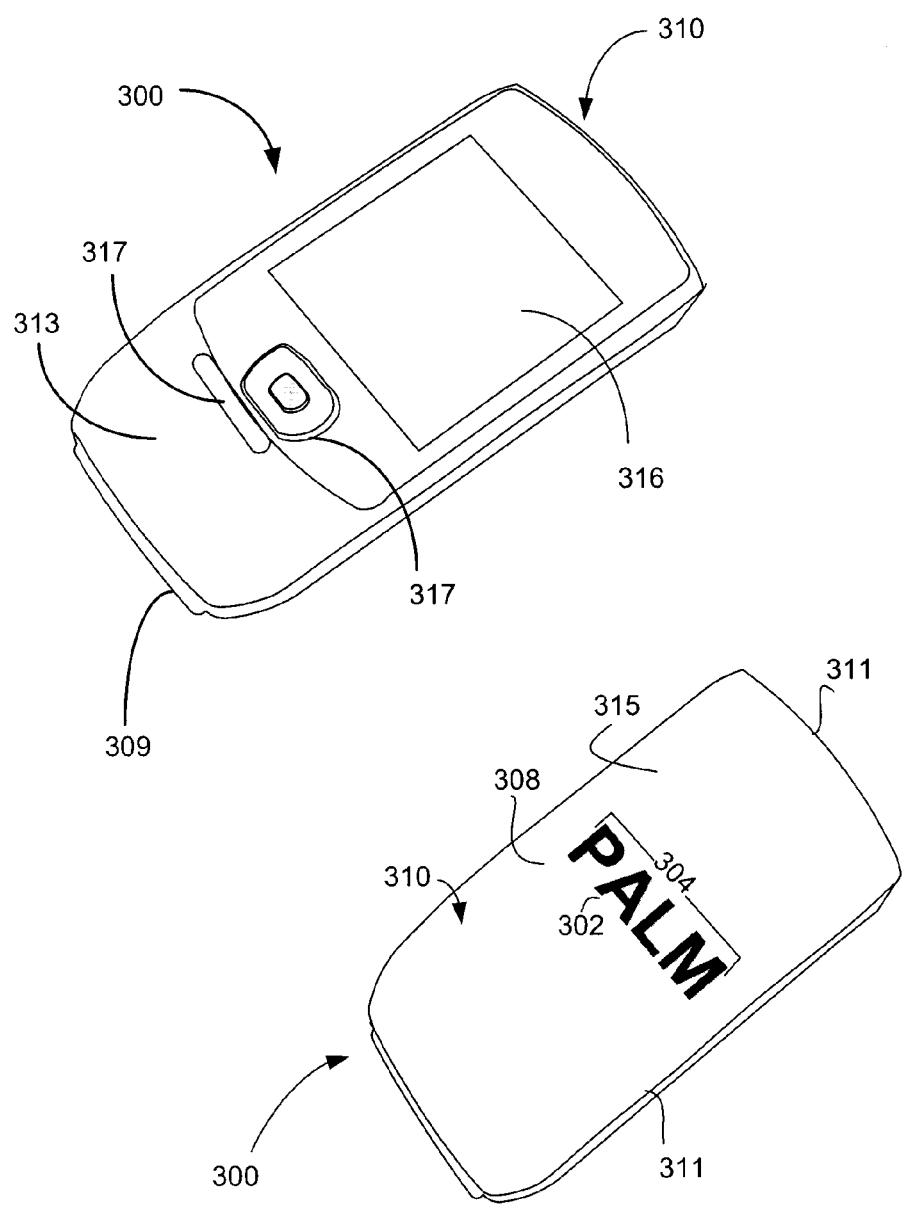
FIG. 3A illustrates a mobile computing device for use with one or more embodiments described herein.
FIG. 3B is an isometric rear view of the mobile computing device of FIG. 3A, according to one or more embodiments.

Embodiments described herein provide a framework by which two or more computing devices (e.g. mobile computing device and/or docking station) are enabled to transfer power and/or data signals without use of exterior connectors (i.e. is 'connector-less'). Specific implementation scenarios include two computing devices being brought into contact or proximity for purpose of at least one device signaling power and/or data to the other device using a 'connector-less' signal exchange. Still further, more than two devices may be connected or placed in contact with one another to receive or provide power signals and/or data.

According to one embodiment, a mobile computing device ('MCD') and docking station ('dock') are individually equipped with features and components that enable charging/power signals to be communicated from the dock to the MCD without use of connectors. As an addition or an alternative, the dock and/or MCD may exchange or transmit data signals to the other device when the MCD is retained against the dock (i.e. 'docked').

Among numerous embodiments, an embodiment provides for a mobile computing device that includes an inductive element and a signal handling module or component. The signal handling module is configured to inductively receive at least one of a power or data signal from another device using the inductive element.

Still further, another embodiment includes a mobile computing device may include a housing shell that defines at least a portion of an exterior of device. One or more conductive elements may be provided on the exterior without a connector structure on the exterior as part of the shell. The one or more conductive elements may form at least a portion of a conductive path that passes through a thickness of the shell and extends into the recharging circuit. A signal handling resource or module may be provided that receives one or more signals communicated from another device to the mobile computing device using the one or more conductive elements. The one or more signals may carry both power and data.

In another embodiment, a computing system includes a mobile computing device and an accessory device. The mobile computing device is configured to inductively transmit or receive at least one of a power or data signal. The accessory device is configured to inductively communicate with the mobile computing device in order to transmit or receive the at least one power or data signal.

In another embodiment, an accessory device for a mobile computing device may include one or more inductive elements, and a signal handling module that is configured to inductively transmit at least one of a power or data signal to another device using the inductive elements.

According to another embodiment, a mobile computing device (MCD) and a docking station are provided. The docking station is configured to (i) physically retain the MCD, and (ii) communicate one or more signals to the MCD when the MCD is retained. Additionally, the docking station is structured to enable the MCD to occupy any one of a plurality of orientations when the MCD is retained on the docking station. When docked, at least one of the MCD or docking station is structured to identify an orientation of the MCD as retained on the docking station. At least one of the MCD or the docking station is configured to perform one or more operations that are selected, by either the docking station or the MCD, based at least in part on the identified orientation of the MCD.

Still further, according to another embodiment, a computing system comprising a mobile computing device and an accessory device may be magnetically clasped to one another. In an embodiment, at least one of the mobile computing device or accessory device includes a magnetic component to retain the other of the mobile computing device or accessory device in one or more orientations. Numerous embodiments described herein provide for magnet-oriented configurations, and use of magnets to enable multiple orientations of a device in a docked position.

With regard to embodiments described herein, a MCD may correspond to a wireless telephony and/or messaging device, a media player, a camera or video recorder, a microphone, a multi-function device, a personal digital assistant or ultra-MCD (e.g. fully functioning handheld device), a global positioning device or some other kind of device. Wireless telephony/data devices may include cellular devices or even voice-over-Internet Protocol devices (such as those that use Wireless Fidelity "WiFi"). Numerous types of devices and form factors may be included with embodiments described herein.

In a traditional connector scheme, two devices can be mated using corresponding connector structures. Each connector structure normally has a physical structure or layer formed from insulative material that serves to retain and position electrical elements that are conduits for signals. Often, the physical structures include male/female retention features. Connectors may be mated by inserting the male retention features into aligned corresponding features. In contrast to the conventional connector scheme, numerous embodiments described herein enable two devices (e.g. mobile computing device and docking station) to exchange power or data using a "connector-less" scheme. As described, the connector-less scheme may provide conductive or transductive signal paths for carrying power and data. In such embodiments, devices incorporate electrical elements that do not require placement of electrical contacts in a separate physical layer apart from the housing of the device. As such, no insertive connector coupling is required, and the need for precision alignment of male and female elements in the physical structures of connectors is not needed in order to mate the connectors. Rather, the connector-less schemes described with embodiments enables the exchange of power or data amongst coupled devices without need to accommodate separately defined structures for connector elements, physical layers, insertive male/female structures or the like.

One or more embodiments described herein include computing system that includes a mobile computing device and an accessory device. The mobile computing device may be configured to inductively transmit or receive at least one of a power or data signal. The accessory device may be configured to inductively communicate with the mobile computing device in order to transmit or receive the at least one power or data signal.

Still further, an embodiment provides that a mobile computing device comprising includes an inductive element, and a signal handling module that is configured to inductively receive at least one of a power or data signal from another device using the inductive element.

As another variation, an embodiment includes an accessory device for a mobile computing device. The accessory device may include an inductive element, and a signal handling module that is configured to inductively transmit at least one of a power or data signal to another device using the inductive element.

In one embodiment, the signal handling module or resource combines with the inductive element to communicate the power signal and to modulate the power signal to carry data.

Still further, the accessory device may include a first coil to inductively signal at least power to the other device, and a second coil to inductively signal at least data to the other device.

The accessory device may further include a receiving surface to receive the device on its façade. In such an embodiment, the accessory device is configured to signal the power or data signal when the other device is received on the receiving surface.

According to one or more embodiments, the MCD and the docking station are both configured to perform one or more operations based at least in part on the identified orientation. Still further, the docking station may include a receiving surface that is structured to retain the MCD in any one of the plurality of orientations.

As another variation, the docking station may include a receiving surface that is structured to retain the MCD in any one of the plurality of orientations. The docking station may be structured to enable a user to alter the orientation of the MCD when the MCD is retained on the receiving surface.

As another variation, a docking station may be configured to include one or more mechanical retention features that are provided on the receiving surface to retain the MCD in any one of the plurality of orientations.

Still further, the MCD may include a housing having a rear façade that is structured to be received and retained on the receiving surface of the docking station.

As another variation, the docking station may include one or more structural template formations provided with the receiving surface. The MCD may include a housing that is structured to be received and retained by the template formations provided with the receiving surface.

In another embodiment, the MCD includes a housing having one or more metallic or magnetic components distributed on a surface that is to be placed in contact with the receiving surface. The docking station includes one or more magnets that are provided on the receiving surface to retain the MCD in any one of the plurality of positions.

Still further, at least one of the docking station and the MCD are configured to detect a characteristic or property of a magnetic field that is generated from the docking station and affected by the orientation of the MCD in order to determine the orientation of the MCD.

As another variation, one or more embodiments provide that a docking station may be equipped with one or more of (i) an accelerometer and/or (ii) an optical sensor in order to identify the orientation of the MCD. Alternatively, the docking station may be equipped with magnetic reed and/or Hall effect switches to identify the orientation of the MCD. Still further, one of the MCD or the docking station may be structured to identify the orientation of the MCD and to communicate information that identifies or uses the identified orientation to the other of the MCD or docking station.

Still further, one or more embodiments provide that the MCD includes a sensor to determine orientation information about how the MCD is oriented at a given instance. A processor of the MCD may use the orientation as determined from the sensor to identify the orientation of the MCD when the MCD is retained on the docking station.

According to another embodiment, a docking station for a mobile computing device includes a receiving surface that is structured to receive and retain a facade of the mobile computing device. The docking station may also include a configuration of electrical contacts distributed on the receiving surface to make contact with the facade of the mobile computing device. The configuration of electrical contacts may include two or more electrical contacts that are each positioned to make contact with the corresponding electrical contact on a surface or facade of another device. A signal handling component may be configured to transmit one or more signals that carry both power and data using electrical contacts distributed on the receiving surface.

In another embodiment, a mobile computing device may include a housing and a signal handling component. The signal handling component may be contained within the housing. A docking station may include a surface to receive the mobile computing device. The docking station may include a signal handling component. When the mobile computing device is received on the surface of the docking station, each of the mobile computing device and the docking station include one or more components to enable communication of one or more signals that carry both power and data using a signal path that (i) has no insertive connectors, and (ii) extends between the signal handling component of each of the mobile computing device and the docking station.

In another embodiment, the housing of the MCD includes multiple electrical elements distributed on a rear façade of the housing. The multiple electrical elements each form a part of a shell that comprises the housing. The docking station include a pattern of corresponding electrical elements provided on the receiving surface. At least some of (i) the multiple electrical elements of the MCD, and (ii) the pattern of corresponding electrical elements on the receiving surface of the docking station, align to make electrical contact to form the one or more continuously conductive signal paths that pass through a thickness of the housing of the MCD.

In another embodiment, at least one of the MCD or docking station is structured to identify the orientation of the mobile computing by identifying which of (i) the multiple electrical elements of the MCD, and (ii) the pattern of electrical elements on the receiving surface, are in electrical contact. As with some other embodiments, one embodiment provides that the MCD and the docking station are configured to communicate one or more signals using one or more signal paths that are at least partially inductive as between the MCD and the docking station. The one or more signals may include a power signal so that the docking station supplies power to the MCD.

As one variation, an embodiment provides that least one of the MCD or docking station is structured to identify an orientation of the MCD using a reflected load present on the inductive portion of the signal path.

In another embodiment, the docking station is signaled to couple to one of two or more connected devices. The one of two or more connected devices is selected by either of the MCD or docking station based on the identified orientation of the MCD on the receiving surface of the docking station.

According to an embodiment, magnetic coupling may be used between the MCD and the accessory device in the context of assigning orientation-dependent functionality or settings between the two devices. In an embodiment, the magnetic component corresponds to one or more magnets provided with or beneath the receiving surface of the docking station. Ferrous material may be provided on the rear facade of the mobile computing device as a plurality of tabs, One or more of the tabs may be non-circular, so that at least a first of the one or more magnets is circular. The first tab may be positioned to magnetically couple to the first magnet.

In a variation, the magnetic component or coupling may correspond to one or more magnets provided with or beneath a receiving surface of the docking station. In an embodiment, the ferrous material may be provided on the rear facade of the mobile computing device as a plurality of tabs.

In one variation, one or more of the tabs may be circular, and at least a first of the one or more magnets is non-circular. The first tab may positioned to magnetically couple to the first magnet.

In another embodiment, at least one of the mobile computing device or accessory device includes one or more magnets to (i) retain the other of the mobile computing device or accessory device in a plurality of discrete orientations, and (ii) to repel the other of the mobile computing device or accessory device from being retained in any orientation other than the plurality of discrete positions.

Still further, at least one of the mobile computing device or accessory device includes one or more magnets to retain the other of the mobile computing device or accessory device in 2 or 4 discrete orientations.

As another variation, at least one of the mobile computing device or accessory device is pre-configured to operate (i) in a first state when the mobile computing device has a first one of the plurality of discrete orientations, (ii) in a second state when the mobile computing device has a second one of the plurality of the discrete positions.

According to another embodiment, an accessory device is provided for a mobile computing device. The accessory device includes a body that extends to a receiving surface. Magnetic material may be provided at one or more locations on the receiving surface. The magnetic material may be distributed to enable the receiving surface to retain a particular mobile computing device having magnetically attracted material provided with at least a portion of the housing.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 is a representative diagram illustrating two computing devices that can be brought into contact for purpose of enabling one device to provide a power and/or data signal to the other device, according to an embodiment of the invention. Numerous embodiments described herein, including an embodiment such as described with FIG. 1, reference a MCD and dock as two devices that are brought into contact with one another for purpose of power/data transfer without use of traditional insertive or mechanically coupled connectors. However, different kinds of devices (e.g. portable devices and accessory devices) may be used with embodiments described herein. In the examples provided for the numerous embodiments described, the two devices may correspond to, for example, a MCD and an accessory device for the MCD. In one implementation, the MCD is a multi-purpose device having cellular data and telephonic capabilities, while the accessory device corresponds to, for example, a docking station (for communications and power supply), sticky (or piggy)-back accessory, a light projector, a speaker set, or headset station. As an addition or alternative to cellular telephony/data capabilities, the MCD may include, for example, functionality for use as a media player, a camera or video recorder, a global positioning unit, an ultramobile personal computer, a laptop computer, or a multi-purpose computing device. Numerous other examples and implementations are described herein, including embodiments in which three or more devices are interconnected through one or more connector-less connections.

Accordingly, a system 100 includes a MCD 110 that is supported or otherwise retained by a dock 120. The manner in which the MCD 110 is supported may vary. Moreover, as described with one or more embodiments, the orientation of the MCD on the dock may be changed by the user for purpose of configuring operations or behavior of one or both devices. According to an orientation of an embodiment shown, the MCD 110 is supported on the dock 120 in a partially upright position along its length axis (L). Such an orientation may correspond to a 'portrait' position. In an embodiment in which alternative orientations are possible, the 'landscape' positions, or positions in between the portrait and landscape positions may be possible.

According to an embodiment, the dock 120 utilizes physical support structures (not shown), such as shelves, platforms, hooks or mechanical retention features, to retain the MCD 110 in a docked or mated position. In another embodiment, magnetic clasps may be included or provided the dock 120 and/or the MCD 110 to secure retention of the MCD against the dock.

The dock 120 may include resources 121 for generating or extending power and/or data signals to the MCD 110. For example, the dock 120 may be mated with a power outlet 124 or another computer 126 (e.g. desktop computer) to extend power and/or data signals. The resources 121 may include circuitry or hardware, such as AC/DC converters and regulators. In order to enable the dock 120 to receive electrical power from a personal computer or other computing station, one implementation provides for the dock 120 to include a physical connector port, such as provided by a Universal Serial Bus (USB) connector. Additionally, the dock 120 may include data acquisition capabilities, provided through connector ports with the computer 126, wireless ports (e.g. cellular, WiMax connection, Bluetooth), Internet ports, and media feeds (e.g. provided through television tuner and cable).

As shown by an embodiment of FIG. 1, the MCD 110 has a housing shell 112 having a thickness (t). The housing shell 112 may be used to retain internal components of the MCD 110, such as a circuit board, processor, memory, or components of a display assembly. The MCD 110 may be structured so that a primary facade 115 (e.g. the back panel) of the housing shell 112 rests on a receiving surface 125 of the dock 120.

According to embodiment, the MCD 110 and dock 120 are electrically mated without use of connector structures. In one embodiment, one or more signal paths 132 is defined by conductive or current-carrying elements that are distributed in the dock 120 and the MCD 110. The signal path(s) 132 is continuously conductive in carrying one or more signals (e.g. power and/or data) between the dock 120 and the MCD 110. In an embodiment in which signal path(s) carry power, the signal may extend through the housing shell 112 (and its thickness) and from/to a recharging module 118 or circuit of the MCD 110. Such a power signal may be delivered from the dock 120 to the MCD 100 for the primary purpose of recharging a battery module 119 on the MCD. In other implementation, such as when the other device is another type of accessory (and not a dock), the power signal may be delivered from the MCD 110 outward.

In an embodiment in which the signal path(s) 132 carry data, the signal may be delivered or exchanged between data handling resources of each device. The MCD 110 may be equipped with data receiving elements 113 (or alternatively, a communication port) provided inside or with the thickness of the housing 112. In the MCD 110, the processor (not shown) may interconnect to the data receiving elements 113 or communication port provided interior to the housing 112 to process and use the data signal. Still further, the data signal may be delivered outward from the MCD 110 to the accessory device (which does not necessarily have to be the dock) in a similar manner. Various types of data handling resources may be provided on the dock 120 in order to communicate data out or receive data in. Such components may include a processor, storage resource, or physical/logical communication port to another device or medium. For example, the dock 120 may enable synchronization of data files and/or records between a third computer (e.g. personal computer 126) and the MCD 110.

As an alternative to a continuously conductive signal path, another embodiment provides that the signal path 132 that is enabled from the construction of the MCD 110 and dock 120 is inductive or transductive. In particular, the signal path 132 may use induction or other transduction to convey signal energy from or between respective signal points of the dock 120 and the MCD 110. Thus, the non-continuously (or transductive) signal path may be used to carry power and/or data, to and/or from the MCD 110 or dock 120.

Continuously Conductive Signal Path

FIG. 2A is a representative block diagram of a computer system comprising the MCD 110 and dock 120, each of which is configured to communicate signals on a continuously conductive signal path, under an embodiment. The MCD 110 and dock 120 may be mated and retained in a manner described with an embodiment of FIG. 1. An exterior surface 212, 222 of MCD 110 and dock 120 respectively may be in contact as a result of the retention of the MCD on a receiving surface of the dock. The exterior surface 212 of MCD 110 may correspond to, or be provided by, the exterior facade of the housing shell 112 (FIG. 1). A signal source 225 on the dock 120 (e.g. such as a power outlet 124 in combination with resources 121) may generate a signal (e.g. power) that is conveyed through conductive elements 224 provided on the exterior (or receiving) surface 222 of the dock. Likewise, the exterior surface 212 of the MCD 110 includes conductive elements 214 that extend through the thickness of the housing shell and onto a charging circuit or module 230.

In an embodiment, the design of the dock 120 and/or how it receives MCD 110 may be configured to provide active or inherent retention features that force contact between conductive elements 214 and 224 on respective exterior surfaces 212, 222 of the dock 120 and the MCD 110 (at least when properly positioned). Such retention features may correspond to magnetic clasps, or to mechanical features such as platforms, ledges or surface features. Alternatively, coupling features, such as biased insertion members (e.g. on the dock 120) and receiving holes (e.g. on the MCD 110) may also be used. In another variation, the dock 120 may be constructed to receive the MCD 110 in a manner that orients the MCD 110 so that gravity forces its exterior surface 212 down into contact with the receiving surface 222 of the dock. Optionally, the retention features enable the user to select and to change an orientation of the MCD 110 when retained on the dock 120.

In an embodiment, the signal exchanged via the continuously conductive signal path is for power. Accordingly, one implementation provides that the dock 120 connects to a power source 252 (e.g. outlet 124, personal computer 126) and becomes a source of power for the MCD 110. The power signal path initiated by the dock 120 may be in the form of a closed circuit, requiring positive and negative polarity connection points with the MCD 110. Thus, two separate pairs of conductive elements 214, 224 (or set pairs) may be provided for purpose of conveying power, with each pair of conductive elements 214, 224 providing a polarity in the connection. In the case of an independent data signal path, one or more contact points may be used to carry one or more signals. For example, two or three signals may be conveyed between the devices. As also described elsewhere, some embodiments also provide for an integrated power and data signal, so that power and data are carried on one path and at the same time.

FIG. 2B is a representation of one or more continuously conductive signal path 250, as extended from or between the dock 120 to the MCD 110, using conductive elements provided on both devices (such as described with previous embodiments). The signal paths 250 may carry power and/or information from the dock 120 to the MCD 110, or alternatively, from the computing device to the station. On the dock 120, the signal paths 250, when provided in the form of power, may be generated from electrical power source 252 and signaled out using conductive elements. In one embodiment, the circuit elements provided from the dock 120 include wiring or circuit elements that terminate as conductive elements 224 on the exterior surface 222 (FIG. 2A). The conductive elements 224 may correspond to, for example, metallic elements that terminate electrical leads from a power source 252 of the dock 120.

The continuously conductive signal path 250 may extend to the conductive elements 214 on the exterior surface 212 (FIG. 2A) of the MCD 110, which act as terminals for receiving the power signal from the dock. The conductive elements 214 of the MCD 110 may extend through the thickness of the housing shell 112 (FIG. 1) to the charging circuit or module (or alternatively, some other signal handling component). The conductive elements 214 on the exterior surface 212 (FIG. 2A) may thus form positive and negative terminals for receiving corresponding connections with conductive elements of the dock 120.

MCD Construction for Enabling Conductive Signal Path

FIG. 3A illustrates a MCD configured to enable a conductive and connector-less connection with an accessory device, under an embodiment. In one implementation, the MCD 300 corresponds to a cellular telephony data device, such as a so-called "Smart phone" or "mobile companion". Such devices use cellular networks to enable telephony operations, messaging (e.g. e-mail, instant messaging, Short Message Service (SMS), Multimedia Message Service (MMS)) and Internet browsing or other network operations. As an alternative or addition, such devices may enable network connectivity through alternative wireless network mediums, such as Wireless Fidelity (or 'WiFi') as provided under standards such as those set forth by IEEE 802.11(b) or (g). While embodiments described herein focus on cellular telephony data devices, other types of computing devices may also be used with embodiments described herein, such as multimedia devices, ultramobile personal computers, GPS units, or cameras/video recorders.

According to an embodiment, the MCD 300 includes a housing 310 have a front facade 313 that opposes a back or rear facade 315 (FIG. 3B). The front facade 313 typically incorporates user-interface features, such as a display 316, buttons or touch-sensitive features 317, as well as any one of many possible other features, such as 5-way navigation mechanisms (with four way scrolling and center select), keypads or keyboards, microphones, dials, and camera lenses and numerous other features. Conventional devices often incorporate physical connectors into a peripheral edge 309 (e.g. such as USB or micro-USB ports), for purpose of performing battery recharge or data transfer/exchange. In contrast, it is possible for embodiments described herein to include no such physical connector ports to perform recharge or data transfer functions.

Figure 6A:
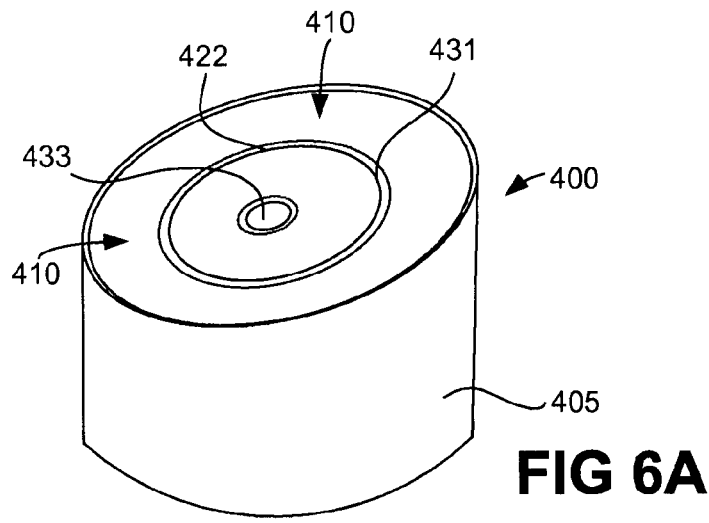
FIG. 6A is an isometric view of a docking station for use in mating with a mobile computing device such as shown and described, under another embodiment.

FIG. 3B is an isometric rear view of the MCD of FIG. 3A, under an embodiment. As shown, the housing 310 may be provided as a shell that encompasses the rear facade 315. According to an embodiment, the housing 310 is structured to enable use of a continuously conductive signal path that may be communicated from (or to) another device (e.g. dock) that is brought into contact with the MCD. In an embodiment, housing 310 of a MCD 300 is structured to include conductive elements 302 that connect with designed conductive elements 422 (e.g. see FIG. 6A) of a dock 400 (FIG. 6A). The conductive elements 302 extend a thickness into the shell of the housing 310 and electrically connect to a recharging circuit or power module (not shown in FIG. 3) of the MCD 110 (FIG. 1). Such a configuration enables the MCD 300 to be connector-less, in that the device requires no conventional connectors, such as those that require a physical interface on the exterior of the housing. The connector-less features enable the exchange of signal paths for both power and data, without requiring, for example, connector physical layers, apertures to receive insertive elements from the connecting device, or conductive extension elements. Rather, strategically positioned conductive elements 302 may be provided on a facade 315 of the housing 310. Moreover, these conductive elements may be incorporated into a mid-region 308 of the facade 315, or at least apart from the edges 311 or facade boundaries of the housing 310, where conventional connector elements are provided.

In an embodiment of FIG. 3A and FIG. 3B, the conductive elements 302 are integrated to appear as aesthetic or design elements. In one embodiment, the conductive elements 302 are integrated into a logo 304 that appears on the back facade 315. For example, one letter of a logo may provide a positive terminal for receiving a power signal, while another letter of a logo may provide a negative terminal. The combination of positive and negative terminals may create a power signal that extends from the dock 120 (see FIG. 1) to the MCD 300.

As an addition or alternative, one or more embodiments provide that additional conductive elements may be used to carry data and information. For example, another of the letters in the logo may correspond to a logo that is positioned to receive or provide a data signal.

Figure 4:
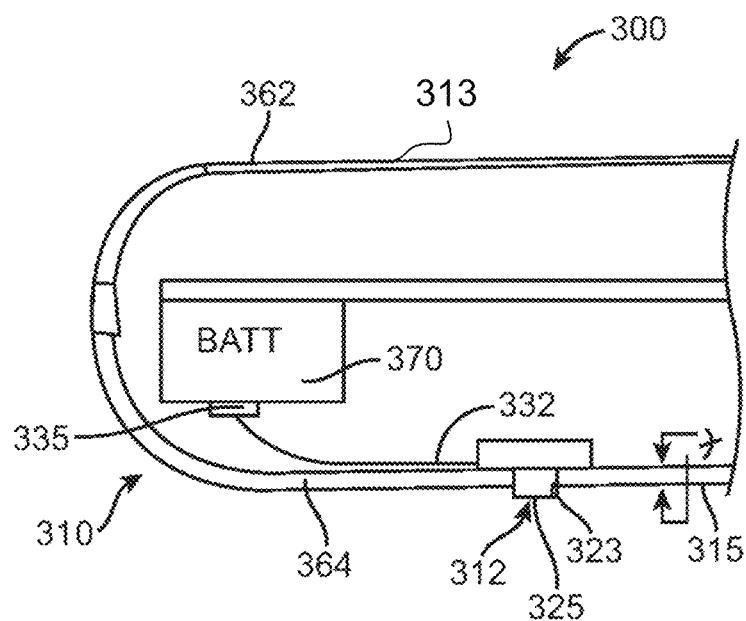
FIG. 4 is a side cross-sectional view of a housing of a mobile computing device, under an embodiment.

FIG. 4 is a side cross-sectional view of the housing 310 of the MCD 300, under an embodiment. In one implementation, the housing 310 may be provided by an upper shell 362 and a lower shell 364. The upper shell 362 may provide the front facade 313, while the lower shell provides the rear facade 315. During assembly, the shells 362, 364 may be sealed to complete the housing 310. The housing 310 may be characterized by a thickness t. Additionally, the housing 310 may be structured to assume any one of a pre-designed form factor, with contours or design parameters that meet design parameters. The conductive elements 312 may be inserted into openings 323 or otherwise integrated into the facade 315 so as to provide conductive surface points 325 in a mid-portion of the facade 315. The conductive surface points 325 may correspond to bumps or other surface features, or alternatively be smooth from a tactile perspective. A conductive medium 332 (e.g. plate, cable, lead lines) may extend inside along an inner surface 316 of facade and terminate at a battery module 370 or component.

In one variation, the conductive medium 332 is provided in a region of the lower shell that corresponds to a battery cover. Optionally, the termination may be provided by connector elements, such as pogo pin termination points 335. The pogo pin termination points 335 may mate or connect with corresponding receiving elements of the battery module 370 of the MCD 300 when the battery cover is closed, or when pressure is applied to the battery cover (such as when the back façade 315 is rested on the receiving surface of the dock). In such an implementation, a power circuit for carrying a power signal from the dock 120 (FIG. 1) to the MCD is created and effective under conditions of (i) receiving a power signal, and (ii) having the battery cover pressed on the docking station.

Figure 5:
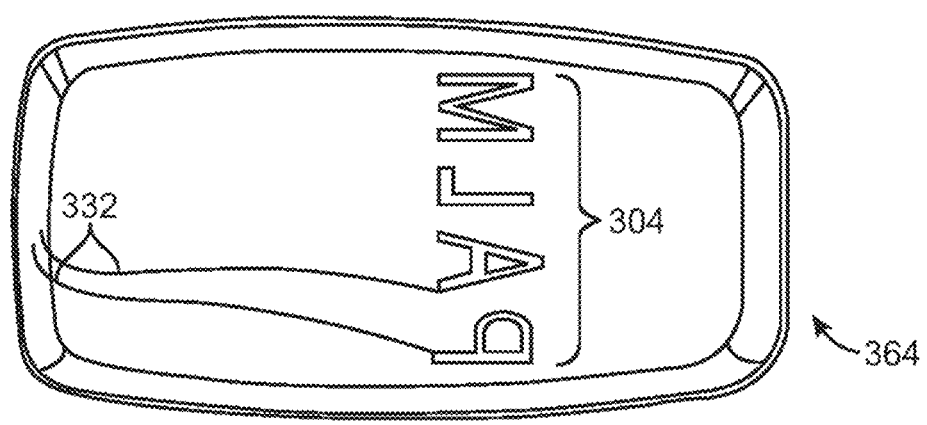
FIG. 5 is an isometric interior view of a lower shell or housing panel, constructed according to an embodiment.

FIG. 5 is an isometric interior view of the lower shell 364 (or portion thereof, such as the battery cover) which provides at least a portion of the exterior rear facade 315 (FIG. 3B), according to an embodiment. As shown by an embodiment, conductive plates or leads 332 may extend from selected logo elements 304 which are integrated or otherwise formed on the exterior of the lower shell 364. The leads 332 may extend to a point coinciding with positioning of the battery module 370 (FIG. 4) so that a resulting power signal carried between the dock 120 (see FIG. 1) and the MCD 300 (see FIG. 1) may recharge the battery element of the device. In this way, the conductive surface points 325 (e.g. see FIG. 4) may appear as elements of a logo on the rear facade (e.g. see FIG. 4). To accommodate a power signal, an embodiment assigns one logo element 304 to act as a positive terminal and another logo element 304 to act as a negative terminal. In this way, a power circuit may be created and shared between the MCD 300 and the dock (or other device) for purpose of recharging the batter module 370 on the MCD.

As an alternative, the same construction may be used to enable reversal of the power signal out of the device. In one implementation, the power signal may use the battery module 370 of the MCD as the source in order to signal out the power and/or charge to an accessory device in contact with the rear facade 315.

Dock for Enabling Conductive Signal Path

According to an embodiment, a dock may be structured to provide conductive elements that are selectively positioned or formed to mate with corresponding conductive elements of the MCD 300 (see FIG. 3). A dock for supporting the MCD in a manner as described may have any of many possible form factors. The dock may extend an arrangement of contact elements that are aligned to make contact surface points 325 on the rear facade 315 of the MCD 300 (FIG. 3B).

FIG. 6A is an isometric view of a dock for use in mating with a MCD such as shown and described other embodiments. In an embodiment, dock 400 includes a body 405 which extends a height from a support surface (e.g. ground or table-top) and enables support of the MCD 300 (FIG. 3B) in an upright or partial upright position. In an embodiment, the dock 400 includes a receiving surface 410 which supports the MCD on its back facade 315, so that the device can be viewed face-up when retained on the body 405.

As shown by an embodiment of FIG. 6A, the body 405 vertically slants the receiving surface 410 on which the MCD 300 (shown in FIG. 3B) may rest and/or be held in position. To prevent the MCD 300 form sliding off, one embodiment provides that magnetic retention features may be incorporated into the receiving surface 410 and/or device housing 310 (FIG. 3B). As an alternative or addition, a shelf may be positioned at the gravitation bottom of the slanted surface. Other mechanical or magnetic retention mechanisms may alternatively be employed. For example, as another alternative or addition, the receiving surface 410 may be horizontal or provided with other retention mechanisms to hold the device in place when it is rested on the receiving surface. Thus, while some embodiments recited contemplate a passive 'mating' relationship between the computing device 300 and the dock 400 (e.g. gravitational), retention features (such as magnetic clasps) may provide for active retention of the MCD on the receiving surface 410.

In order to enable the continuously conductive signal path from the dock 400 to the MCD 300, embodiments include different patterns or arrangements for the manner in which conductive elements 422 on the receiving surface 410 of the dock are provided. According to one embodiment, the conductive elements 422 of the dock 400 are provided in a circular and concentric arrangement, although alternative arrangements may be employed. In a concentric ring arrangement, an outer ring 431 may provide one terminal for a power signal, while an inner ring 433 may provide the opposite pole. Each ring 431, 433 may be spaced from one another so that when the MCD is positioned on the receiving surface 410, the conductive elements on 315 (FIG. 3B) the façade of the MCD 300 (see FIG. 3B) will contact the correct ring, regardless of whether the MCD is in the portrait or landscape (or in between) orientation when retained on the receiving surface.

As a variation or extension to such an embodiment, the device may have anyone of a plurality of positions on the receiving surface 410. The positions may be discretely defined positions (e.g. north, south, east or west) or continuous on a ring or arc.

According to an embodiment, the receiving surface 410 is magnetized. In one embodiment, the use of magnetic forces may be accomplished by integrating one or more magnetic elements into the body 405, so that the magnetic field emits outward from the receiving surface. The magnetic fields may attract to elements on the MCD 300, such as the conductive elements 302 (FIG. 3B) or conductive plate 332 (FIG. 4) of the MCD.

Figure 6B:
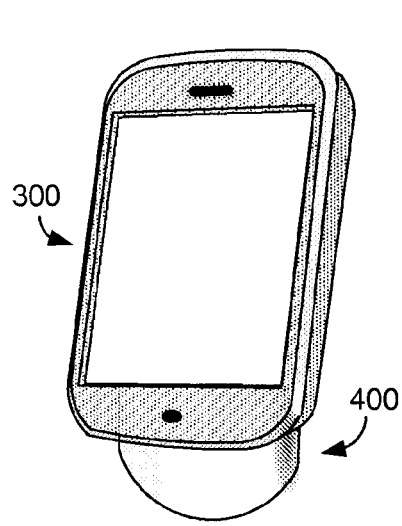
FIG. 6B and FIG. 6C illustrate a mobile computing device surface mounted to a docking station, under an embodiment.
Figure 6C:
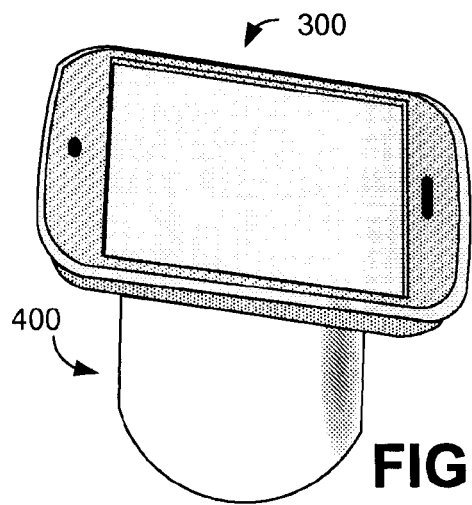

FIG. 6B and FIG. 6C show the MCD 300 surface mounted to the dock 400. As shown, the MCD 300 may be surface mounted in either portrait (FIG. 6B) or landscape (FIG. 6C) orientations. More orientations are possible, depending on the manner in which the MCD 300 is retained. In an embodiment in which magnetic forces are used, the magnetic forces enable the MCD 300 to be positionable on the receiving surface 410 (FIG. 6A) in a discrete number of positions. For example, the magnetic forces may be configured to enable the MCD 300 to occupy portrait or landscape positions, as shown by FIG. 6A or FIG. 6B. Alternatively, one of four possible positions may be possible, including opposite portrait and landscape orientations (i.e. north, south, east and west). When specific positions are enabled with magnetic forces, positions in between those specified positions may be repelled. Thus, magnetic forces may be used to create a defined number of possible orientations by which the MCD 300 may be oriented with respect to dock 400.

As another variation, the dock 400 may be configured to enable the MCD to have any one of a plurality of positions defined anywhere along an arc. For example, as described with an embodiment of FIG. 3B, the device 300 may include a ring of ferrous material that enables it to occupy positions on an arc, rather than be repelled from defined orientations. Numerous further variations are possible and some are described in greater detail below.

The use of magnetic forces may enhance the conductive connection between the surfaces of the MCD 300 and dock 400. Still further, as an alternative or addition to embodiments such as described above, another embodiment may surface treat conductive elements 422 (FIG. 6A) or other portions of the façade of the MCD.

Figure 6D:
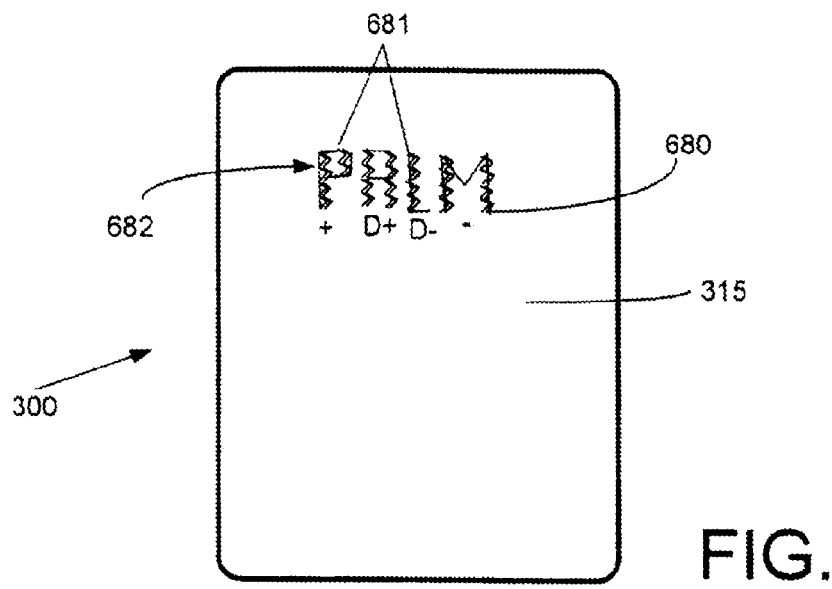
FIG. 6D illustrates an alternative configuration for a back façade of a mobile computing device, under an embodiment.

FIG. 6D illustrates an alternative configuration for a back façade of MCD, under an embodiment. In an embodiment of FIG. 6D, an arrangement of electrical contacts 680 is shown to form a logo 682 for the back façade 315 of the MCD. The logo 682 may comprise multiple letters, each of which is termed a logo element 681. In one embodiment, each logo element may comprise of multiple pins, or pogo pins that form an electrical connection. Such a formation of electrical contacts or pins is referred to as a "Bed of Nails" configuration. In one embodiment, each logo element 681 carries a signal path. In the example shown, the logo elements 681 combine to include a positive and ground signal and two data signals (+ and −). Individual elements (i.e. logo elements 681) may have varying pin dimensions. For example, a logo element may include one or two pins provided on length portions of the element. Various other pin configurations are contemplated.

In one implementation, at least some of the electrical contacts 680 are pogo-pins that insert inward to a conductive element (not shown) that is common to all the pogo-pins in that logo element 681. When the rear façade 315 is surface mounted to the dock, at least some electrical contacts 680 of individual logo elements 681 move inward to form a conductive connection with corresponding electrical elements on the dock. This configuration for the back façade may enhance the conductive electrical connection where the contacts 680 meet the corresponding elements on the receiving surface of the dock.

Numerous other enhancements and features may be combined with electrical contacts formed on the rear façade 315 of the MCD 300. As another example of a feature or enhancement, the electrical contacts on both the rear façade 315 and the dock may be surface treated to be rough in order to facilitate retention of the MCD in the docked position.

While FIG. 6D illustrates use of logo elements, other elements on the rear façade 315 may be used. For example, the pogo elements that provide the conductive surfaces may be provided in various geometric shapes (e.g. circles) or blended by color or appearance with the housing of the MCD.

Figure 7B:
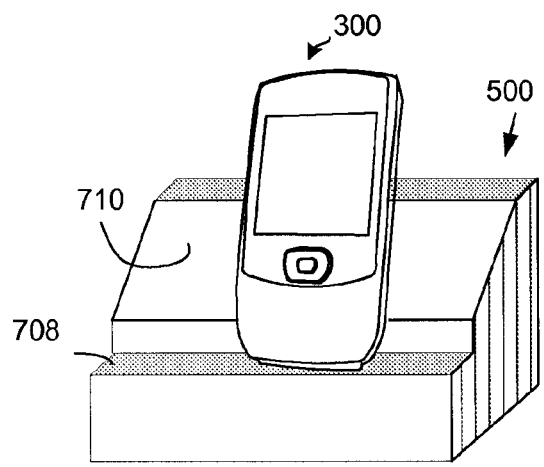
FIG. 7A through FIG. 7C illustrate an alternative construction and design for a docking station and a mobile computing device, according to an embodiment.
Figure 7C:
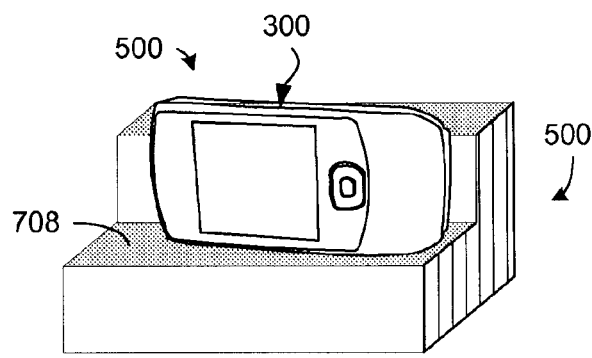
Figure 7A:
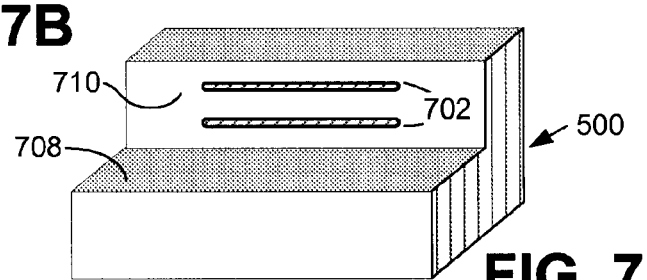

FIG. 7A through FIG. 7C illustrate an alternative design for the dock and MCD, under another embodiment. In FIG. 7A, the dock 500 includes an elevated platform 708 that serves as a support structure for the MCD 300. A contact surface 710 on which the conductive elements is provided may extend vertically from the platform 708. A pair of contact elements 702 representing positive and negative contact points for an emitted power signal may be provided on the contact surface 710.

FIG. 7B illustrates the MCD 300 surface mounted on the dock 500 in a portrait mode. The platform 708 may support the MCD 300 in the upright position. As shown by FIG. 7C, the MCD 300 may be moved into a landscape position and supported by the platform 708. In an embodiment, the contact elements 702 may remain in contact with the contact surface points 325 (FIG. 3B) on the rear facade 315 (FIG. 3B) of the MCD 300 when the MCD has either the landscape or portrait positions on the dock.

Power/Data Conveyance in Conductive Signal Path

Figure 8A:
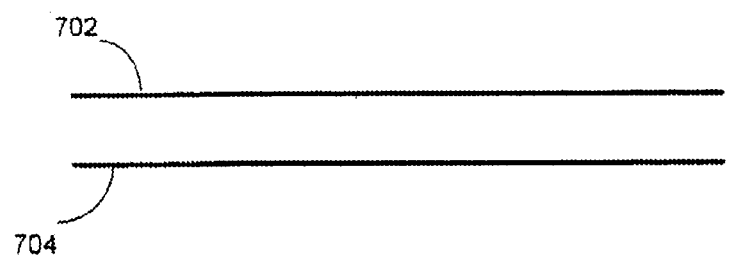
FIG. 8A illustrates a continuously conductive signal path used to convey only power from one device to another, under an embodiment.

In an embodiment, a continuously conductive signal path such as described with FIG. 2A and FIG. 2B may be used to convey power and/or data. FIG. 8A represents a continuously conductive signal path used to convey only power from one device to another. In particular, an embodiment provides that the continuously conductive signal paths convey power from a dock 400 (FIG. 6A) to a MCD 300 (FIG. 3A). In order to convey power with conduction, one or more embodiments provide that the continuously conductive signal paths include positive and negative contact elements 702, 704. Thus, with reference to other embodiments described above, power may be conveyed through electrical contact between two conductive elements on each of the dock 400 and the MCD 300. For example, with reference to FIG. 3A, in the case where two logo elements on a rear facade 315 of the housing 310 (FIG. 4) are used to provide electrical elements, one logo element may represent the positive terminal and another logo element may represent a negative terminal.

Figure 8B:
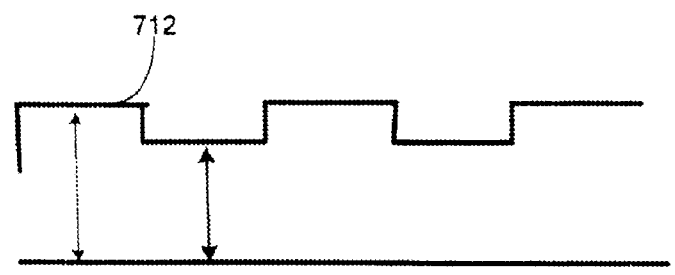
FIG. 8B and FIG. 8C each illustrate an embodiment in which both data and power are conveyed on a common continuously conductive signal path.
Figure 8C:
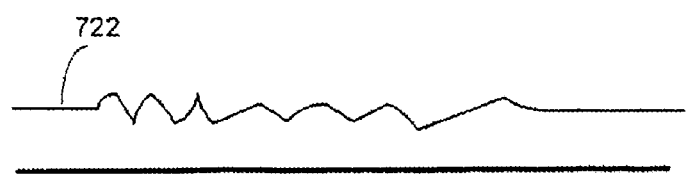

FIG. 8B and FIG. 8C each illustrate an embodiment in which both data and power are conveyed on a common continuously conductive signal path. In particular, an embodiment provides for modulating a power signal 712 in a manner that enables the power signal to convey information. Thus, under one embodiment, the dock 400 may convey information to the MCD 300 using the same electrical contacts and signal that conveys power for operating components and/or recharging the device's battery. FIG. 8B and FIG. 8C illustrates different types of modulation of signals that carry power. These types of modulations include (i) pulse-length modulation, where the positive power signals 712 is pulsed and modulated in length of time (see FIG. 8B), (ii) frequency modulation of the positive power signal 722 (see FIG. 8C), and/or (iii) 'AM OOK" modulation, where the voltage levels of the power signal are varied. According to an embodiment, the data that is conveyed through the power signals is limited in quantity, as use of power signals to convey data has inherent limitations (e.g. noise, speed). In an embodiment, the type of information that is conveyed is data for establishing subsequent local wireless communications.

In particular, one embodiment provides that the power signal is used to initially pass credential or pairing information between devices. Such information may correspond to password, device identifiers, and other information that users often manually enter in order to enable, for example, BLUETOOTH pairing. However, an embodiment such as described recognizes that the power signal conveyance means that two devices are placed in contact with one another by the user. The placement of the two devices in physical contact by the user may be viewed as a self-authenticating event. The event enables the assumption that the passing of credential information between the two devices is authorized or desired by the user. In one embodiment, the conveyance of the power signal coincides with automatic transmission of credential information. For example, the dock 400 (FIG. 6A) may convey the credential information for enabling BLUETOOTH (or other standardized local wireless communications) to the MCD 300 (or vice-versa) (FIG. 3A). In turn, the MCD 300 may use such credential information to establish a wireless pairing with the dock 400 (such as for BLUETOOTH or WIRELESS USB). Subsequently, other data and information, such as data corresponding to records or media, may be passed from the MCD to the dock 400 (or the reverse).

Inductive Signal Path

While some embodiments described above provide for a conductive signal path between a mobile computing device and a docking station, one or more embodiments provide a non-continuously conductive or transductive signal path to be used to carry power and/or information between the dock and the MCD. A non-continuously conductive signal path may refer to the ability of a signal to be carried from or between devices, where the signal undergoes transformation from current/voltage form to some other form and back again to current/voltage. One embodiment provide for a signal path that includes an inductive segment to convey one or more signals between the MCD and the dock.

Figure 9A:
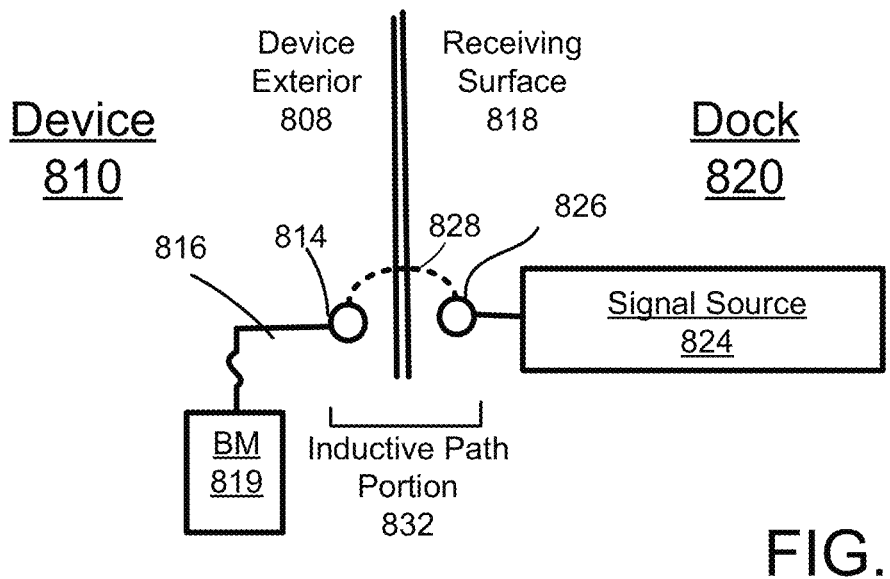
FIG. 9A is a simplified block diagram of a mobile computing device and docking station for conveying power or data signals inductively, under an embodiment.
Figure 9B:
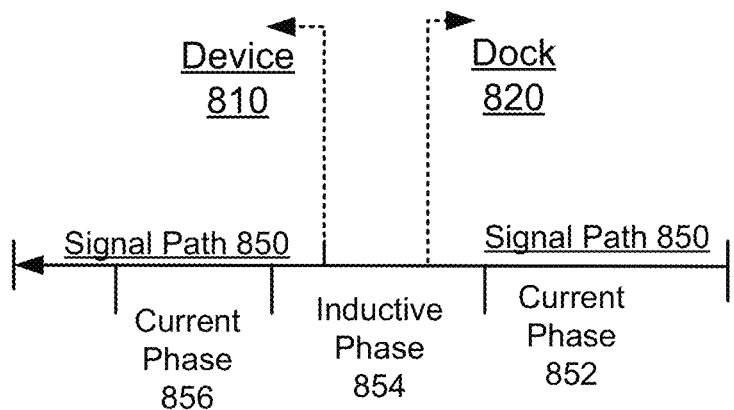
FIG. 9B illustrates an inductive signal path, as extended from or between a docking station and a mobile computing device, according to an embodiment.

With reference to FIG. 9A and FIG. 9B, an embodiment is illustrated in which the signal generated from either the dock 400 (FIG. 6A) or MCD undergoes transformation from a current/voltage form into an inductive or magnetic energy form, and then back into a current/voltage form.

FIG. 9A is a simplified block diagram of a MCD 810 and dock 820, where one or both devices are configured to communicate signals on a signal path that has an inductive signal path portion, so as to form a partially inductive signal path 832. According to an embodiment, the MCD 810 may be placed in contact with the dock 820, such as in a manner described with other embodiments (such as described with FIG. 1). The result is that a device exterior 808 (e.g. rear facade) comes into contact with a receiving surface 818 of the dock. Alternatively, the two devices may be brought into close proximity, but not necessarily in contact, in order for inductive signal communication to take place. While exterior surfaces 808, 818 of MCD 810 and dock 820 respectively may be in contact as a result of the retention of the MCD by the dock, the contact is not made to conductively transfer signals between the devices. Rather, a signal source 824 on the dock 820 (e.g. such as a power inlet) may generate a signal 828 (e.g. power) that is transformed through a magnetic coil 826 or other inductive mechanism into a magnetic field. A corresponding coil 814 or inductive receiving component may be provided on the MCD 810 to transform the signal 828 into an electrical signal 816. The electrical signal 816 may be treated by various circuit elements and components in order to power components of the MCD 810, and/or to charge a battery module 819 of the device 810.

FIG. 9B illustrates an inductive signal path 850, as extended from or between the dock 820 to the MCD 810, using a combination of magnetic/inductive and conductive elements provided on both devices. On the dock, the signal path 850 includes a current phase 852 and an inductive (or magnetic field) phase 854. The inductive phase 854 carries the signal across boundaries of respective housings using magnetic field. Thus, on the device 810, the signal path 850 includes an inductive phase 854, followed by a current phase 856. The reverse path may also be possible, such as in the case when the MCD supplies power and/or data to the docking station or another accessory device.

Inductive Coil Arrangements

The inductive conveyance of power and/or data signals may be achieved through use of coils, provided on each device that is to be coupled to transmit or receive such signals. Various coil configurations are possible to enable conveyance of power and/or data, either unidirectionally or bi-directionally.

Figure 10A:
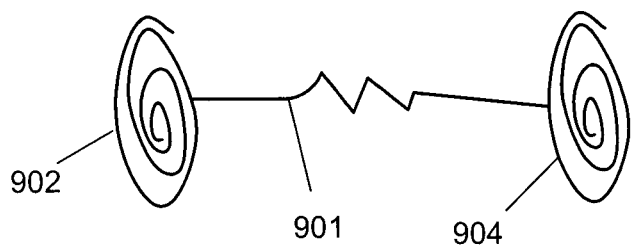
FIG. 10A through FIG. 10C illustrates different coil distribution implementations for enabling inductive signal conveyance, under different embodiments or variations.
Figure 10B:
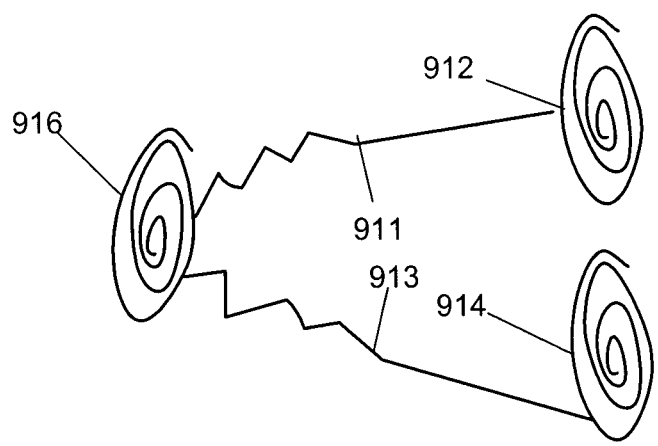
Figure 10C:
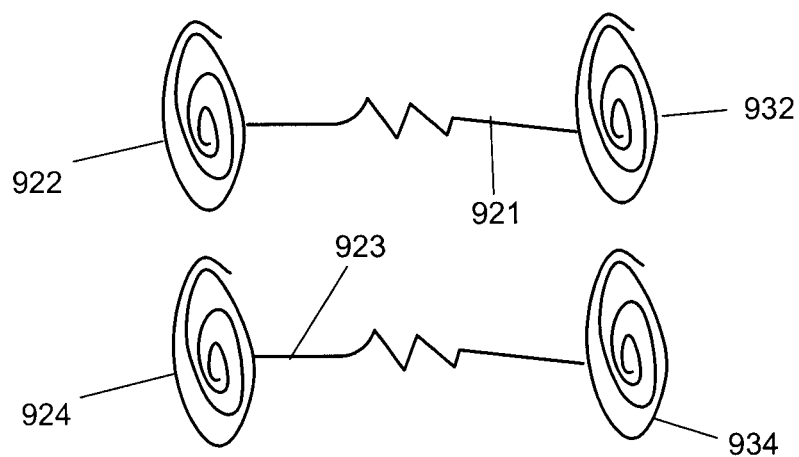

FIG. 10A through FIG. 10C illustrate different coil distribution implementations for inductive signal conveyance, under different embodiments or variations. In particular, FIG. 10A illustrates a computer system that includes two coils, one on each device. The two coils 902, 904 may be used to convey power and/or data in one signal 901 that is exchanged between the two devices. Moreover, the conveyance of either power or data may be bi-directional.

FIG. 10B illustrates a three-coil implementation, where one of the two devices (e.g. the dock 820) includes two coils 912, 914, and the other device (e.g. MCD 810) includes just one coil 916. Such an embodiment may provide the advantage of lessening the weight or size required from the MCD, while enabling separate data and power exchange. In one embodiment, the coil 916 of the MCD 810 receives power 911 from one coil 912 on the dock, and data 913 from the other coil 914. Optionally, either the power 911 or the data 913 signals may be bi-directional, meaning the coil 916 on the MCD 810 may communicate the signals back to the dock 820. In one implementation, the coil on the MCD 810 signals data to the independent data coil on the dock 820.

FIG. 10C illustrates another implementation in which each of the dock 820 and MCD 810 include two coils. In particular, power and data coils 922, 924 on the dock 820 may communicate power 921 and data 923 signals to respective coils 932, 934 on the MCD 810. In an embodiment, the power and data communications are bi-directional.

Computer System Using Inductive Signal Path

Figure 11A:
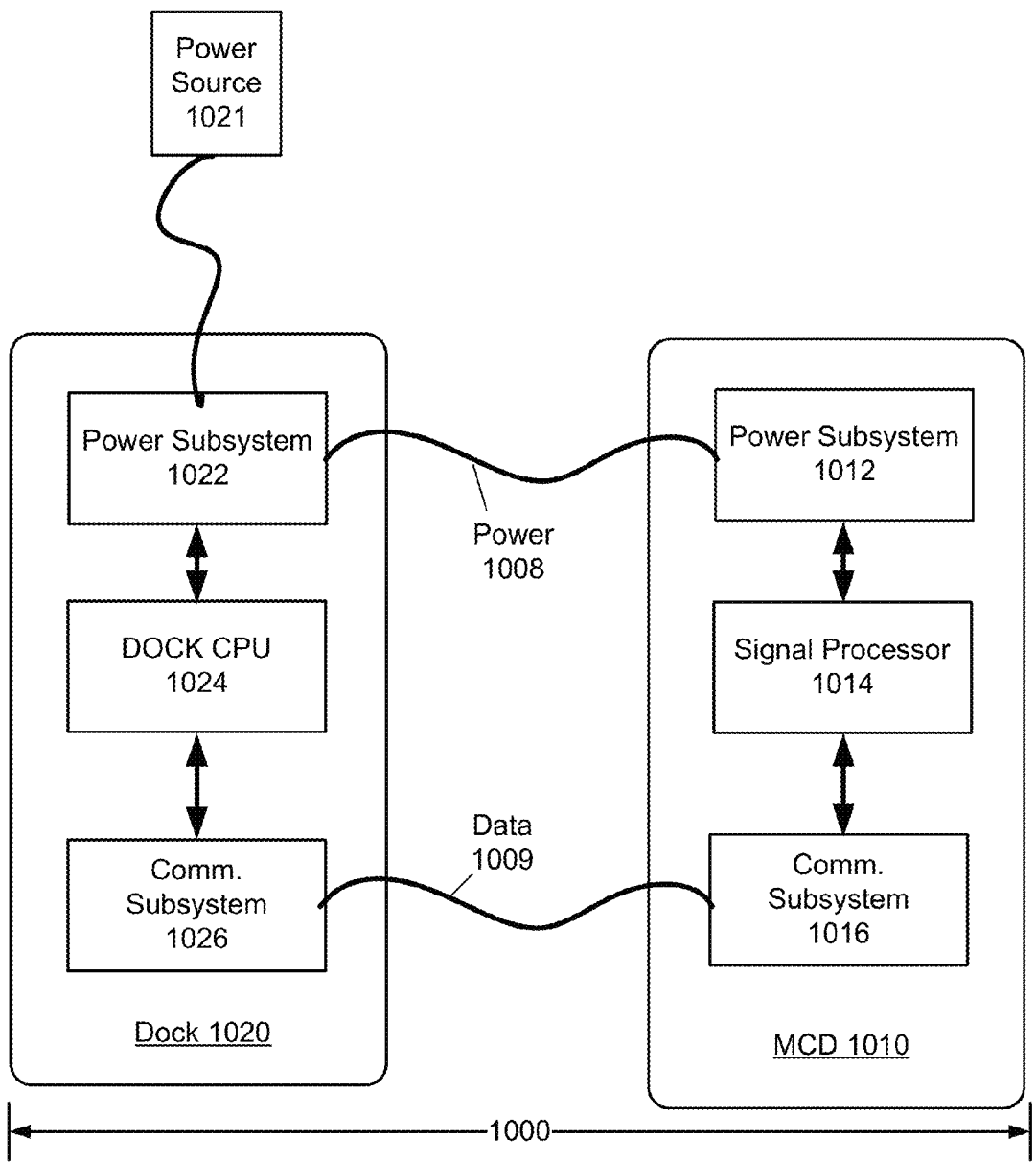
FIG. 11A illustrates a simplified block diagram of a computing system that provides for inductive conveyance of power and/or data signals, under an embodiment.

FIG. 11A illustrates a simplified block diagram of a computing system that provides for inductive conveyance of power and/or data signals, under an embodiment. The computing system 1000 includes MCD 1010 and dock 1020 (which may be equivalent to those devices shown in FIG. 3A and FIG. 6A respectively, or other embodiments described herein which provide for inductive signal transmission). In an embodiment, the dock 1020 includes a central processor 1024, a power subsystem 1022 and a communication subsystem 1026. The MCD 1010 includes a power subsystem 1012, a signal processor 1014, and a communication subsystem 1016. Additionally, the MCD 1010 (and optionally the dock 1020) include numerous other components, such as a central processor and memory resources for enabling application executions, cellular and data communications, and numerous other functions that are part of the usage of the MCD 1010.

On the dock 1020, the power subsystem 1022 includes a connection to a continuous power supply 1021, such as a wall outlet. Additionally, the power subsystem 1022 includes components for converting and regulating the signals from the power supply into a form that is suitable for conveyance using, for example, an inductive medium. Additionally, the power subsystem 1022 includes one or more coils for converting an electrical signal originating from the power supply 1021 into an inductive signal. The communication subsystem 1026 may include wireless or wireline port(s) to receive and send data to other devices, including with other computers or data sources (e.g. media feeds from other devices, such as set-top boxes) or media output devices. In an embodiment, the communication subsystem 1026 also enables inductive data handling from data communicated by one of the inductive signal paths that extend between the two devices. As mentioned, such data may be conveyed by either modulating an inductive power signal or using a separate data signal path.

The central processor 1024 of the dock 1020 may be configured to handle incoming data signals from the communication subsystem 1026, whether from the other resource or from the MCD 1010. Additionally, the central processor 1024 may control data that is communicated out, either to the other resource or to the MCD 1010 (using the inductive signal path).

On the MCD 1010, an embodiment provides that the power subsystem 1012 receives an incoming power signal 1008 from the dock 1020 and distributes the power signal in modified or regulated form to either other components or to the battery for recharge. In one implementation, the power signal 1008 is signaled through an inductive path from the dock 1020 to the MCD 1010, in a unidirectional fashion. The communication subsystem 1016 is configured to communicate with the dock 1020 to receive and/or transmit data 1009. One embodiment provides that the communication subsystem 1016 may include resources to demodulate data carried on the power signal. In particular, the communication subsystem 1016 may use its resources to implement a protocol for retrieving and using credential information (e.g. preliminary data for establishing subsequent wireless communications) from characteristics of modulations in the power signal 1008. The protocol may further provide for the communication subsystem 1016 to switch to, for example, a standardized wireless communication medium (e.g. BLUETOOTH) using the credential information and/or other data communicated by the power signal 1008. Still further, another embodiment may provide for the communication subsystem 1016 to be enabled to generate modulated power or other signals to communicate to the dock 1020 or other device. For example, as shown by an embodiment of FIG. 10B, two coils may be used on the dock, including one coil that communicates both power and data and another that receives data from the MCD 1010. The communication subsystem 1016 may perform functions of both retrieving data from the modulated data signal and communicating data out to the data receiving coil on the MCD 1010.

In one embodiment, data may also be combined with the power signal 1008 by modulating the power signal. In one implementation, the dock 1020 signals data with the power signal 1008 as a preliminary step to establishing a different wireless communication relationship. In another embodiment, the data signal 1009 may be communicated to or from the MCD separate from the power signal.

While numerous embodiments described above provide for computer systems that utilize inductive signal paths, other embodiments provide for other kinds of transductive signal paths. Such alternative transductive signal paths may use alternative signal carrier mediums. In particular, a transductive signal path may be formed by alternative mediums that carry power and/or data. Such other mediums correspond to (i) a light medium for carrying a portion of a power or data signal as light, (ii) an acoustic medium for carrying the signals as through acoustics.

Dock Enhancements

Figure 11B:
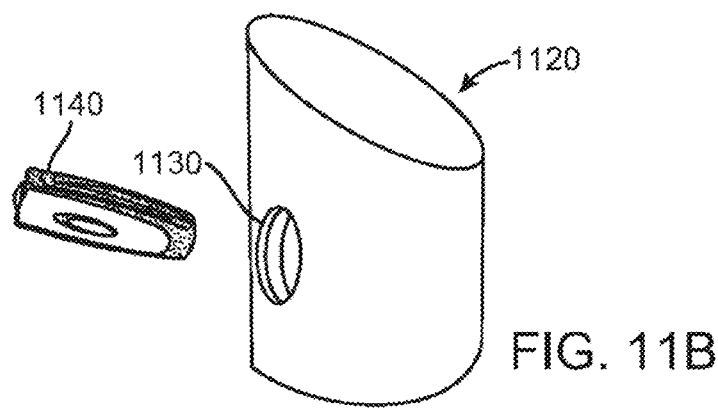
FIG. 11B illustrates an alternative configuration for a docking station, as configured for use with any of the embodiments described above.

FIG. 11B illustrates an alternative configuration for a dock, as configured with any of the embodiments described above. In an embodiment, a dock 1120 may be configured to enable transmission of continuously conductive and/or transductive power or data signals to the MCD. In addition, the dock 1120 is configured to include a receiving structure 1130 for an alternative device that can be used with the dock and/or the MCD. In one embodiment, the receiving structure 1130 corresponds to a slot for receiving a headset 1140, such as a BLUETOOTH enabled headset for enabling hands-free telephony.

Data Pairing and Combined Functionality Applications

Some embodiments recognize that an appropriately configured MCD may be intermittently or selectively paired with the dock in order to enhance the functionality provided through one or both devices. In an embodiment, the operability of the MCD, or applications that execute on the MCD, may be altered when the device is placed in contact with the dock. In another embodiment, some data may be exchanged through the physical contact of the MCD being placed in contact with the dock. This data exchange may enable, facilitate or enhance local wireless communication (or other communication mode) between the two devices. Still further, as an alternative or addition to embodiments described, the orientation of the MCD on the dock may be detectable, and used to enable or configure operations on one or both devices.

Figure 12:
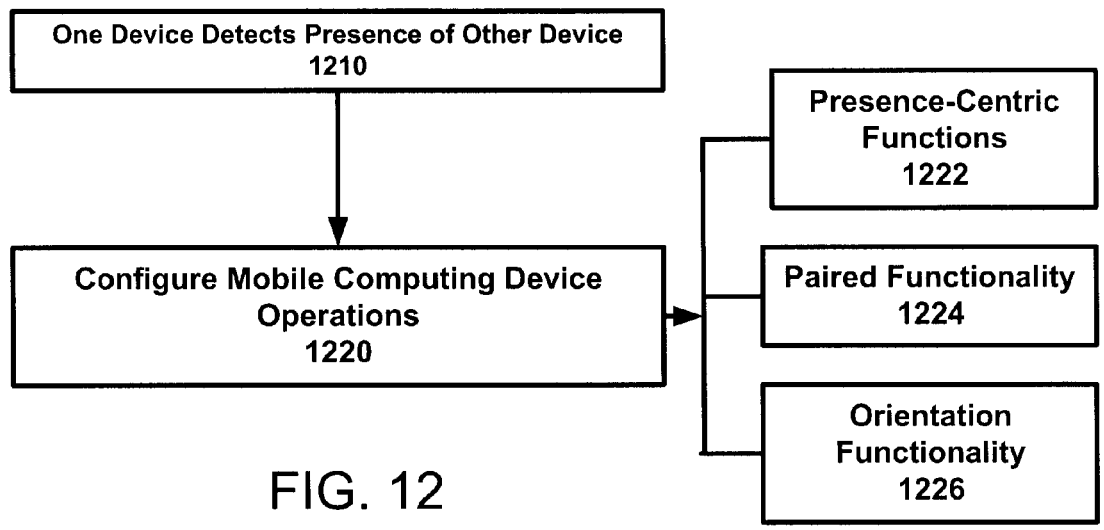
FIG. 12 describes a method for configuring operations of a mobile computing device when it is placed in contact with a docking station, according to an embodiment.

FIG. 12 describes a method for configuring operations of the MCD when it is placed in contact with the dock, according to an embodiment. A method such as described may be performed in whole or in part on a MCD such as described with any of the embodiments provided above. However, in describing an embodiment of FIG. 12, reference is made to elements shown with an embodiment of FIG. 11A, and such reference is intended to be illustrative of components that are suitable for performing a step or sub-step being described.

In step 1210, one device performs presence detection as to whether the two devices are placed in position to be docked. In the docked position, the MCD 1010 (FIG. 13) may receive a power signal from the dock 1020. In one implementation, such presence detection corresponds to either of the two devices being placed in contact with one another, so as to enable an inductive or conductive signal path (depending on the embodiment implemented) for the power signal. In an embodiment in which an inductive signal path is used, docking may be accomplished by two devices being brought in close proximity. As such, in some embodiments in which inductive signal paths are utilized, physical contact is not a requirement for presence detection. One or both devices may be configured to detect a signal resulting from, for example, the MCD 1010 being rested on the dock 1020 (FIG. 13) in an orientation described with any of the other embodiments.

While embodiments provide that either device can perform presence detection, one embodiment provides that the MCD 1010 performs the initial detection and responds accordingly. The response may include communicating back to the dock 1020 (FIG. 13) that the two devices are docked. When the two devices are docked, either of the power or data signals may be received through use of a connector-less medium. Alternatively, sensors or other elements (magnets) signal separately the presence of the other device when the two devices are brought into contact. Once presence of the two devices being in the docked position is detected, removal of the MCD 1010 from the docked position may also be detected. In one implementation, removal of the MCD 1010 from the dock 1020 may be detected by detecting a break in the incoming power signal.

In step 1220, the MCD 1010 configures its operations in a manner that recognizes the presence of the dock (i.e. 'docking' behavior). The MCD 1010 may configure itself in a variety of ways. For example, similar to many conventional approaches, the device may suspend power-saving features or automatically perform data synchronization operations. As an addition or alternative to such configuration steps, the MCD 1010 may perform one or more sub-steps 1222, 1224 and/or 1226, as described below and elsewhere.

In an embodiment, sub-step 1222 provides for performance of presence-centric functions and operations that utilize or combine the functionality, capabilities or access rights of the dock 1020. In one implementation, presence-centric functions and operations enable the MCD 1010 to prioritize settings or modes of use based on detecting presence of the dock 1020. Additionally, one or more embodiments provide that the MCD 1010 performs functions and operations (including mode settings) based on detecting removal of the MCD 1010 from being in contact with the dock 1020. Still further, the dock 1020 may provide access to other resources (e.g. other computers, media devices etc.) and the act of the MCD 1010 docking with it serves as authorization for the MCD to access or use the extended resources provided by the dock 1020. The following usage scenarios provide examples of how sub-step 1222 may be implemented.

Call Handling:

Absent being docked, the MCD 1010 may be configured to enable telephony operations, including enabling the user to answer incoming calls through manipulation of anyone of multiple possible user-interface features present on the MCD. When docked, however, the MCD 1010 may implement a mode that makes specific programmatically implemented assumptions about call handling. These include any one or more of the following: (i) if an incoming call is received while the MCD 1010 is in the docked position, and the user lifts the device off the dock 1020, then the call should be automatically answered; (ii) if the user places the MCD 1010 on the dock 1020 after receiving an incoming call, the MCD either terminates the call or places the call on speaker phone; and/or (iii) if the user answers the call when the MCD 1010 is docked, the MCD 1010 places the call on speaker-phone.

An embodiment such as described above may be extended to accessory devices. For example, as described with an embodiment of FIG. 11B, a headset may be coupled with the dock 1020 to receive a power signal. Either the MCD 1010 or the dock 1020 may be configured to detect (i) presence of the headset, and/or (ii) removal of the headset from the docked position. Such presence detection may be performed by detecting variation or change to the power signal, or by having the headset signal the MCD 1010 (or dock 1020) when it stops receiving power from the dock (signifying it has been removed from its docked position). When an incoming call is received, and the headset is removed, logic on the MCD 1010 may be configured to answer the incoming call using the headset.

Data Synchronization/Exchange:

When presence of the MCD 1010 in the docked position is detected, one or both devices may initiate data exchange or synchronization functions. For example, the MCD 1010 may initiate synchronization operations between itself and whatever computer is connected to the dock 1020. The synchronization operations may seek to reconcile or synchronize records on the MCD 1010 with those on the connected personal computer (or alternatively the dock 1020).

In one embodiment, the mode of communication is at least partially wireless. For example, a local wireless communication medium (such as provided by BLUETOOTH 2.0 or WIRELESS USB) may be used to perform the data exchange between the MCD 1010 and the dock 1020. The dock 1020 may serve as an intermediary or pass-through for the personal computer, so as to acquire and pass data to and from the MCD 1010 on behalf of the personal computer. Alternatively, the MCD 1010 may communicate directly with the personal computer.

In another embodiment, communication mediums other than local wireless communications (such as BLUETOOTH) may be used. For example, data to and from the MCD 1010 may be exchanged over an inductive channel link, which may be integrated or provided with an inductive power signal (e.g. see embodiments of FIG. 6A). In such an embodiment, the dock 1020 acts as a hub for a locally attached personal computer. The dock 1020 is then able to negotiate or otherwise provide data flow with the MCD 1010 over the inductive channel.

Other communication mediums may also be used. As an alternative, the MCD 1010 and the dock 1020 may communicate and exchange data using an infrared (IR) communication medium. In one implementation, the dock 1020 converts the IR communications from the MCD 1010 into, for example, USB type local data transfer protocols.

Media Playback:

When the two devices are detected as being docked, one or both devices may assume operations or a role for the media playback. For example, the user may initiate media playback on the MCD 1010, and the device will then seek to use audio output resources provided on or with (e.g. connected to) the dock 1020. The MCD 1010 may use its own display for graphic or video output when outputting the audio. If media playback is initiated and the two devices are separated, media playback may be terminated. In one implementation, separation may be detected when one or both devices detect termination of the power signal. For example, the MCD 1010 may detect that it has stopped receiving power, and then it may communicate this information to the dock 1020. Alternatively, the MCD 1010 and dock 1020 may each be configured to send confirmation communications until the 'power-break' is detected, in which case the combined functionality (such as the media playback) is terminated.

In an embodiment, sub-step 1224 provides for paired operations or functionality to be performed. Paired functionality means some level of authentication, trust or credential exchange is initiated and completed, followed by activity on one or both devices under the assumption of authentication or trust.

Wireless Data Exchange:

For paired operations or functionality, one embodiment provides that the two devices perform a credential exchange, followed by performance of wireless communications, in response to the MCD 1010 being docked in a manner such as described. Additionally, typical local wireless communication protocols require some data exchange to negotiate two devices before substantive communications is performed. According to an embodiment, when the MCD 1010 is docked (e.g. the device receives a power signal), the device seeks to establish or continue the partnership for subsequent wireless communications with the dock. Thus, embodiments provide that the credential exchange is performed in a connector-less manner, using, for example, a conductive or inductive signal path such as described with other embodiments. Subsequent to the credential exchange, wireless communications are utilized.

As an addition or alternative, the dock and the MCD 1010 may be capable of negotiating a pairing or synchronization with another device. In particular, an embodiment provides that the dock (or alternatively the MCD 1010) can (i) act as a proxy or intermediary to enable the MCD 1010 (or the dock) to be paired with a third device, or (ii) establish a three or multi-way relationship with another device.

With further reference to an embodiment of FIG. 12, substep 1226 provides that the MCD 1010 and/or dock 1020 perform orientation-dependent functions. In one embodiment, the dock 1020 detects the orientation of the MCD 1010 in the docked position and configures its operation or communicates the orientation information to the MCD. In another embodiment, the MCD 1010 detects its own orientation in how it is coupled to the dock. Orientation may correspond to detection of: (i) whether the device is in portrait or landscape mode; (ii) whether the device is in one of multiple possible discrete positions (e.g. north, south, east, west); and/or (iii) the position of the MCD on a continuous arc. Numerous examples of orientation dependent functionality are provided below, as well as elsewhere in this application. Orientation dependent functionality is also described in greater detail below.

Figure 13:
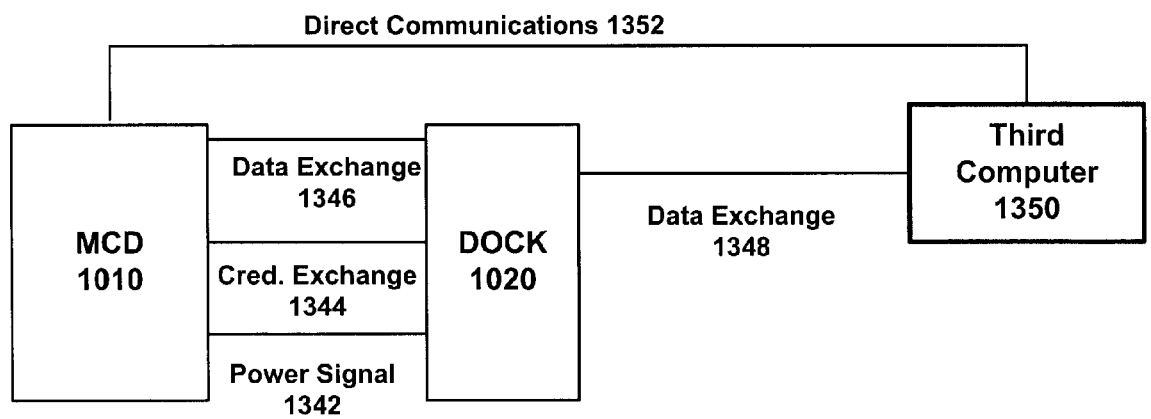
FIG. 13 is a block diagram that illustrates different data exchange operation that may be performed through pairing of docked devices, in accordance with one or more embodiments.

FIG. 13 is a block diagram that illustrates different data exchange operation that may be performed through pairing of docked devices, in accordance with one or more embodiments. As shown by FIG. 13, when the MCD 1010 is placed in contact to receive the power signal from the dock 1020, one or both devices are triggered to initiate negotiations for enabling subsequent local wireless communications. The subsequent local wireless communications may be performed under established industry protocol (e.g. establishment of BLUETOOTH credentials), requiring passage of certain information or data between two devices before communication may be initiated.

If, however, the two devices are unknown to each other, conventional approaches have required that a partnership be established for future data exchanges. Such partnerships typically require use of set-up operations that require manual involvement from the user. For example, conventional BLUETOOTH pairings often require the user to operate one device to wirelessly seek out another, and to provide input on at least one device so that the two devices are 'trusted'. In contrast to such conventional approaches, one or more embodiments provide for configuring the MCD 1010 and/or dock 1020 so that when the two devices are physically docked, some or all of the credential information and negotiations that have previously required manual effort are performed automatically, so as to eliminate or reduce user-involvement. Such automation in the acquaintance and/or pairing of two devices may be enabled because the assumption may be made that the user of both devices is physically present when the two devices are docked (as he must have placed the two devices in physical contact or close proximity). If the two devices are known to each other, the negotiations may mostly require identification of one or both devices. However, while many conventional approaches require manual intervention to establish pairing using local wireless communications, an embodiment provides that one or both devices are configured to automate at least a portion of the credential establishment. In particular, at least some data that is typically entered by the user as part of establishing the BLUETOOTH or other local wireless communication relationship may be passed through inductive or conductive signal exchange. Typically, such data is required from the user for security reasons.

Thus, with reference to FIG. 13, when the two devices are docked, the power signal 1342 may be detected on one or both devices. Subsequently, credential information 1344 is exchanged between the two devices 1010, 1020 for use in enabling subsequent wireless communications. In an embodiment, the credential information 1344 is modulated into the power signal. For example, in an embodiment in which the power signal is inductive, inductive modulation may be used to incorporate the credential information 1344 into the power signal 1342. However, numerous other data communication mediums may be used to pass the credential information 1344. These include, for example, through radio-frequency (RF) identification, local wireless communication protocols (e.g. wireless USB or BLUETOOTH), though infra-red communications, or through acoustic coupling. In the latter case, an acoustic waveform may be modulated on the speaker-phone of the MCD 1010 and received by a microphone on the dock 1020, where it can be processed.

In an embodiment, a data exchange 1346 may be performed between the MCD 1010 and dock 1020 in response to successful use of the credential exchange 1344. The data exchange 1346 may performed over a different medium than the one used to communicate the power signal 1342. For example, the data exchange 1346 may be communicated over a wireless communication port (e.g. BLUETOOTH, Wireless USB, WiFi).

As an addition or alternative, in one embodiment, the dock 1020 may act as an interface or proxy for enabling the MCD 1010 to indirectly communicate with a third device or resource 1350. In such an embodiment, the dock 1020 may exchange data 1348 with the third device 1350 using another connection, such as a local physical connection (e.g. FIREWIRE, USB 2.0) or local wireless link. As another alternative, the MCD 1010 may follow credential exchange 1344 with direct communications 1352 and data exchange with the third computer 1350. Still further, as another addition or alternative, the third computer 1350 may correspond to a resource, such as a network resource (e.g. online server or account) or media station.

Additionally, the credential exchange may establish the pairing to exist beyond the time the MCD 1010 is removed from the dock 1020. For example, the user may place the MCD 1010 on the dock 1020 to receive power and/or the credential exchange. The user may then remove the device and continue to wirelessly communicate to or through the dock using the established credentials. In this way, the docking of the MCD 1010 serves as an authentication event that lasts longer than the duration of the MCD being in contact with the dock 1020.

With further reference to FIG. 13, data exchange or synchronization may be performed between the MCD 1010 and the dock 1020, with the dock acting as an interface for a personal computer or other machine. As an alternative or addition, the data exchange or synchronization may be performed between the MCD 1010 and the dock 1020, rather than indirectly with another computer or machines. Thus, the dock 1020 may hold information or records.

Still further, one or more embodiments also provide that the credential exchange 1344 between the MCD 1010 and the dock 1020 may carry over to other uses of the MCD. Specifically, an embodiment may require the two devices to be docked when credential exchange/pairing is established. An assumption may be realized that the user is physically present, thus the use of the MCD 1010 with the dock 1020 may provide a form of self-authentication. In an embodiment, the dock 1020 may be connected or paired with another computing device or machine. Credentials, permissions, authorizations or other pairing relationship data may be transferred from the dock 1020 to the MCD 1010. Depending on the application, this form of authentication may enable the MCD to (i) communicate with that other machine or computer directly, (ii) perform some operation that requires a certain permission or right, or (iii) access a guarded resource (e.g. decrypt files, provide password substitute etc.).

Still further, since the user of the MCD 1010 may be assumed to be present when the two devices are docked, one or more embodiments may enable the dock to enable some form of user-access or use of another resource. For example, in the case where the dock 1020 is connected or paired to a personal computer as the third computer 1350, the personal computer may be unlocked for a user of the MCD 1010 when the MCD is docked to the station (or for some defined duration thereafter). Thus, the dock 1020 may receive credential information 1344 from the user and verify the identity of the user to unlock the machine. As another example, the dock 1020 may be connected to a television or media output device. When the user docks the MCD 1010 with the dock 1020, the dock may communicate certain information that enables the device to full-fill a role, such as operation of the television set as a remote. The roll may be full-filled even when the MCD 1010 is subsequently de-docked from the station 1020. For example, the dock 1020 may be connected to the television set and placed in proximity to it. At the same time, the MCD 1010 may be configured to include a remote control application for controlling the television set. When the MCD 1010 is docked, the program is unlocked or configured to communicate with the television set, either directly or indirectly through the dock. The ability of the MCD 1010 to operate the application and use it for the television set may remain for a duration after the MCD 1010 is removed from the dock (so that it acts as a true remote).

Orientation Functionality Amongst Docked Devices

With reference to MCD and dock in accordance with any of the embodiments described herein, an embodiment provides that the orientation in which the MCD is placed on the dock is selectable by the user, and that the orientation may determine or configure functionality of either device. For example, the orientation of the device when docked may be selected by the user in order for the user to enter a form of input as to how one or both devices (either combined or independently) behaves.

Figure 14:
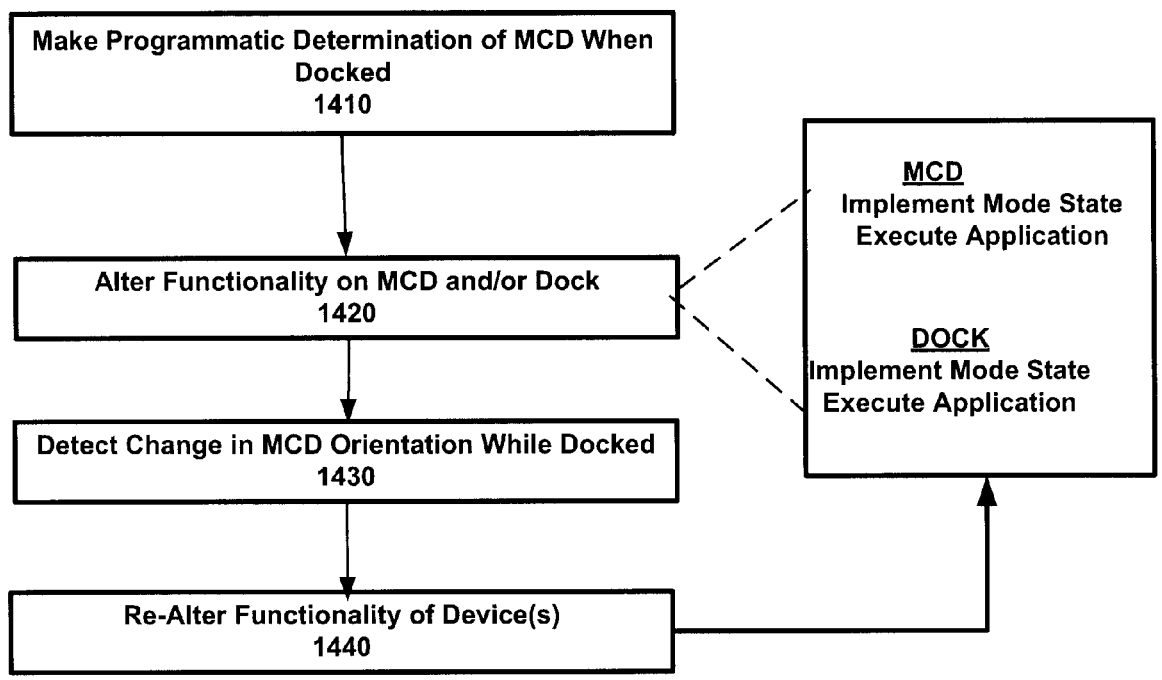
FIG. 14 illustrates a method in which an orientation of the mobile computing device is selectable to affect operations or functionality resulting from one or both docked devices, according to an embodiment.

FIG. 14 illustrates a method in which an orientation of a MCD is selectable to affect operations or functionality resulting from one or both docked devices, under an embodiment of the invention. As a precursor, the dock and/or MCD are each physically configured to enable the MCD to have any one of many possible positions when docked. Numerous physical features or designs may be used to enable the device to have more than one orientation.

Figure 15A:
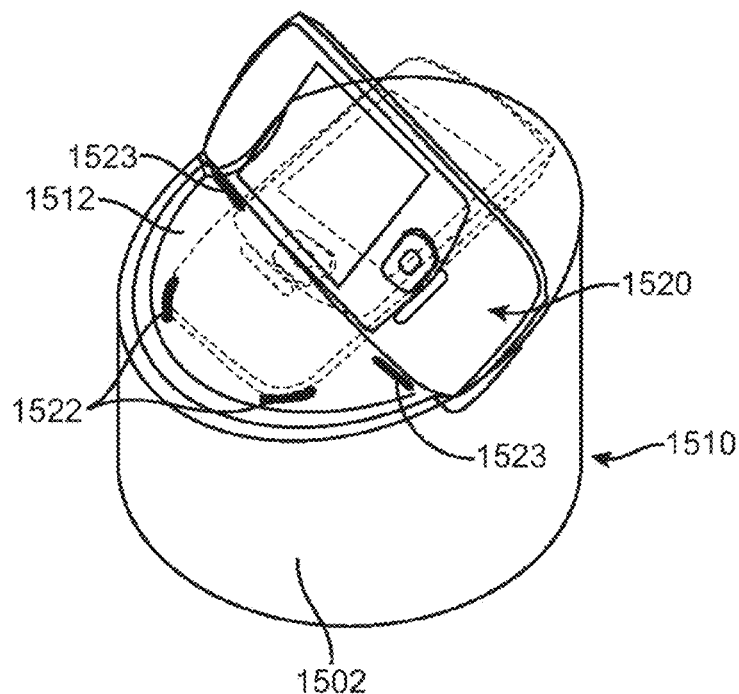
FIG. 15A through FIG. 15C illustrate implementations of structural surface features that may be provided with the mobile computing device and/or the docking station, under different embodiments of the invention.
Figure 15B:
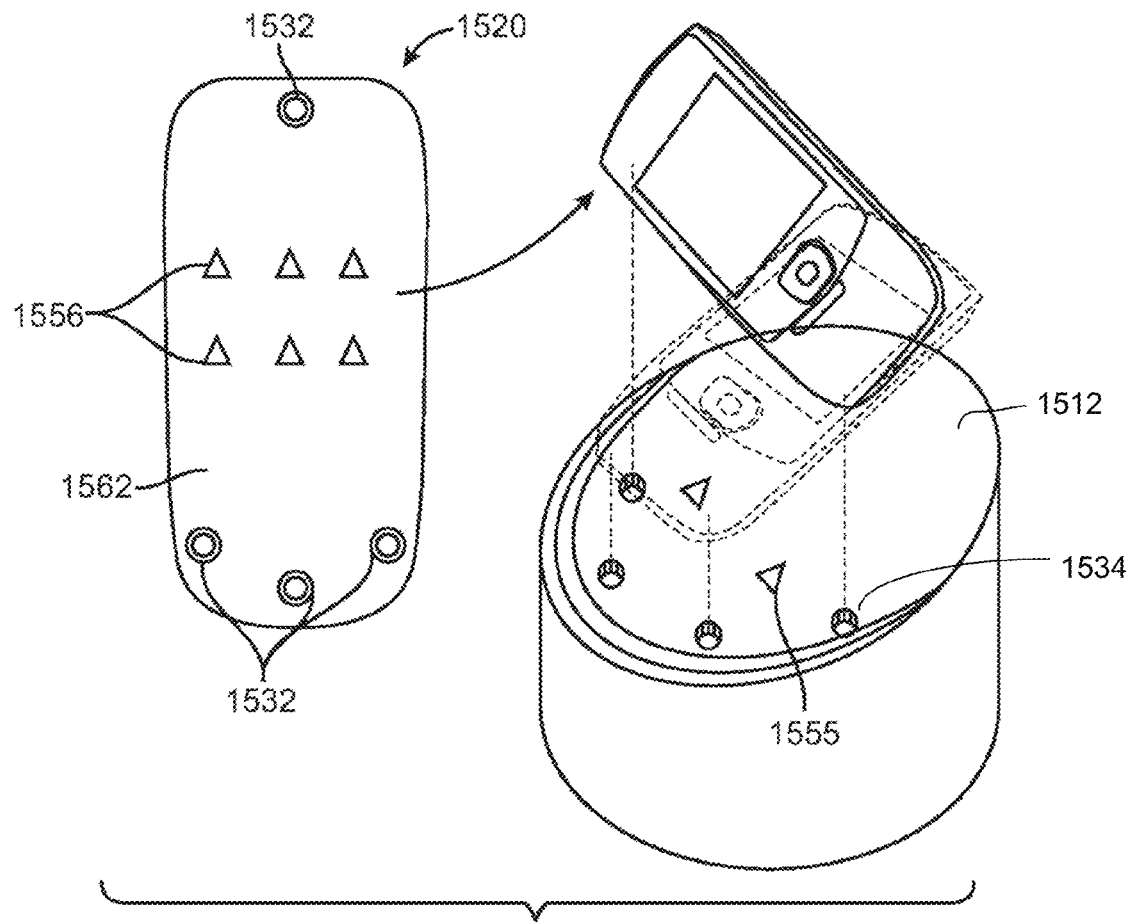
Figure 15C:
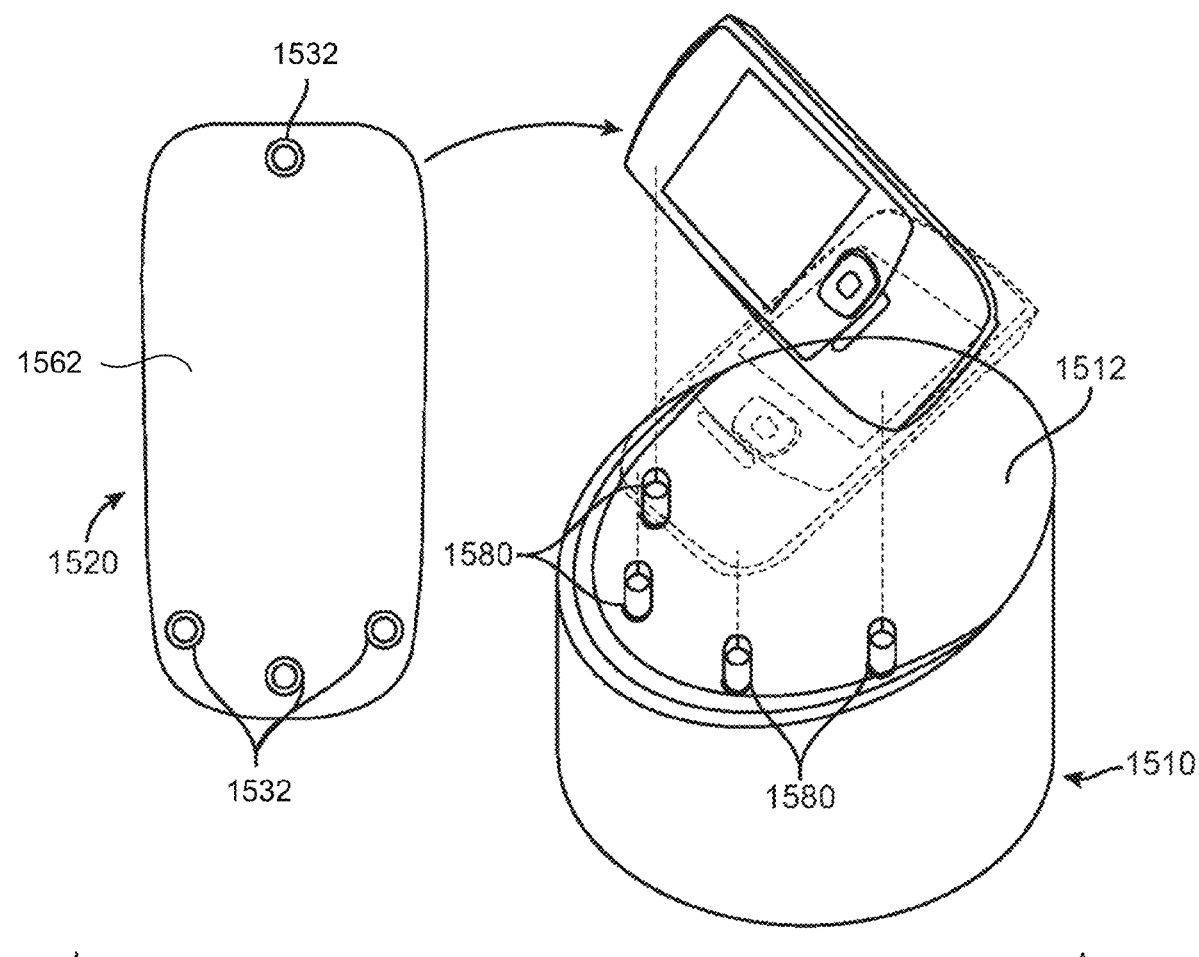

FIG. 15A through FIG. 15C illustrate implementations of structural surface features that may be provided with the MCD and/or the dock, under different embodiments of the invention. In an implementation of FIG. 15A, the dock 1510 may be configured to include a platform 1512 (or receiving surface; see also embodiments of FIG. 7B or FIG. 7C) or shelf so as to receive and support the MCD 1520 in an electrically engaged manner. The platform 1512 may be of any shape, such as elliptical or circular, as shown in FIG. 15A. The platform 1512 may extend from a body 1502 to be partially upright or vertical. One type of mechanical features to support the MCD 1520 in multiple orientations are template structures 1522, 1523. Template structures 1522, 1523 may be provided in different sets. In the implementation shown, a first set of template structures 1522 support the MCD 1520 in the portrait (or lengthwise) docked orientation, while the second set of template structures 1523 support the MCD 1520 in the landscape (or widthwise) docked orientation.

Numerous other types of structural or surface features may be used to enable the MCD 1520 to be docked in any one of multiple positions. For example, the dock 1510 may include cut-outs or recess formations that form template retention structures to retain the MCD 1520 in a selected docked position. As an alternative or variation, surface retention features may be used to hold (or facilitate retention) of the MCD 1520 in position.

In more detail, FIG. 15B and FIG. 15C illustrate another implementation in which surface features may be used to mechanically retain the MCD 1520 on the platform 1512 of the dock 1510. In particular, an embodiment such as shown may provide that the back face 1562 of the MCD 1520 (or alternatively the platform 1512 of the dock 1510) includes surface protrusions 1532. The platform 1512 (or alternatively the back façade 1562) may include aligned retention recessions 1534. Two or more sets of protrusions 1532/recessions 1534 may be provided to enable the MCD 1520 to be docked in alternative positions (e.g. portrait or landscape). For example, the platform 1512 may be configured to include indentations that align to receive corresponding protrusions 1532 on the back face 1562 of the MCD 1520. The back face 1562 may include alternative formations to enable the MCD 1520 to be docked in either the landscape or portrait mode.

FIG. 15C illustrates another variation in which the platform 1512 of the dock 1510 includes a set of insertive clasps 1580 which may secure into corresponding receiving apertures on the back face 1562 of the MCD 1520. As with previous embodiments, the back face 1562 may include different sets of apertures to enable the device to have alternative docking positions. The clasps may be implemented in any one of many ways. For example, each clasp 1580 may be implemented in the form of opposing tongs that bias when pushed towards one another. When biased, the tongs may be inserted into one of the apertures, where they release and retain. In one implementation, different sets of mechanical clasps may serve to retain the MCD against the dock in portrait or landscape mode.

While mechanical retention features are described with FIG. 15A through FIG. 15C, other embodiments described below utilize magnetic clasps or magnetic retention features. In one embodiment, the dock 1510 includes an arrangement of magnets which retain metal elements in the back face 1562 of the MCD 1520. Embodiments described below describe various other arrangements of magnets which may be combined with one or both devices to retain the two devices in alternating docked positions.

A method such as described with FIG. 14 may be described in context of elements described with other figures, and specifically of FIG. 15A through FIG. 15C. Accordingly, reference may be made to elements of those figures for purpose of illustrating suitable elements for performing a step or substep being described. In step 1410 (FIG. 14) provides that a programmatic determination is made to detect an orientation of the MCD 1520 when rested or mounted onto the platform 1512 of the dock 1510. In one implementation, resources on one or both devices may detect the orientation of the MCD 1520, and then respond accordingly. The following illustrate implementations: (i) the MCD 1520 may utilize sensors to detect its own position, then configure its operations (and optionally communicate with the dock 1510) as to the configuration or operations performed; (ii) the MCD 1520 may use detectors that detect alignment with corresponding elements on the docking station, and based on which detectors make contact, determine its own orientation; (iii) the dock 1510 may detect the MCD's position and communicate the position back to the MCD 1520; and/or (iv) the dock 1510 detects information using alignment contacts (see item (ii)) or sensors (e.g. optical sensors) that is then communicated to the MCD 1520 where it is used to detect orientation on the MCD. Thus, for example, under one embodiment, the MCD 1520 includes a sensor or sensor arrangement (e.g. accelerometer) to detect its own position. As another example, the MCD 1520 may include sensors or detectors that detect contact with the dock. Depending on which detectors are active, the orientation may be determined. Similar arrangements may be provided as an alternative or addition on the dock.

Resources for performing orientation detection may vary, depending on implementation or variation. In an embodiment, metal contacts may be provided on the platform 1512 of the dock 1510 and on the back face 1562 of the MCD 1520. For example, optionally, metal contacts 1555 on the platform 1512 align with corresponding contacts 1556 on the MCD 1520. The determination of the docked position may be reflected by which contacts are energized on one or both devices. In one implementation, the same contacts for establishing the continuously conductive signal path between the dock and the MCD may be used to identify the orientation of the MCD in the docked position. For example, the position of the MCD may be reflected by the pattern of metal contacts that are actually in use (or not in use) to pass power or data between the devices.

As an alternative, the MCD 1520 may utilize an accelerometer to determine the tilt and thus the position of the device. As another alternative, magnetic reed switches or Hall effect switches may be provided on the dock to sense the presence and/or orientation of the MCD. Such an implementation may be facilitated when magnets are also used to retain the two devices in the docked position.

In step 1420 (FIG. 14), functionality of one or both devices is altered by the detected orientation of the MCD 1520 (FIG. 15A) placed on the dock 1510 (FIG. 15A). In an embodiment, one or both of the docked devices includes resources to select, alter or otherwise configure functionality on one or both devices based on the detected orientation of the MCD when docked. In one embodiment, a processor of the MCD selects or otherwise configures one or more operations that are to be performed based on its determined docking configuration. On the MCD 1520, the alteration of the functionality may correspond to, for example, (i) execution of an application or set of instructions, (ii) implementation of a hardware and/or software-based mode setting. Likewise, on the dock 1510, similar operations/steps may be performed. When docked, the orientation of the MCD may be serve to configure functionality of the respective docked devices to operate independently of the other docked device, or to combine/share functionality or resources. Numerous examples are recited below.

Optionally, step 1430 (FIG. 14) provides that the MCD's position on the dock may be altered after the device is docked. In an implementation when, for example, retention and/or mechanical features are used to retain the two devices, the user may move the MCD from, for example, the portrait position to the landscape position. In another implementation when magnetic clasps are used to retain the two devices together, the MCD may be moved from the portrait position to 45 degrees of vertical, the landscape position, or one or more positions in between.

In an embodiment, step 1440 (FIG. 14) provides that functionality of one or both devices is re-altered by the detected orientation of the MCD 1520 docked on the dock 1510, in a manner such as described with step 1420.

As an alternative or variation, the orientation may be altered by removing the device. But the docking action establishes a pairing between the devices that extends to a first instance of the MCD being docked in a first position, then removed and re-docked in a second position.

The following examples are illustrative of how embodiments may be performed to implement states, modes or functionality (either independently or cooperatively) on one or both devices in the docked position. Different states for the device and dock (depending on the device position/orientation). As the orientation or manner in which the device is controlled is user-controlled, the state/mode or functionality of the device(s) may be controlled by the user through manual positioning or orientation of the MCD on the dock.

In one implementation, two orientations may be possible (e.g. landscape versus portrait), and the user's selection of, for example, one state or another is communicated through the selected orientation. For example, the device state for either of the docked devices may be selected by the user simply setting the back face of the MCD on the receiving surface in either landscape or portrait mode. As another example, the user can set the MCD 1520 down in a portrait position to implement a first functionality, such as the display of a large clock, information from a pre-selected or designated internet site (e.g. weather), or images from a photo-album. The user may alternatively place the MCD 1520 down in the landscape position, to implement another one of the functionalities or modes/states. For example, when the MCD is placed in the landscape mode on the dock, the MCD may display a calendar or so-called 'Today' screen.

In one embodiment, the user can switch the position of the MCD 1520 while it is in the docked position. Still further, the changing of the device while being in the docked position may in and of itself be a special type of input. For example, the user altering the orientation of the MCD while docked may signify a state change that is different than had the user originally placed the device in the dock 1510 in the new position.

According to one or more embodiments, the MCD 1520 is a telephony device in that it is capable of receiving incoming calls (e.g. over cellular connection) or placing outgoing calls. In such embodiments, the selected orientation of the device on the dock may affect call handling routines and functionality. In one implementation, the call handling of the device can change when docked—for example if the MCD 1520 receives an incoming call while docked, the device may configure itself to (i) enable the call to be answered or handled easily without de-docking the device, and (ii) enable the user to leverage resources or capabilities of the dock for use in connection with the incoming call or related tasks. For example, the user may be enabled to lightly tap a display of the MCD in order to direct the MCD to enter speaker-phone mode (without dislodging the device from the dock 1510), and optionally use the speakers of (or attached to) the dock.

As another illustration, the device may be configured to enable media playback through the dock 1510. But in call handling mode, the speaker phone mode may automatically suspend any music which is playing on the device, to permit the user to place or answer a call.

As another alternative or additional feature, when the MCD 1520 is docked in a particular orientation, the MCD 1520 may be triggered to perform or display information such as: (i) Internet or network content, such as stock, weather or news; (ii) provide a clock; (iii) display slide show of pictures or images; (iv) display calendar or task lists or event list; or (v) provide generic personalized displays by them, such as for 'work', 'personal' or 'finance'. Still further, state information may be implemented, such as by way of reducing the power consumption and/or switching select components of the device off. For example, when the device is docked, one or more components (display, cellular radio, GPS radio) may be switched on (or alternatively off). As mentioned, the position of the MCD 1520 on the dock may determine the function, state or mode of operation that the device has.

Still further, as another alternative or addition, an orientation of the MCD may be used to indicate a presence or status of the user to receive online or other forms of communications. For example, the user may correlate the orientation of the MCD with an online status for receiving Instant Messages or text messages (e.g. landscape mode means the person is away, while portrait means the person is available to respond or online). Likewise, orientation may be used to determine whether the user is willing to accept incoming phone calls, or whether incoming phone calls should be transferred to voicemail or elsewhere. Still further, a message reply functionality, such as enabling text-message reply to an incoming call, may be switched on, off or configured based on the orientation of the MCD on the dock.

In an embodiment, the position of the MCD 1520 on the dock may also affect the state or functions performed by the dock 1510. As examples, the orientation of the MCD 1520 in the dock may signal the dock to connect to a particular computer via a wireline (e.g. Universal Serial Bus) or wireless connection. As an alternative or addition, the dock 1510 may wirelessly and/or through wireline connect to more than one computer or device. The orientation of the MCD 1520 when docked may act as a form of selection input to enable the user to select one computer over another to communicate with or access, via the dock or through credential information received from the dock.

Other examples of functions or mode-settings that may be triggered or otherwise selected from the position of the MCD on the dock include: (i) media playback (audio or video) via a particular input source (e.g. analog input, streaming, wireless communications, via USB or FIREWIRE connector); (ii) media output through dock connections (e.g. dock may be connected to speakers or to large display device); (iii) music streamed from device; (iv) wired keyboard/mouse could be connected to the dock and enabled for use with the MCD when selected.

As mentioned, the user's action corresponding to altering the orientation of the MCD 1520 when docked may in and of itself serve as a form of input. For example, when the device has one orientation, one functionality is enabled or selected for one or both devices, then when the user rotates the device on the dock to a new position, the user interface can switch to a default setting. The user can then change the orientation of the MCD 1520 back to an original position (or to a third position) in order to (i) resume, for example, a previous functionality or mode setting, (ii) perform a new function or achieve a new mode setting.

Device Block Diagrams

Figure 16:
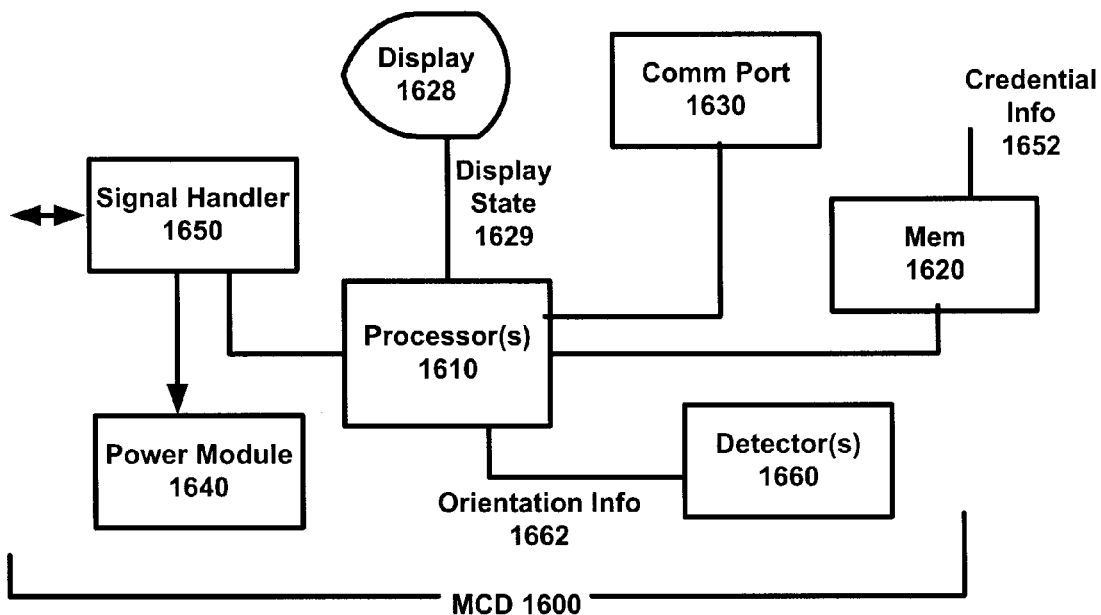
FIG. 16 is a simplified block diagram of a mobile computing device, in accordance with one or more embodiments.

FIG. 16 is a simplified block diagram of a MCD, according to an embodiment. A MCD 1600 may be configured to include any of the functionalities or capabilities described with other embodiments, including the ability to receive electrical signals (power and/or data) using conductive or inductive signal paths. Thus, as mentioned with other embodiments, the MCD 1600 may correspond to, for example, a 'smart phone', a mobile companion, a media player, a digital camera, or a GPS unit (or to a multi-function device that can perform as many of the devices described).

More specifically, one or more embodiments provide that the MCD 1600 may correspond to a mobile telephony/data messaging computing device, such as a cellular phone or mobile device with voice-telephony capabilities (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Other examples of functionality that may be provided from the MCD 1600 include audio and/or video playback or Global Positioning Services (GPS) as primary or enabled functions. The MCD 1600 may have numerous types of input mechanisms and user-interface features, such as keyboards or keypads, multi-directional or navigation buttons, application or action buttons, and contact or touch-sensitive display screens or buttons. In the case of data messaging/communication devices, specific types of messaging or communications that may be performed includes messaging for email applications, Short Message Service (SMS), Multimedia Message Service (MMS), and proprietary voice exchange applications (such as SKYPE). Still further, the MCD 1600 may correspond to numerous other types of computing devices, such as to a notebook computers, an ultra-mobile computer, or a personal digital assistant.

According to an embodiment, the MCD 1600 includes one or more processors 1610, memory resources 1620, a display assembly 1628, one or more communication ports 1630, and a power module 1640. In an embodiment, the MCD 1600 includes a signal handler resource 1650, which includes hardware and logic for accepting and/or transmitting power or data signals using any of the signal paths described with previous embodiments. As another option, the MCD 1600 includes one or more detectors 1660 (or sensors) for detecting orientation or position of the MCD 1600 when the device is docked to the accessory device.

The processor 1610 may include or communicate with the signal handling resource 1650 to enable some or all of the signal handling capabilities for enabling receipt or transmission of signals using signal paths such as described with embodiments described above and elsewhere. The communication ports 1630 may include wireless or wireline ports. Wireless communication ports may be implemented through, for example, local wireless communication protocols such as provided by BLUETOOTH standards, Wireless Fidelity (802.11(b) or (g)). The wireless communication ports may also communicate over a cellular network. More specifically, the MCD 1600 may include one or more wireless communication ports to provide wireless connectivity of a particular type (or types) for purpose of carrying out any one or more types of wireless operations. For example, the communication port 1630 may include or correspond to (i) a Wide Area Network (WAN) radio module for sending and receiving cellular voice/data, (ii) a local wireless communication port such as Bluetooth or wireless USB, (iii) an infrared port, (iv) a Global Positioning System radio, and/or (v) a WiMAX radio.

The memory resources 1620 may, for example, include Flash memory, Random Access Memory, and/or persistent memory (i.e. ROM). The memory resources 1620 include instructions and data for implementing functionality and programmatic actions such as provided with any of the embodiments described. Optionally, the memory resources 1620 may carry databases or data stores of records that contain active data items (such as described above) for synchronization or communication with a primary computer, and/or enable actions on such data items of saving the data items.

According to an embodiment, the signal handler resource 1650 includes hardware for receiving or transmitting a power signal and/or a data signal (either modulated or combined as one signal) to and/or from the dock. In an embodiment in which the power or data signal is conveyed through a continuously conductive signal path, the signal handler resource 1650 includes circuitry, such as a recharging circuit and/or elements to treat incoming signal. In an embodiment in which the power or data signal is conveyed through an inductive signal path, the signal handler resource 1650 includes one or more coils and various hardware elements/logic for converting inductive modulations into current. Additional details of components and elements for signal handler resource 1650 to enable an inductive signal path is detailed with various embodiments described above. In one embodiment, the signal handler resource 1650 is configured to receive a power signal for purpose of either powering other components (e.g. display assembly 1628) of the MCD 1600, or to recharge the battery of the power module 1640. In one implementation, the incoming power signal may be treated using circuits and components that are separate from a central processor of the MCD 1600. Thus, processor 1610 may include more than one unit or resource. In one implementation, for example, the MCD 1600 includes both a signal processor (which may be incorporated with the signal handler 1650) and a central processing unit (CPU).

As an addition or alternative, the signal handler resource 1650 may extend or transmit a power signal to the attached accessory device (e.g. to the sticky device shown with FIG. 34) using charge stored in the power module 1640.

As described elsewhere, an embodiment provides that the MCD is configured to use the signal handler resource 1650 to convey and/or receive some data that enables subsequent communications between the devices. This data may include credential data 1652, which enable subsequent wireless communications using, for example, a local wireless communication link via one of the local wireless communication ports 1630. The credential data 1652 may be stored within a portion of the memory resources and made available to the processing resources for inclusion or use with functions performed by the signal handling resource 1650. In one embodiment, the signal handling resource 1650 is capable of communicating at least some of the credential data through a modulated power signal. As an addition or variation, the signal handling resource is capable of recognizing or using the credential data 1652 to identify and pair with the dock.

As described with embodiments of FIG. 14 and FIG. 15A through FIG. 15C, the MCD 1600 may be configured to detect information about its orientation when it is placed on the dock 1510 (see FIG. 15). In one embodiment, the detectors 1660 are provided in the form of sensors that independently detect the orientation of the MCD 1600. For example, the detectors 1660 may correspond to accelerometers or vertical position sensors that detect the orientation of the MCD 1600 at any given instance. In another embodiment, the detectors 1660 sense or communicate data or signals to electrical or conductive pads that are positioned on an exposed surface of the dock. Thus, the position of the MCD may be detected by determining which detectors 1660 and/or sensors or conductive pads are in contact when the two devices are docked.

Information identifying the orientation of the MCD 1600 when docked may affect various operations or modes/states of the MCD and/or its components. The detectors 1660 may signal or communicate the orientation information 1662 to the processor 1610 of the MCD. In one implementation, for example, the processor 1610 is configured to use the orientation information 1662 to signal a display state 1629 to the display assembly 1628. The display assembly 1628 may, for example, be switched between portrait and landscape mode in response to the signal.

Figure 17:
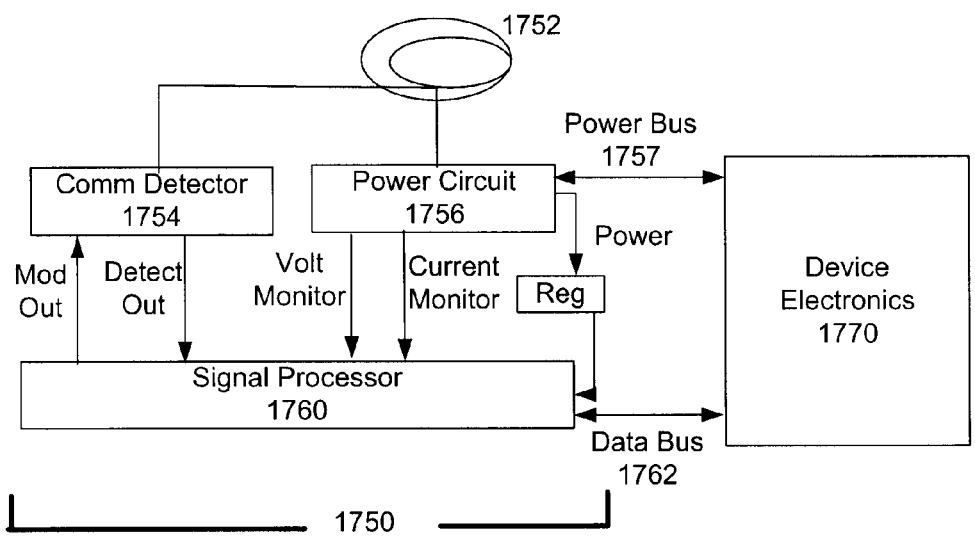
FIG. 17 is a simplified block diagram of a mobile computing device configured to have a signal handing resource that is capable of receiving and/or communicating signals through an inductive signal path, under an embodiment.

FIG. 17 is a simplified block diagram of an MCD configured to include a signal handing resource that is capable of receiving and/or communicating signals through an inductive signal path, under an embodiment. The MCD may include a signal handling resource 1750 for receiving or communicating power and data through induction. The signal handling resource 1750 may correspond to the corresponding element described with an embodiment of FIG. 16.

In an embodiment, the signal handling resource 1750 includes one or more coils 1752 that form a terminal of a corresponding inductive signal path. Additionally, the signal handling resource 1750 includes detect and conditioning circuits 1754, power circuits 1756 and a signal processor 1760 (or processing resources) for handling incoming and outgoing signals using the inductive signal path.

Among other functions, an embodiment provides that the signal processor 1760 implements a data protocol by which data may be communicated and/or interpreted through the inductive signal path, enabled in part through the coil 1752. The signal processor 1760 may also act as a control for receiving/communicating power. To this end, it may enable power circuits 1756 which treat the incoming signal path. The signal processor 1760 may monitor voltage and current at various points of the power circuit and control adjustments as necessary. The power circuits 1756 may supply power across a power bus 1757 to device electronics 1770, to power the components independently and/or to recharge the battery of the device. The signal processor 1760 may use data bus 1762 to exchange data with another processing resource (e.g. CPU) of the device. This data may correspond to, for example, credential information, or the information regarding data received from the dock (e.g. confirmation of credential information exchange).

Additionally, the MCD may be configured to combine detectors 1754 to detect and signal information from corresponding pads or contacts positioned on the dock. The signal processor 1760 may detect which detectors 1754 change states as a result of contact with corresponding elements on the dock. This information may be signaled across the data bus 1762 as orientation information. As described with an embodiment of FIG. 14, the orientation information may affect states, modes or operations of one or more components of the device electronics.

The signal processor 1760 may perform various other functions. In one implementation, the signal processor 1760 monitors voltage and current levels of the power circuits. The signal processor may also receive power voltage via an intermediate regulator form the power circuits 1756.

Figure 18:
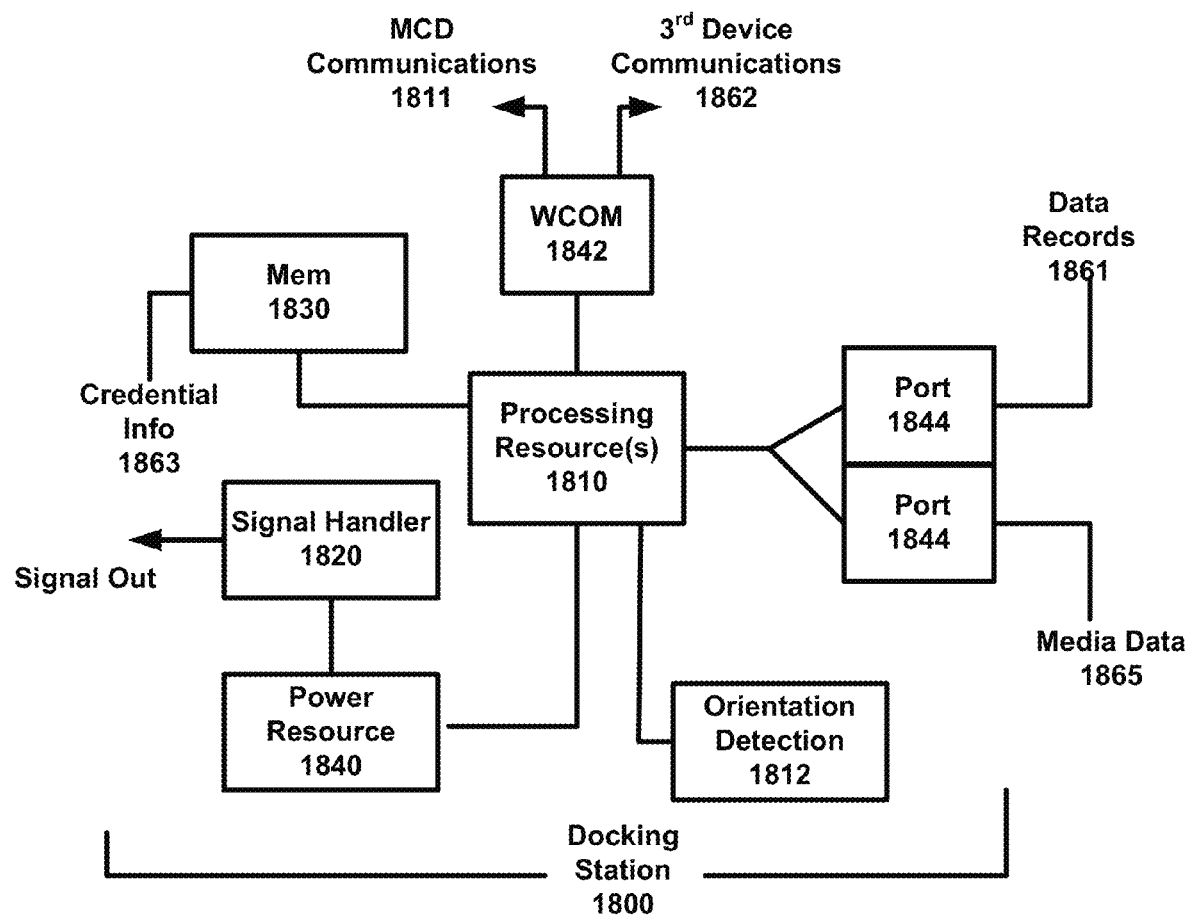
FIG. 18 is a simplified block diagram of a docking station, in accordance with one or more embodiments.

FIG. 18 is a simplified block diagram of a dock, under an embodiment. The dock 1800 may correspond to any of the docks described with other embodiments herein. In particular, a dock as described may be used to implement (depending on the embodiment) a conductive or inductive signal path for communicating power and data with a MCD such as described with FIG. 17. In an embodiment, the dock 1800 includes processing resources 1810, a signal handler 1820, memory resources 1830, and a power resource 1840. The dock 1800 may also include one or more communication ports, including a wireless communication port 1842 and/or one or more wireline communication ports 1844.

The processing resources 1810 may enable intelligent operations, such as authenticating or pairing with the MCD 1700 (see FIG. 17) (e.g. over a wireless link) and/or data sharing/synchronization operations (with MCD 1700). In one variation, the dock 1800 is also capable of interfacing with a computing resource (e.g. other device or computer) to enable synchronization or data sharing operations between the MCD 1700 and third device, or between the dock and the third device. In an embodiment, the processing resources 1810 may correspond or include a signal processor which is able to receive or transmit data through modulations in the power signal.

In an embodiment in which a continuously conductive signal path is used, the signal handler 1820 includes circuits and elements for enabling a conductive contact with corresponding elements on the façade of the MCD. Additionally, one embodiment provides that the signal handler 1820 may signal data with power by modulating the power signal that is conductively transmitted. In an embodiment, the data signal may also be communicated through the signal handler 1820 using an independent and continuously conductive signal path.

In an embodiment in which an inductive signal path is used, the signal handler 1820 includes circuits and elements for enabling an inductive coupling with corresponding elements residing within a panel or housing of the MCD. The signal handler 1820 may include one or more coils for transmitting and/or receiving power or data. As described, the power signal communicated through the magnetic coil may optionally be modulated in a manner that carries or communicates data. Thus, the signal handler 1820 may communicate or receive data using a power signal carried over an inductive signal path.

The power resource 1840 may handle power received through a standard outlet. As an alternative or addition, the power resource 1840 may draw power from another computing device. Still further, the power resource 1840 may include batteries that provide power for the dock and other devices.

The wireless communication ports 1842 may be provided in the form of a standardized port, such as defined by the BLUETOOTH 2.0 or WIRELESS USB standards. The physical ports may also be standardized, such as provided by USB or FIREWIRE standards.

Optionally, the dock 1800 includes an orientation detection mechanism 1812 that may detect the orientation of the MCD in the docked position. As an addition or alternative, the orientation detection mechanism 1812 detects whether the MCD is present (i.e. docked). As described with other embodiments, the orientation detection mechanism 1812 may use information that is indicative of the orientation of the MCD in the docked position to perform or configure a state or mode or operation. Alternatively, the dock 1800 may communicate the orientation information to the MCD.

Among possible functions that the dock may perform, the dock may send or receive wireless communications 1811 with the MCD. Such communications may accomplish various tasks or operations, including (i) synchronization or communication of data files or records 1861 (e.g. synchronize contacts and emails), (ii) establish a paired relationship with the MCD for subsequent operations using credential information 1863 and device communications 1864, (iii) establish a paired relationship between the MCD and a third computing device connected to the dock (e.g. enable BLUETOOTH or wireline communication with attached personal computer), (iv) serve as a pass-through or data interface with another device (e.g. television of display screen) by forwarding communications 1862 to a third computer (e.g. personal computer or laptop), and/or (iv) exchange of data to share or provide resources or extend functionality of the MCD (e.g. enable playback of media data 1865 residing on the device by routing audio to speakers connected to dock).

One primary purpose that the dock 1800 may serve is to recharge or power the MCD using power communicated through the signal handler 1820. Still further, an embodiment provides that the dock 1800 detects an orientation of the MCD and then communicates the orientation information to the MCD.

While an embodiment of FIG. 18 is descriptive of an accessory device that corresponds to a dock, it should be apparent that other forms of accessory devices may include similar components or functions. For example, as described with an embodiment of FIG. 34, an accessory device may be provided in the form of a "sticky-back" device. Such a device may use, for example, the signal handler 1820 to conductively or inductively receive power or data. Such a device may also perform wireless communications with the MCD to synchronize records, perform media playback and/or otherwise share other forms of data (e.g. provide GPS data, receive images etc.)

Thus, with the examples recited, an embodiment provide that the MCD 1700 (see FIG. 17) may be configured to (i) receive power from an accessory device, such as a dock 1800, and/or (ii) perform wireless communications with the accessory device (i.e. dock 1800 or other device) using a local wireless communication port. As an addition, the MCD may use the power signal or the connector-less medium (as described with continuously conductive or inductive signal path) to exchange and perform programmatically at least some of the steps to authenticate or authorize the wireless pairing and communication. In some cases when, for example, the accessory device requires power, the MCD may supply the power, using, for example, the inductive signal path such as described with other embodiments.

Magnetic Clasping

Numerous embodiments described herein provide for a MCD that electrically couples to a dock through surface contact. In such embodiments, there is an absence of connector forces or mechanisms that are traditionally used to retain a device against a dock. For example, one conventional design provides for portable computing devices to integrate connectors into surface edges of the device. The devices may then be placed onto a receiving surface of a docking station so that the device's connector (usually female) receives the extended connector from the dock. These conventional device-to-docking designs require users to align the devices so that the connector ports of the computing device and dock are in alignment. In addition to requiring efforts from a user to align and then insert the device onto the appropriate region of the dock, the manner in which the connectors of the device and dock mate must consider forces that fatigue or break connectors as a result of weight or withdrawal of the computing device from the dock. Additionally, such connectors can occupy significant thickness and dimension in the housing of the MCD.

It should be noted that on a most simple level, magnetic clasping between an MCD and any of the dock or any other device, may be performed to simply retain the MCD against the dock (e.g. cradle) or other accessory device (e.g. modem). Thus, some embodiments provide that magnetic clasping, as described with any of the embodiments herein may be used to simply retain one device against the other. More specifically, some embodiments include distributing magnets and ferrous materials between MCD and dock (or other coupled devices) in order to enable retention of the two devices together. Various configurations for implementing magnets and ferrous material on the MCD and/or dock may be utilized in accordance with embodiments described with, for example, FIG. 19-34. Features such as orientation manipulation, optionally combined with orientation detection may also be included in connection with magnetic clasping. In some embodiments, these and other features may provide for incorporation of magnetic clasping and/or orientation placement and/or detection without signal communication (inductive or otherwise). Other embodiments may provide for the inclusion of inductive or conductive signal transfer with magnetically coupled devices. Numerous other variations and combinations described elsewhere in this application may also be implemented.

In contrast to these and other conventional approaches, embodiments described herein enable a connector-less coupling that physically restrains the MCD against the dock, while enabling transmission of power and/or data between the devices. In particular, embodiments described herein facilitate the user's involvement in docking the MCD with the dock, by enabling the user to perform a simple action of placing the MCD on a receiving surface of the dock. The user is not required to make effective a mating of connectors between the MCD and the dock. Thus, requirements of the user to align contact elements or slots is reduced or eliminated. The user does not have to align connectors or force mechanical connections between connectors of the dock and MCD. Moreover, mechanical issues relating to fatigue or breakage of the connectors is eliminated.

The placement of a portable or MCD onto a dock may be passive or active, depending on design and implementation. In a passive surface mating scenario, gravity is the primary force that holds the device in position, so that appropriate surfaces on the MCD are in contact with corresponding points of the dock. In particular, embodiments provide for the retention of the MCD and the dock to be effective using any one or more of (i) mechanical retention using support structures and/frictional pressures (with gravity or other forces), (ii) mechanical clasping, and/or (iii) magnetic fields or clamping.

As described previously, mechanical retention may be provided by ledges, platforms, shelves or other surface features. The mechanical retention may be aided or enabled with features for creating frictional pressure. Specifically, frictional pressure may be facilitated by surface features provided on the MCD or dock (e.g. see FIG. 15B). Surface features, such as indents, bumps, and/or ledges may be used to align and hold the MCD in position on the receiving surface of the dock. Surface features may also be used to enhance electrical contact between the MCD against the docking.

As an alternative to mechanical retention features, magnetic clasping may be used to firmly grip two devices together in anyone of multiple possible or desired positions. Moreover, magnetic clasping enables the user to simply place the MCD onto the receiving surface of the dock.

According to an embodiment, magnets may be combined with the dock (or optionally with the MCD) in order to clasp the two devices together when docked. Such magnetic clasping may offer several benefits, including the ability to enable the orientation by which the MCD is docked to be altered. As described elsewhere, some embodiments provide that the orientation of the MCD on the dock may be used to affect the state, mode or functionality of the MCD and/or dock. Additionally, magnetic clasping amongst the devices may enhance the ability to enable connector-less signal exchange between the MCD and the dock, as the MCD may simply be placed on the dock for retention. Thus, under one implementation, when place within a certain allowable area, the magnets will pull the device into the proper position for the connector-less signal exchange and charging.

Figure 19:
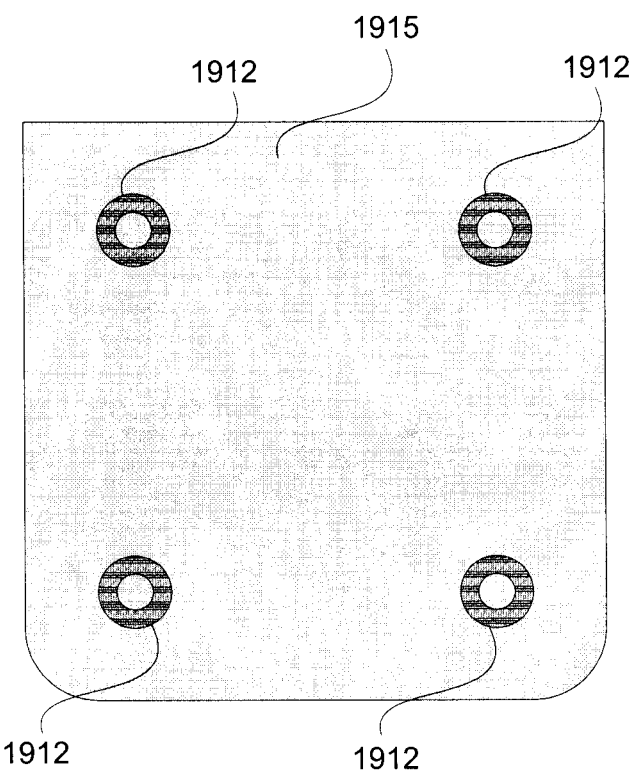
FIG. 19 depicts a configuration for a back face of a mobile computing device, under an embodiment.

FIG. 19 depicts a configuration for a back face of a MCD, under an embodiment. In one embodiment, a housing surface (i.e. back façade 1915) of the MCD is provided with material that is attracted to magnetic materials. However, to enable the device to be portable and unaffected, an embodiment provides that no magnetic material is provided on the MCD (so as to avoid, for example, collection of debris). Rather, an embodiment provides that the back façade 1915 of the MCD includes ferrous tabs 1912. The ferrous tabs 1912 may be provided on or near an exterior of the rear façade 1915. For example, some ferrous material may be combined with a thickness of the housing shell, or glued to an exterior of the housing shell. Various spatial arrangements may be provided for the ferrous tabs 1912. For example, the distribution of the ferrous tabs 1912 may correspond to various geometric shapes. Alternatively, a portion of the back face 1915 may include a ferrous layer or thickness.

Figure 20:
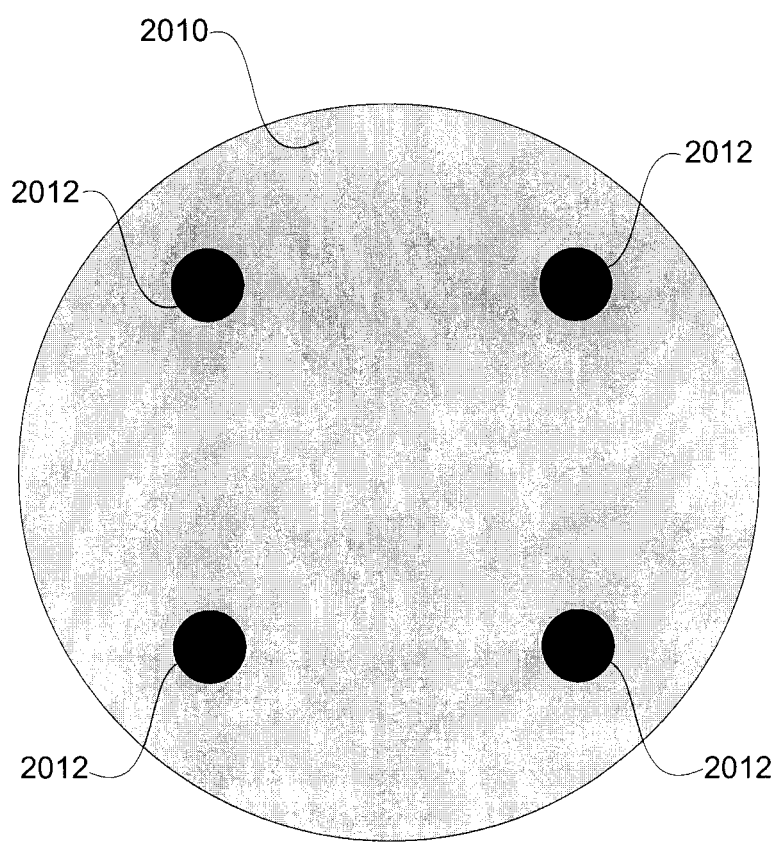
FIG. 20 depicts a top view of a receiving surface for a docking station that includes an arrangement of magnets, under an embodiment.

FIG. 20 depicts a top view of a receiving surface for a dock that includes an arrangement of magnets. In an embodiment, a receiving surface 2010 of the dock includes an arrangement of magnets 2012. In this way, the receiving surface is able to provide a magnetized landing space for receiving and docking with the back face 1915 (FIG. 19) of the MCD. The receiving surface 2010 may use magnets and/or surface or mechanical features in order align and hold the back façade 1915 of the MCD. In particular, the alignment may make effective the magnetic clasping between magnets 2012 and the ferrous tabs 1912. Among other objectives, an embodiment enables a user to simply place the back face 1915 on the receiving surface 2010 in order to make effective the magnetic coupling.

With reference to FIG. 19 and FIG. 20, one or more embodiments provide for the use of an inductive signal path to transfer power and/or data between the two devices. The inductive signal path may be enabled by embedding coils and related components within the back façade 1915 of the MCD and the receiving surface 2010 of the dock. Thus, inductive signal transmission may be enabled through use of magnetic mechanical coupling, as shown and described.

As an alternative or addition, conductive signal transmission may be enabled between the MCD and the dock. In such an embodiment, the use of the conductive signal path is enhanced because the magnet coupling provides an active physical retention force between the surfaces of the two devices.

Figure 21:
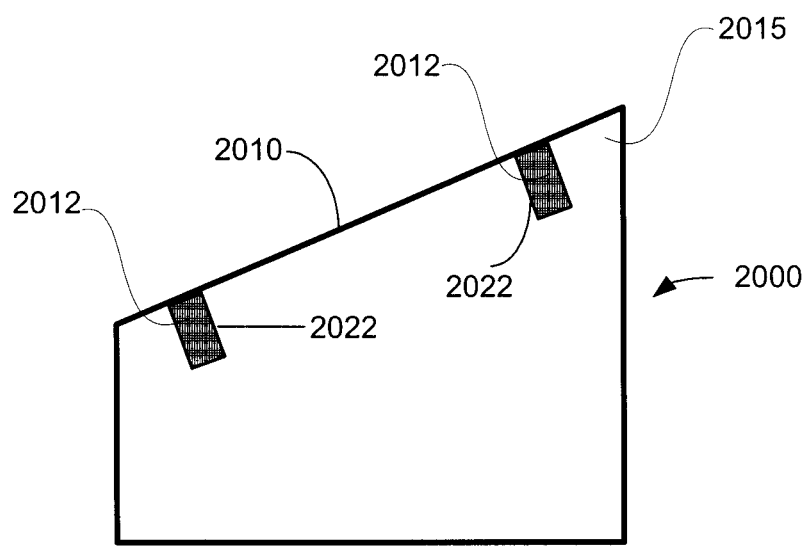
FIG. 21 is a side cross-sectional view of a docking station with magnets for providing a magnetized receiving surface, under an embodiment.

FIG. 21 is a side cross-sectional view of a dock 2000 with magnets 2012 for providing the receiving surface 2010, under an embodiment. The magnets 2012 may be provided in apertures or openings 2022 just under the receiving surface 2010. This enables the receiving surface 2010 to be smooth, while at the same time being able to receive and magnetically retain the MCD when it is dropped on the receiving surface. A body 2015 of the dock 2000 may align the receiving surface 2010 to receive the back face 1915 (FIG. 19) of the MCD. In one implementation, the receiving surface 2010 may be slanted at least partially in a vertical direction, although alternative variations may provide for the receiving surface to be horizontal.

One benefit of using magnetic coupling is that magnets can be distributed to retain the MCD in a manner that enables both (i) multiple coupled orientations (e.g. four positions, eight positions), and (ii) self-alignment of the MCD in one of the multiple possible orientations. In particular, the magnet or ferrous material arrangements may be configured in order to attract the MCD to a particular orientation, and repel it from orientations that are in between attracted positions. Thus, discrete orientations are enabled, and the devices may use magnetic forces to 'self-align'. By enabling the MCD to occupy different orientations when docked, orientation-dependent functionality such as described with embodiments of FIG. 14 and FIG. 15A through FIG. 15C, may be enabled.

With magnetic coupling, alignment of the desired regions on the back face 1915 of the mobile computer and the receiving surface 2010 of the dock 2000 are desirable, because the alignment better or makes effective the magnetic forces to achieve the coupling. Mechanical geometry may be used to achieve desired prevision in alignment when two devices are mated, so that the two mated surfaces are aligned for the magnetic coupling to be effective. While embodiments contemplate non-magnetic, mechanical features for use in aligning and/or supporting the MCD in a docked position with use of magnets, the use of non-magnetic features to facilitate magnetic coupling may have some undesirable results. Specifically, surface features and mechanical retention features to facilitate magnetic alignment may preclude or inhibit the ability of the user to alter the position of the MCD when docked (as desired with, for example, embodiments of FIG. 14). Additionally, surface features and mechanical retention features prevent the receiving surface of the dock from having a smooth and aesthetically appealing surface.

In order to facilitate alignment, it is also possible to use strong magnets on both the receiving surface 2010 and the back face 1915 of the MCD. However, for many applications, the containment of magnets in the MCD is undesirable (e.g. for devices that are carried in pockets of persons). Using magnets on both sides allows magnetic polarity to further restrict the allowable orientations for the placement of the MCD on the dock.

Figure 22:
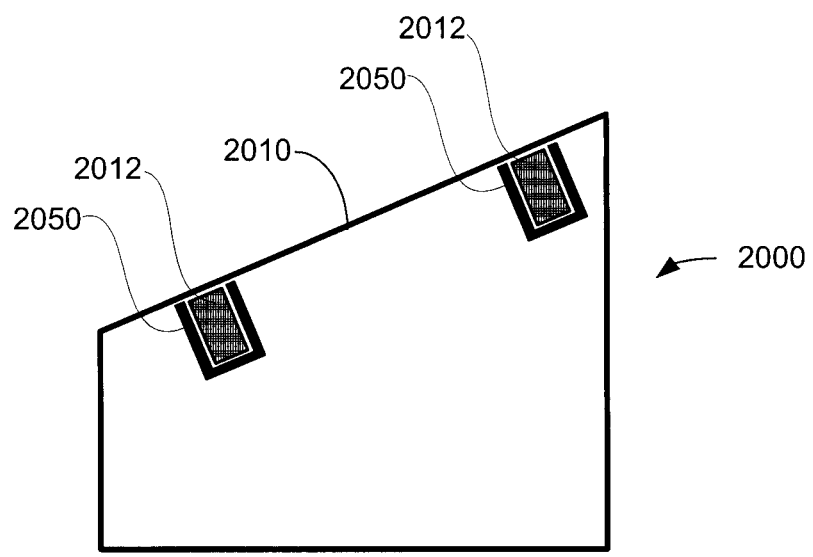
FIG. 22 illustrates one embodiment in which an arrangement of ferrous cups are provided for use with one or more magnets of the docking station, under an embodiment.

As an alternative to surface or mechanical features, or magnets on both mated devices, some embodiments provide for an alternative configuration of magnets and ferrous materials in order to achieve focused and aligned magnetic coupling between the two docked devices. FIG. 22 illustrates one embodiment in which ferrous cups 2050 are provided in connection with the magnets 2012 of the dock 2000, under an embodiment. The ferrous cups 2050 serve to focus the magnetic fields of the magnets 2012. The focused magnetic fields better enable the receiving surface 2010 to align with the back face 1915 of the MCD.

Figure 23:
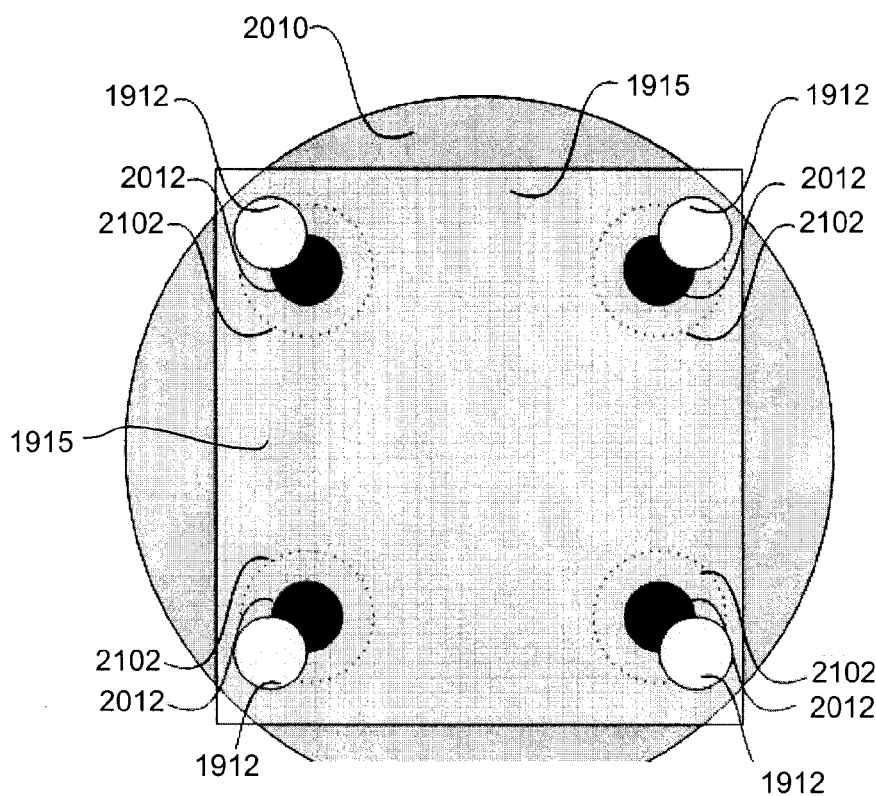
FIG. 23 illustrates an embodiment in which a relative geometry of magnets and tabs may be offset to create a magnetic locking effect between docked devices, according to another embodiment.

FIG. 23 illustrates an embodiment in which a relative geometry of magnets and tabs may be offset to create a magnetic locking effect between docked devices, according to an embodiment. In particular, one or more embodiments recognize that the magnetic fields 2102 where the tabs are attracted to are relatively wide, allowing the tabs 1912 to move in a large area. An embodiment of FIG. 23 illustrates placement of an arrangement of tabs 1912 to have a larger diameter than the four magnets. Such a geometry forces each tab 1912 to only align to the outer portion of the corresponding magnetic field. The result is that the arrangement tightens the alignment and coupling considerably.

Figure 24:
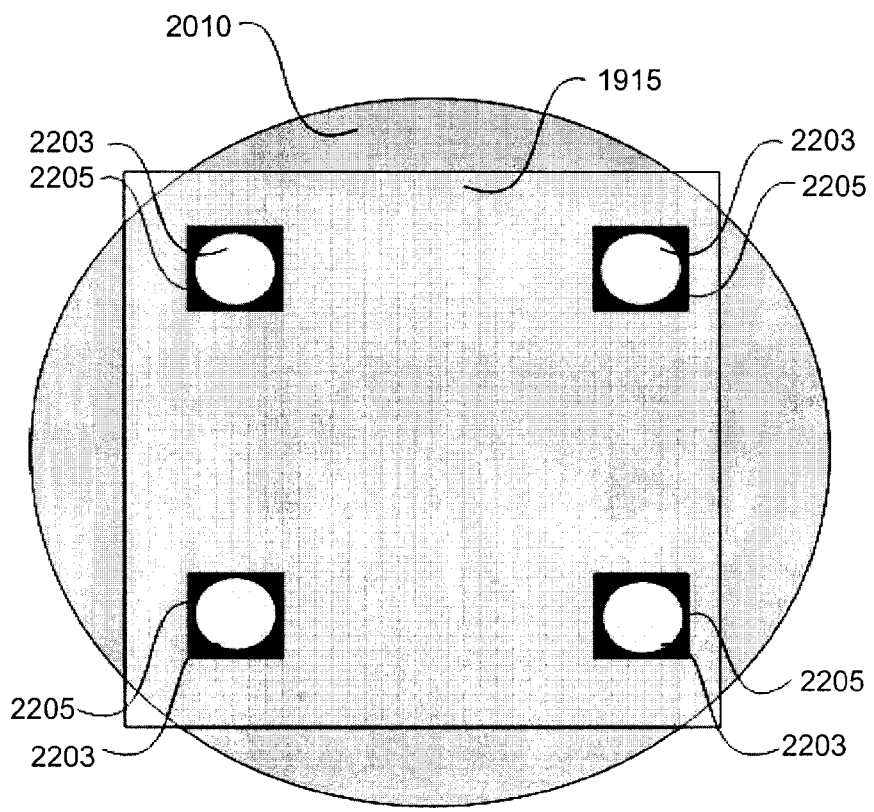
FIG. 24 shows another embodiment in which a square magnet is provided on the receiving surface in order to constrain a slightly smaller round tab, according to another embodiment.

FIG. 24 shows another orientation where a square magnet 2205 is provided on the receiving surface 2010 in order to constrain a slightly smaller round tab 2203 (provided on the back façade 1915). A square magnet may retain a circular tab 2203 more tightly with less permissible movement, as compared to circular magnets and tab configurations.

Figure 25:
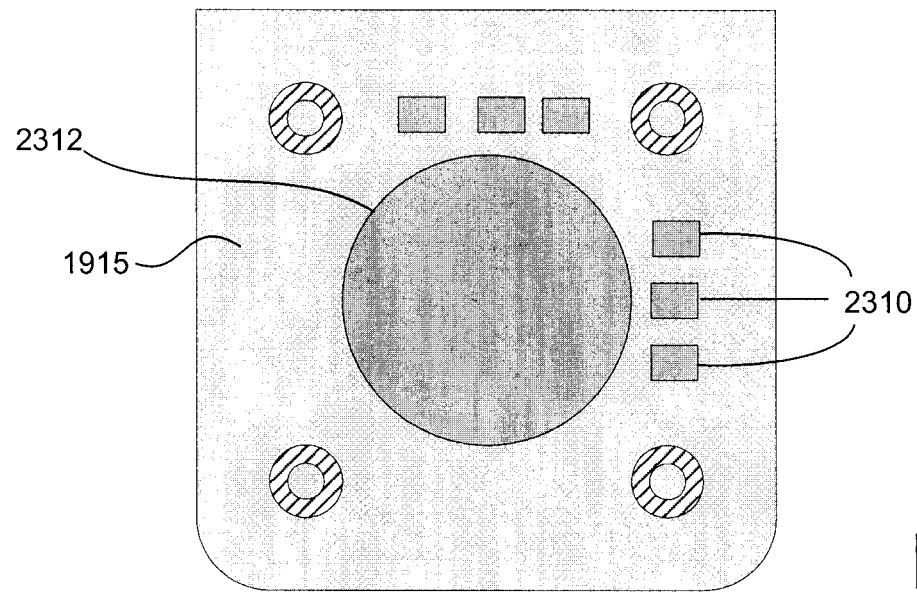
FIG. 25 depicts a façade of the mobile computing device with representative electronic components, according to an embodiment.

FIG. 25 depicts the façade 1915 of the MCD with representative electronic components 2310 and 2312, according to an embodiment. The representative electronic components 2310 and 2312 may be embedded at different layers within a housing of the device (underneath the exposed back façade 1915). The ferrous tabs 1912 (FIG. 23) may be positioned to circumvent the electronic components 2310, 2312.

Figure 26:
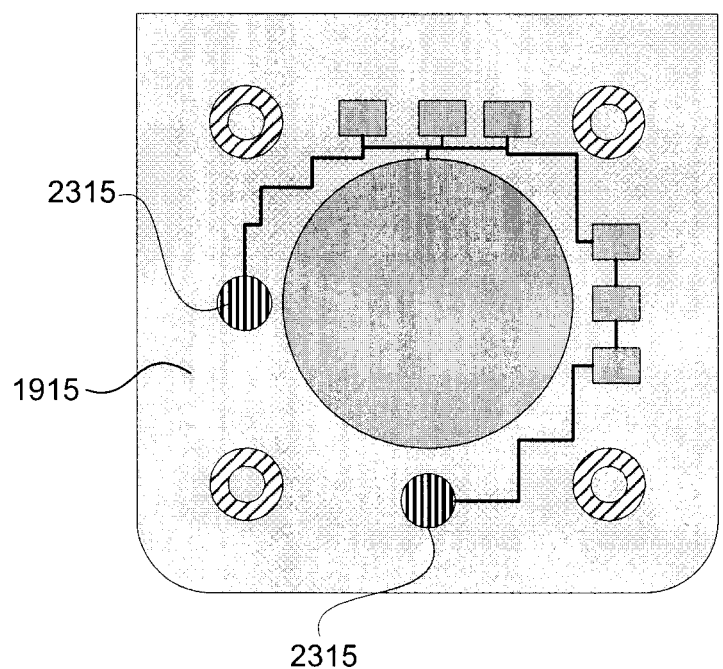
FIG. 26 depicts the back façade of the mobile computing device with an enhancement for device orientation detection.
Figure 27:
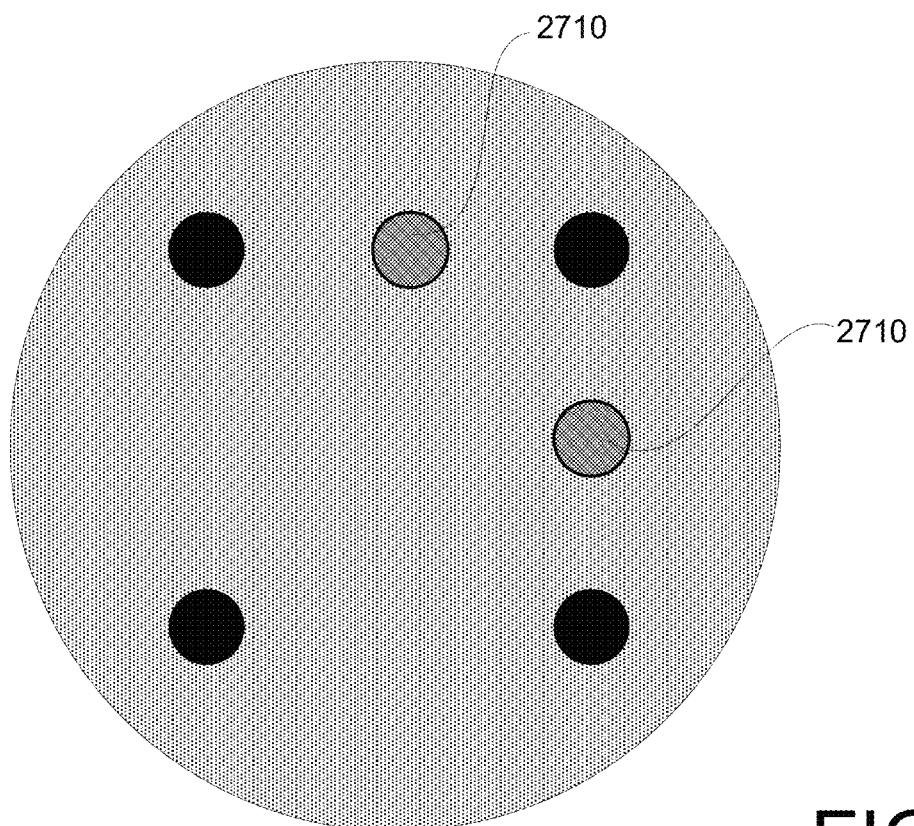
FIG. 27 shows a front façade of a docking station with slugs, according to an embodiment.

FIG. 26 depicts the back façade 1915 of the MCD with an enhancement for device orientation detection. The enhancements may be in the form of sensors 2315, which align with slugs 2710 shown in FIG. 27. Contact or proximity between sensors 2315 and slugs 2710 may be detectable on the sensor or slug, and then used to trigger or signal information that correlates the particular slug 2710 or sensor 2315 that is affected with an orientation. In one embodiment, the alignment of sensors 2315 may correspond to positioning of different sets of slugs 2710. Thus, orientation detection may be provided by detecting which slugs 2710 are aligned with sensors 2315 when the MCD is docked with the dock.

Figure 28:
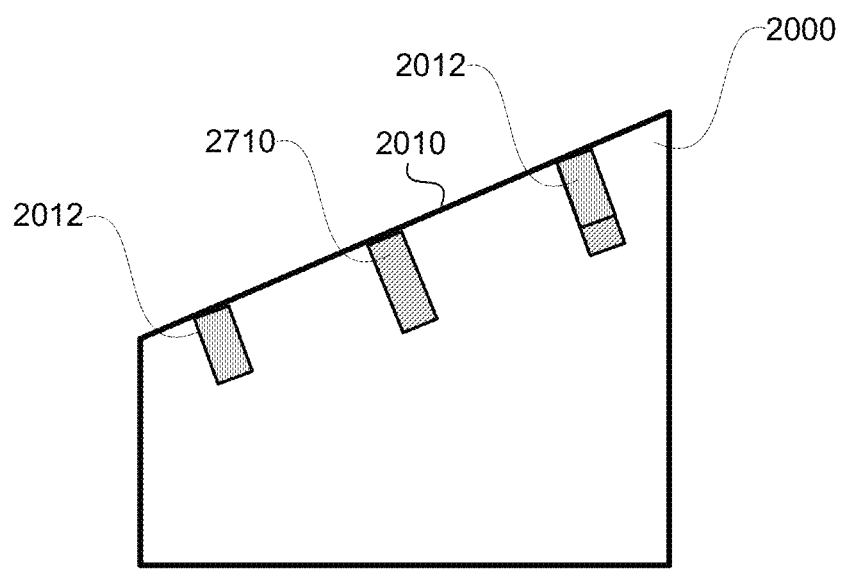
FIG. 28 and FIG. 29 illustrate side views of how a docking station can be configured in positioning a set of slugs with respect to a receiving surface, under an embodiment.
Figure 29:
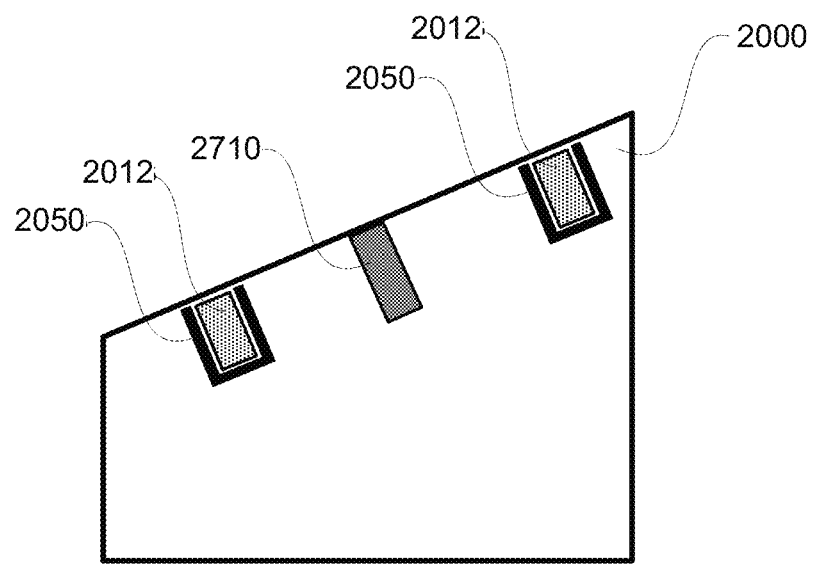

FIG. 28 and FIG. 29 illustrate side views of how the dock 2000 can be configured in positioning the slugs 2710 with respect to the receiving surface 2010. In FIG. 28, a set of slugs 2710 are positioned between magnets 2012. In FIG. 29, the set of slugs 2710 are shown disposed between cups 2050. As explained with an embodiment of FIG. 14, the orientation of the MCD on the dock may be used to implement or select functionality or mode or state of one or both devices.

Magnetic Ring

Figure 30:
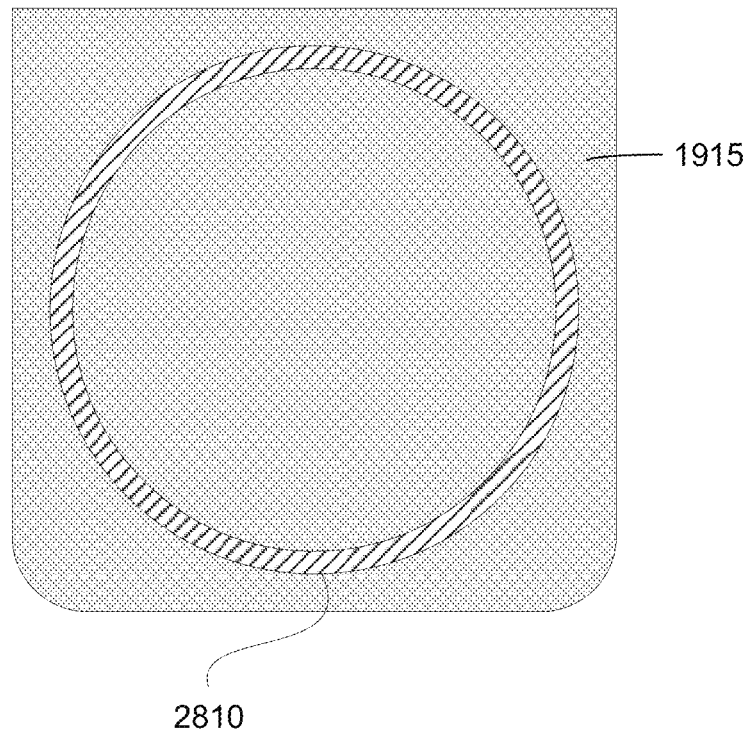
FIG. 30 illustrates a ferrous ring formed into a region of the back façade of a mobile computing device, under an embodiment.

One or more embodiments also provide for use of a ring (e.g. ferrous ring) in order to enable free rotation (not limited to 90 degree) of the MCD to anyone of many possible orientations when the device is docked to the dock. FIG. 30 illustrates a ferrous ring 2810 formed into a region of the back façade 1915 of the MCD. The ferrous ring 2810 may circumvent a substantial region or area on the back façade 1915. Any one of the magnet configurations shown for the dock may be used to enable the MCD to have 'free rotation' when docked onto the receiving surface of the dock. Thus, while some embodiments that utilize magnetic coupling may provide for 2 or 4 positions, an embodiment such as shown with FIG. 28 may enable the MCD to have almost any position defined by the placement of the ring 2810 on the receiving surface of the dock. Moreover, as described with an embodiment of FIG. 14, certain positions of the MCD may have associated therewith a functionality or mode setting. Such functionality or mode setting may be implemented automatically when the device is rotated or placed in the assigned position on the dock 2000. Still further, the ring 2810 enables the user to move the MCD while docked like a dial, without breaking contact with the receiving surface of the dock.

Figure 31:
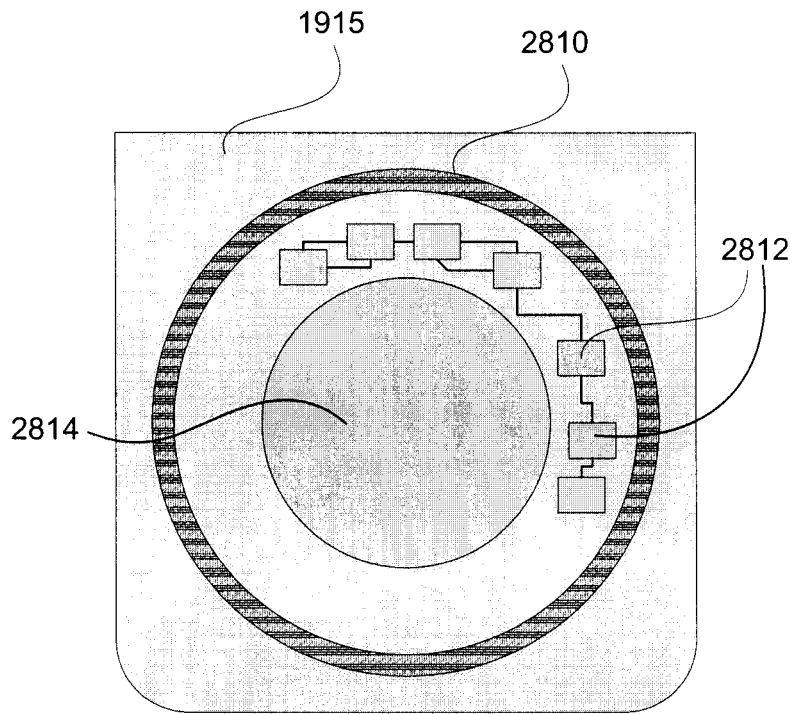
FIG. 31 illustrates a ferrous ring about a back façade of a mobile computing device with one or more other components, under an embodiment.

In FIG. 31, components 2812, 2814 for enabling signal path transmissions (e.g. inductive) for communicating power or data is shown about the ferrous ring 2810 on the back face. The components may be embedded within the housing, so as to be provided beneath the back façade 1915.

Figure 32:
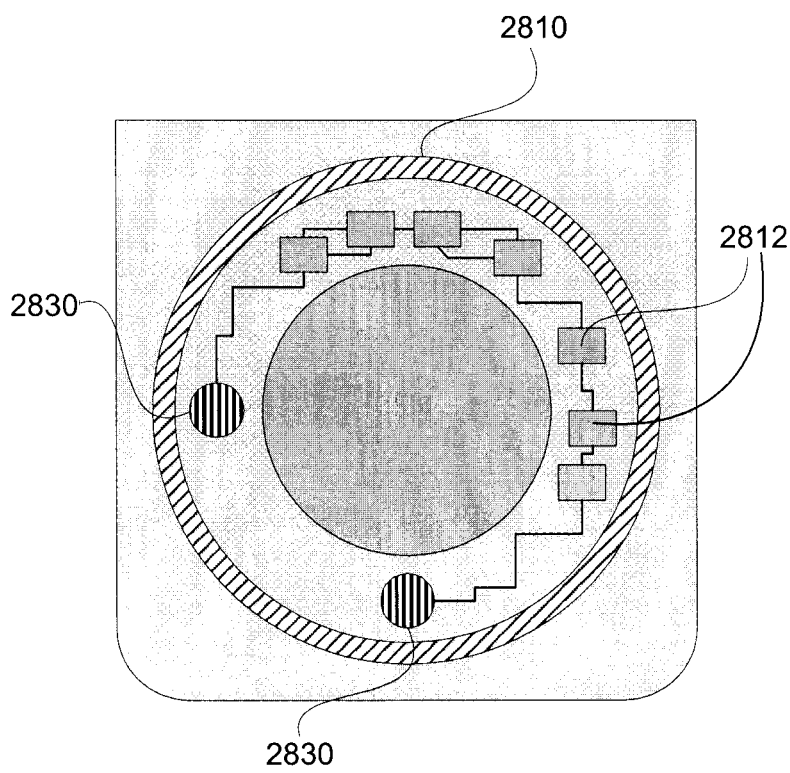
FIG. 32 illustrates a ferrous ring about a back façade of a mobile computing device with one or more other components, including an orientation detector, under an embodiment.

In FIG. 32, orientation or position detection sensors 2830 are shown to be contained in the housing of the MCD. In one embodiment, the sensors shown detect a position of the slugs 2710 (FIG. 27) on the receiving surface 2010 (FIG. 28) of the dock (FIG. 28).

Figure 33:
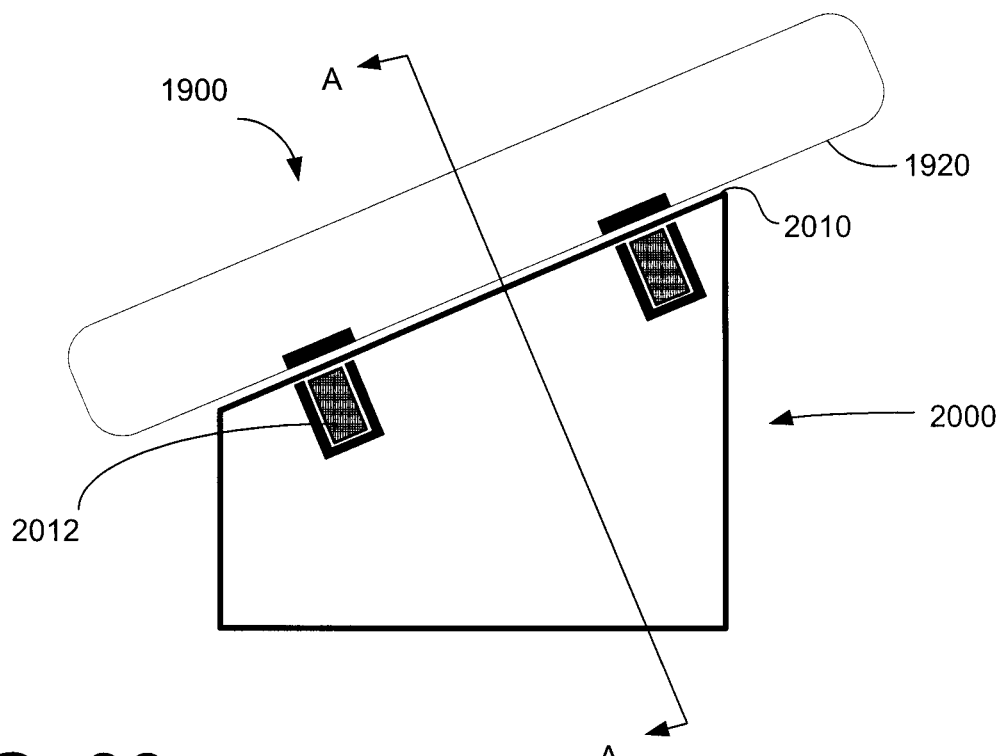
FIG. 33 illustrates a mobile computing device docked onto a docking station (or other device) using magnetic clasping, under an embodiment.

FIG. 33 illustrates a MCD 1900 docked onto the dock 2000 using magnetic clasping, according to one or more embodiments described. In the example provided, the MCD 1900 is assumed to have a portrait orientation, although alternative orientations are possible (e.g. landscape, 45 degrees from vertical, 30 or 60 degrees from vertical), particularly when magnetic clasping is used. In an embodiment shown, the dock 2000 includes using magnets 2012 in anyone of the configurations described to retain the MCD 1900.

Because the housing 1920, of the MCD 1900, attaches to the dock 2000 via magnetic clasping, rather than mechanical latching, the receiving surface 2010 of the housing 1920 may be made relatively smooth. For example, the housing 1920 (and/or the surface of the dock 2000) may be made of a slippery material such as Teflon, PFA, FEP, Acrylic, Dacron, Nylon, PVC, flouropolymers, and/or Rulon. Thus, the user may dock the MCD 1900 by simply dropping the device onto the dock 2000, such that the housing 1920 makes contact with the receiving surface 2010.

Figure 34A:
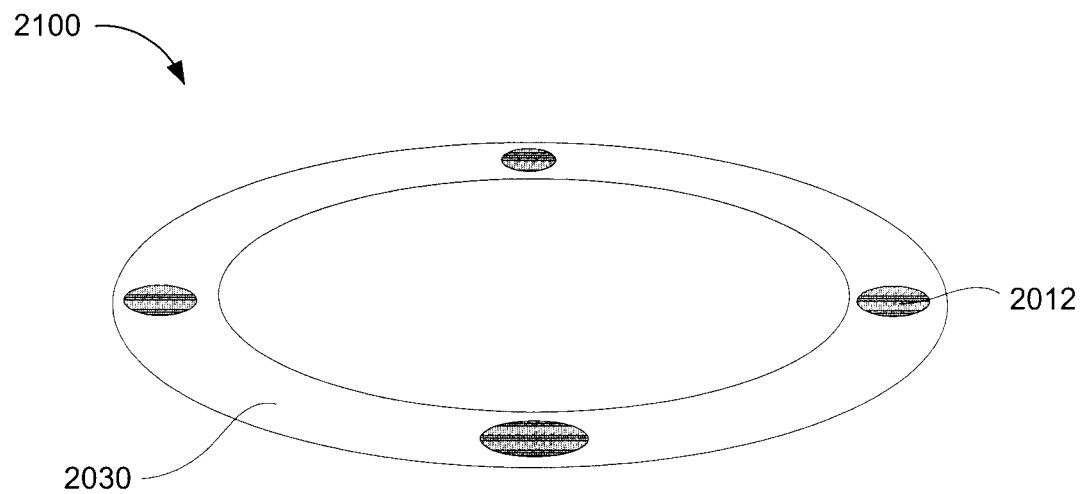
FIG. 34A illustrates a perspective view of a ring interface for a magnetic clasp, according to an embodiment.

FIG. 34A illustrates a perspective view of a ring interface for a magnetic clasp, according to an embodiment. The magnetic clasp 2100 includes four magnets that 2012 are positioned in a circular configuration around a ring 2030. The magnetic clasp 2100 may be implemented on a corresponding dock 2000 (FIG. 33), such that when the housing 1920 (FIG. 33) of a MCD 1900 (FIG. 33) makes contact with the dock 2000, the magnets 2012 "lock on" (i.e., are attracted to) a ferrous ring 2810 (and/or plates) on a housing 1920 of the MCD 1900 to hold the device in place.

While in contact with the dock 2000, the MCD 1900 may be re-oriented to a desired presentation (e.g., either portrait or landscape). For example, the ferrous ring 2810 (FIG. 31) on the housing 1920 may be rotated in a circular manner, over the magnetic clasp 2100, while in constant overlap with the ring 2030 (i.e., while maintaining contact with each of the four magnets 2012). According to an embodiment, the magnetic clasp 2100 may be flush with the receiving surface 2010 (FIG. 33) of the dock 2000. Alternatively, the magnetic clasp 2100 may protrude from the receiving surface 2010 to allow for easier alignment and/or contact with the ferrous ring 2810 of the housing 1920.

Figure 34B:
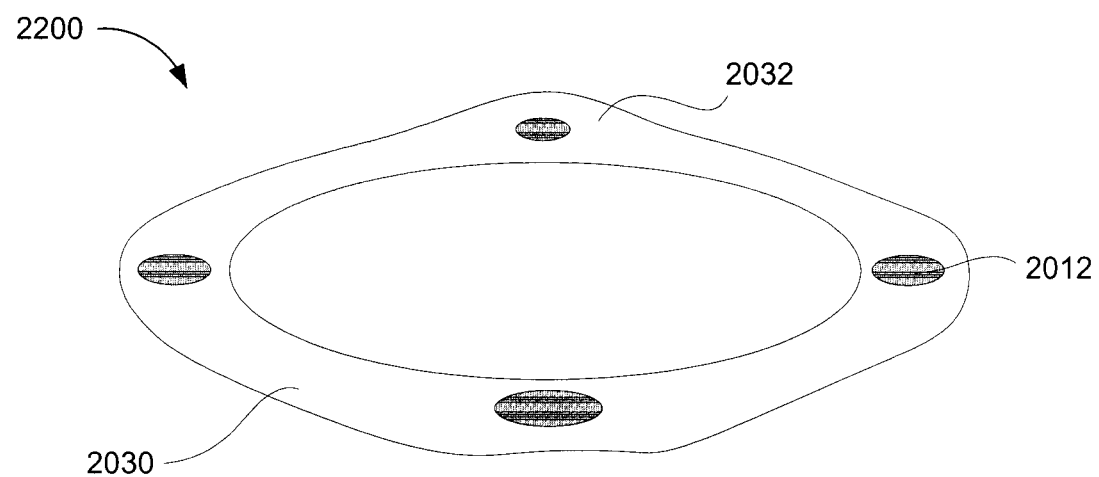
FIG. 34B illustrates a perspective view of a ring interface with mechanically proud areas, according to an embodiment.

FIG. 34B illustrates a perspective view of a ring interface with mechanically proud areas, according to an embodiment. The magnetic clasp 2200 is similar to the magnetic clasp 2100 (FIG. 34A), with the exception that the ring 2030 includes four mechanically "proud" regions 2032, surrounding each of the four magnets 2012. These proud regions 2032 provide a larger surface area for which the housing 1920 (FIG. 33) of the MCD 1900 (FIG. 33) may make contact with the magnets 2012. In addition, the ratchet-like design of the magnetic clasp 2200 may be useful in orienting or positioning the MCD 1900 relative to the dock 2000 (FIG. 33).

In the embodiments shown in FIGS. 34A and 34B, the four magnets 2012 are positioned equidistant to one another, in a "diamond" (or "square") formation. However, the spacing and/or positioning of the magnets 2012 may vary depending on device configuration. For example, in alternative embodiments, any of the following geometric configurations may be used: (i) with one magnet in each of the upper left, upper right, lower left, and lower right orientations; (ii) in a trapezoidal formation; and (iii) with a combination of two magnets (positioned 180 degrees apart) and four magnetic tabs spaced evenly around the ring 2030.

When docked, one or more embodiments provide for conveyance of power signals from the dock to the MCD 1900 through use of conductive or inductive signal paths, such as described with other embodiments. In addition to the power signals, one or more embodiments provide for conveyance of data concurrently with or through use of the power signal. Still further, in the docked position (and shortly thereafter), the MCD 1900 and the dock 2000 may communicate data using a local wireless communication link.

Figure 35:
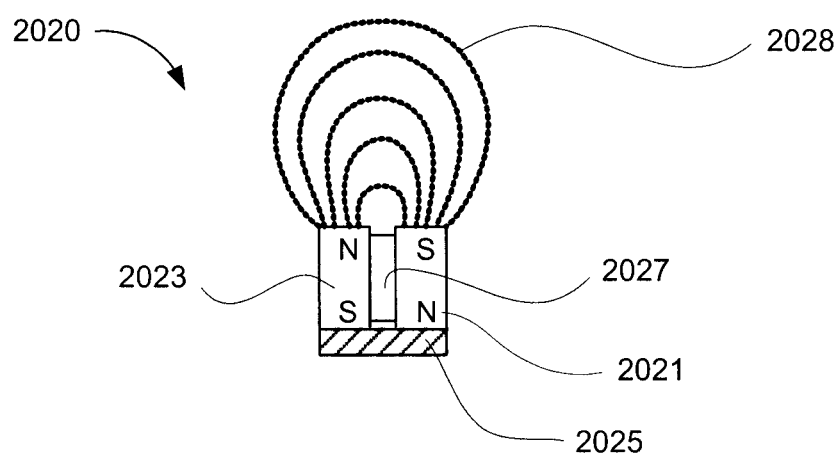
FIG. 35 illustrates an embodiment of a magnetic element which may be used for the magnetic clasping as described in any of the above embodiments

FIG. 35 illustrates an embodiment of a magnetic element which may be used for the magnetic clasping as described in any of the above embodiments. The magnetic element 2020 is made up of two bar magnets, 2021 and 2023, provided on top of a base layer 2025. The base layer may be constructed of a low reluctance material, to allow high magnetic permeability. The bar magnets 2021 and 2023 are separated by a non-magnetic spacer 2027, and are arranged in parallel with opposite polarities facing up. For example, the magnet 2021 is oriented with its "north" pole facing the base layer 2025, and its "south" pole facing upward. In contrast, the magnet 2023 is oriented with its "south" pole facing the base layer 2025, and its "north" pole facing upward. Thus, the magnetic element 2020 effectively functions as a "horseshoe" (or U-shaped) magnet. In certain embodiments, one of the bar magnets 2021 or 2023 may be longer (or shorter) than the other.

The magnetic element 2020 may correspond to, and therefore perform the functions of, any of the magnets 2012 in the embodiments described above. As described in greater detail below, the magnetic properties of the magnetic element 2020 provide several advantages when magnetically clasping a MCD 1900 to a dock 2000. For example, the pairing of two bar magnets in parallel yields a much stronger magnetic attraction (e.g., double the magnetic force of a single bar magnet).

The horseshoe configuration further allows for the magnetic field 2028, emanating from the magnetic element 2020, to be more locally concentrated (i.e., towards the top of the magnetic element 2020). Reducing the overall spread of the magnetic field 2028 may, in turn, mitigate the occurrence and/or effects of magnetic interference in the dock 2000 and the MCD 1900.

For example, magnetic fields produced by the magnets 2012 may induce undesired currents in the electrical components of the MCD 1900 and/or the dock 2000. This issue may be further complicated during communications between the MCD 1900 and the dock 2000, especially when the dock 2000 inductively communicates with the MCD 1900. Because such communications depend on inducing an electromotive force (EMF), changes in the induced EMF (e.g., caused by magnetic fields from the magnets 2012) may alter or adversely affect the data being communicated. Localizing the magnetic field 2028 produced by the magnets 2012 may thus allow for more robust communications between the MCD 1900 and the dock 2000.

It should be noted that, in certain embodiments described herein, the horseshoe magnet assembly 2020 may be substituted for an "actual" horseshoe magnet. The actual horseshoe magnet may be unitarily constructed from a single piece of magnetized material. For example, the actual horseshoe magnet may correspond to a single bar magnet that is bent or formed into the U-shape configuration.

Figure 36:
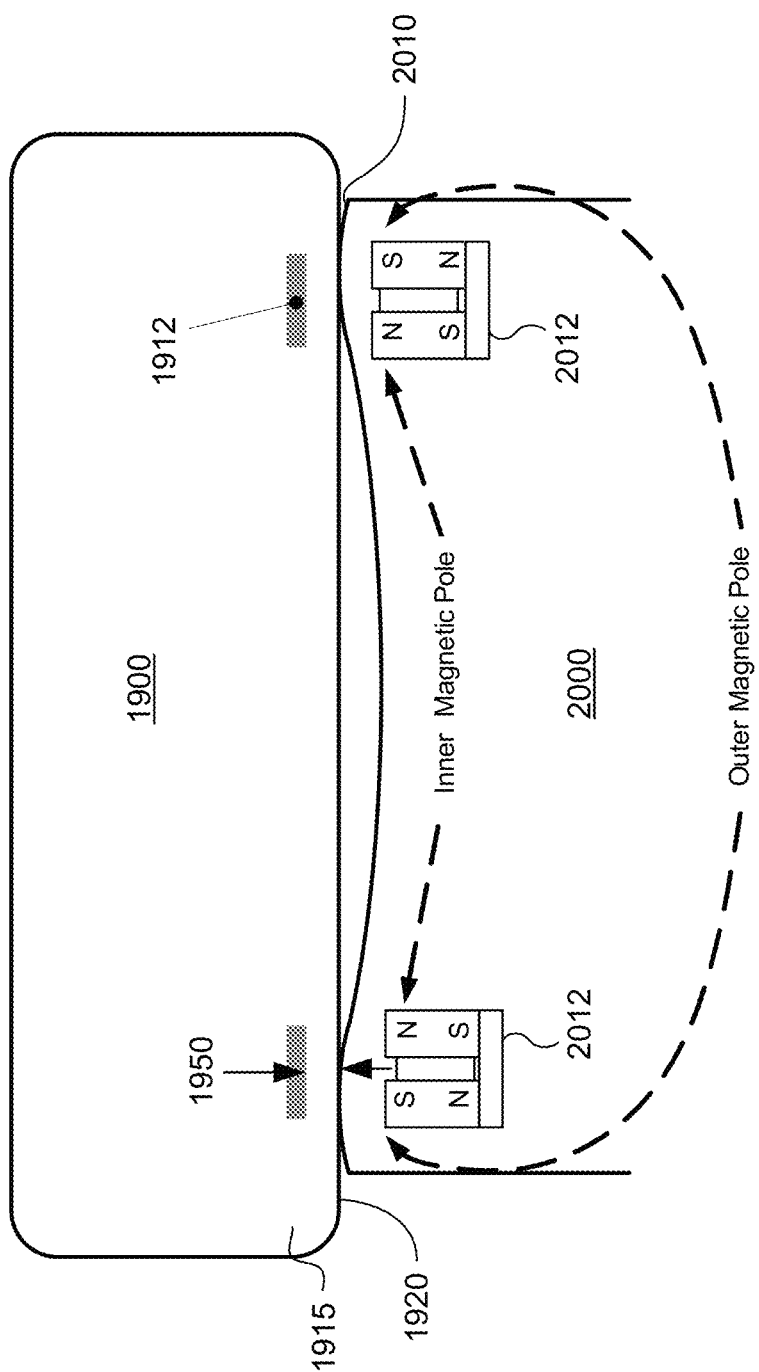
FIG. 36 illustrates a cross-sectional view of another embodiment in which a mobile computing device is docked to a docking station or other device through use of magnetic clasping.

FIG. 36 illustrates a cross-sectional view of the dock 2000 and MCD 1900 along lines A-A See FIG. 33, according to one or more embodiments. The dock 2000 may include magnets 2012 that have a horseshoe or U-shape configuration, for example, as described above in reference to FIG. 35. In alternative embodiments, the horseshoe magnet assemblies 2012 may be substituted for actual horseshoe magnets.

In the particular arrangement shown, the inner magnetic poles of the magnets 2012 have the same polarity, and the outer magnetic poles of the magnets 2012 have the same polarity. For example, the magnets 2012 are configured such that each of the inner bar magnets are oriented with their north poles facing upward, and each of the outer bar magnets are oriented with their south poles facing upward. Alternatively, the inner bar magnets may be oriented such that their south poles face upward, and the outer bar magnets may be oriented such that their north poles face upward.

The configurations for the embodiments described, with respect to FIG. 36, have several advantages. For example, the horseshoe configurations of the magnets 2012 provide a very strong attractive force (e.g., double the magnetic force of a single bar magnet). Thus, the ferrous tabs 1912 may be set further from a surface of the housing 1920, to allow a substantial gap 1950 between the ferrous tabs 1912 and the receiving surface 2010 of the dock 2000 when a surface of the housing 1920 is brought into contact with the receiving surface 2010 of the dock 2000.

The deeper placement of the ferrous tabs 1912 may allow for more versatility in the overall design and construction of the housing 1920 and/or the MCD 1900. For example, the ferrous tabs 1912 may be substantially hidden (or "invisible") when viewed from the outside of the housing 1920. Furthermore, the surface of the housing 1920 may be constructed to be substantially uniform and/or flush with an outer façade of the MCD 1900.

Additionally, configuring the magnets 2012 such that their inner magnetic poles are all of the same polarity results in a lower DC magnetic flux through the center of the device. For example, if the magnets 2012 were arranged such that the inner magnetic poles have opposite polarities (e.g., one with north facing up and the other with south facing up), then a magnetic field would be created across the center of the dock 2000, from one of the magnets 2012 to the other. As described above, the magnetic flux through the center of the device could have an adverse effect on other circuitry within in the dock 2000 and/or the MCD 1900. Thus, the arrangement of magnets 2012, in the current embodiment, provide for more robust communications within (and between) the dock 2000 and/or the MCD 1900.

In alternative embodiments, the horseshoe magnet assemblies (or actual horseshoe magnets) may be implemented on both the dock 2000 and the the MCD 1900 (e.g., in lieu of ferrous tabs). In addition to the advantages already described above, with respect to FIG. 36, such embodiments provide for a much stronger magnetic coupling between the dock 2000 and the MCD 1900. Accordingly, this allows the corresponding magnets in the dock 2000 and the MCD 1900 to be set even further apart (i.e., further from the surfaces of their respective housings) while continuing to maintain a relatively strong magnetic association with one another.

As still another addition or alternative such as shown with FIG. 34, the receiving surface 2010 may be contoured inward. The back face 1915 of the MCD 1900 may include ferrous tabs 1912 that align with horse-shoe magnets. The result may include a magnetic coupling such as described with any of the embodiments provided herein.

Sticky-Back Accessory Device

Figure 37:
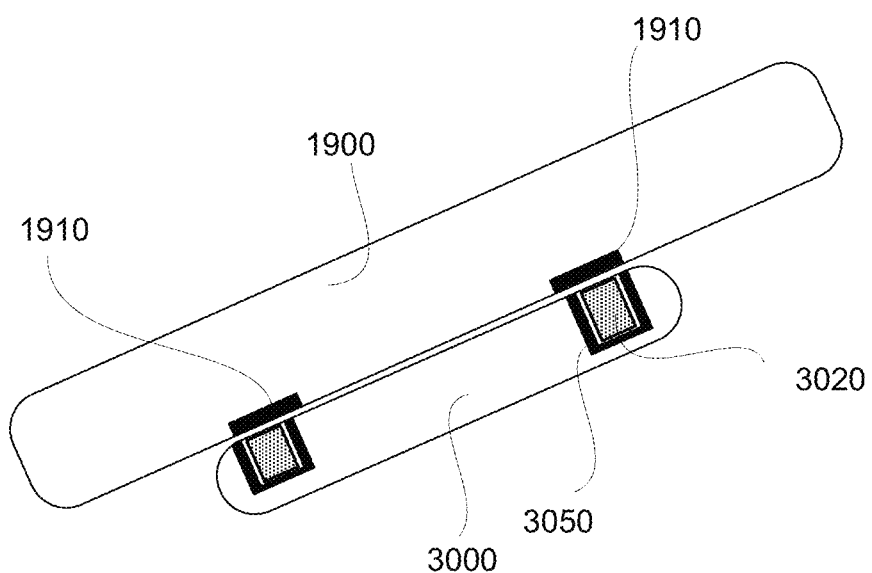
FIG. 37 illustrates an embodiment in which a mobile computing device magnetically couples to a sticky-back accessory device other than a docking station, under another embodiment of the invention.

While numerous embodiments described above provide for the dock to serve as a base for the MCD, FIG. 37 illustrates an embodiment in which the MCD 1900 may couple to a sticky-back accessory device 3000. In an implementation shown, magnetic cups 3050 may contain magnets 3020 on or near a mating surface of the accessory device 3000. For example, the magnets 3020 may correspond to horseshoe magnet assemblies (or actual horseshoe magnets), as described in any of the above embodiments. As with other embodiments, tabs 1910 may be provided on the façade (e.g., housing 1920) of the MCD 1900. Such a device may magnetically clamp to the back side of the MCD 1900 and thus function as a portable accessory for use with the MCD 1900. Functionality and features described with any of the embodiments above may apply to the construction and use of the accessory device 3000.

Additions and Alternatives

Numerous embodiments described above depict a docking station that is rested on a table-top or ground. However, embodiments further contemplate that a docking station in accordance with one or more embodiments may be structured to mount to vertical environments, such as walls or windshields of automobiles. According to an embodiment, a docking station or accessory device may include suction cups or similar structures to enable the docking station to retain to the vertical surface. In order to receive and retain a mobile computing device, one or more embodiments provide that the accessory device includes magnets, such as described in sections provided above, to magnetically attract to ferrous or like material in the mobile computing device. In such an embodiment, the mobile computing device may occupy anyone of many possible orientations, and remain docked through use of relatively strong magnetic forces.

While the magnetic clasping mechanism in the embodiments above have been described with reference to permanent magnets, alternative embodiments contemplate the use of electromagnets. For example, electromagnets may be manually turned on and off to enable magnetic clasping between the dock and the MCD only when desired. This may help prevent undesired ferrous/metallic material from being attracted to the dock and/or MCD at random times. Additionally, turning off the electromagnets may also help reduce magnetic interference with circuitry in either the dock and/or the MCD while in an uncoupled state.

In a further embodiment, proximity sensors may be provided in the MCD and/or the dock to detect a proximity (or nearness) of the MCD to the dock. For example, the proximity sensors may be configured to automatically (or programmatically) activate the electromagnets in the dock and/or MCD only upon determining that the housing surface of the MCD is within a specified range of the receiving surface of the dock.

While reference is made in numerous embodiments described herein to docking stations, other devices may be used to couple or mate with an mobile computing device in accordance with any of the embodiments described herein. For example, modules that carry functionality for enabling keyboard or inputs, cameras or image capturing (e.g. video), GPS, or modems may be provided in housings that can be coupled to the MCD via a sticky-back configuration, such as shown in FIG. 35. Such embodiments may use magnetic clasping to hold the two devices together. As an alternative or addition, such embodiments may use signal conduction (e.g. see FIG. 1), inductive signal transfer (power or data) and/or orientation detection in a manner described above. Numerous other variations or also possible.

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A system comprising:
a mobile computing device;
an accessory device having a receiving surface to magnetically couple to the mobile computing device; and
wherein at least one of the mobile computing device or the accessory device includes a plurality of magnetic components configured to retain the other of the mobile computing device or the accessory device, the plurality of magnetic components being arranged in a manner which reduces magnetic flux through a center of the mobile computing device;

wherein the plurality of magnetic components includes at least one horseshoe magnet assembly comprising:
a first bar magnet and a second bar magnet coupled in parallel;
a non-magnetic spacer element coupled between the first and second bar magnets; and
a base layer coupled to a first pole of each of the first and second bar magnets, wherein the first pole of the first bar magnet is opposite in polarity than the first pole of the second bar magnet.

2. The system of claim 1, wherein either the first or second bar magnets is longer than the other.

3. The system of claim 1, wherein the receiving surface is configured to magnetically couple to a housing element of the mobile computing device.

4. The system of claim 3, wherein the housing element at least partially forms a façade of the mobile computing device, and is removably coupled to the mobile computing device.

5. The system of claim 4, wherein a surface of the housing element is substantially flush or uniform in appearance.

6. The system of claim 1, wherein only one of the mobile computing device or accessory device includes the plurality of magnetic components, and wherein the other of the mobile computing device or accessory device has material that is attracted to the plurality of magnetic components.

7. The system of claim 6, wherein the accessory device includes the plurality of magnetic components, and wherein the at least one horseshoe magnet assembly is provided a distance below the receiving surface of the accessory device.

8. The system of claim 6, wherein the plurality of magnetic components comprises a plurality of horseshoe magnet assemblies arranged in a circular configuration.

9. The system of claim 8, wherein the receiving surface includes a plurality of proud regions surrounding the plurality of horseshoe magnet assemblies, respectively.

10. A system comprising:
a mobile computing device comprising one or more electronic components;
an accessory device having (i) a receiving surface to magnetically couple to the mobile computing device and (ii) circuitry to communicate with the one or more electronic components of the mobile computing device when magnetically coupled; and
wherein the accessory device includes a plurality of magnetic components configured to retain the mobile computing device while reducing magnetic interference, from the magnetic component, during communications between the mobile computing device and the accessory device, the plurality of magnetic components being arranged in a manner which reduces magnetic flux through a center of the mobile computing device;
wherein the plurality of magnetic components includes at least one horseshoe magnet assembly comprising:
a first bar magnet and a second bar magnet coupled in parallel;
a non-magnetic spacer element coupled between the first and second bar magnets; and
a base layer coupled to a first pole of each of the first and second bar magnets, wherein the first pole of the first bar magnet is opposite in polarity than the first pole of the second bar magnet.

11. The system of claim 10, wherein the plurality of magnetic components are arranged to circumvent the circuitry.

12. The system of claim 10, wherein either the first or second bar magnets is longer than the other.

13. The system of claim 10, wherein each of the plurality of magnetic components is a horseshoe magnet assembly, and wherein the horseshoe magnet assemblies are arranged in a circular configuration.

14. The system of claim 10, wherein the receiving surface is configured to magnetically couple to a housing element of the mobile computing device.

15. The system of claim 14, wherein the housing element at least partially forms a façade of the mobile computing device, and is removably coupled to the mobile computing device.

16. The system of claim 14, wherein the plurality of magnetic components comprises one or more electromagnets.

17. The system of claim 16, wherein the accessory device further comprises a proximity sensor coupled to the one or more electromagnets, the proximity sensor being configured to:
detect a proximity of the housing element of the mobile computing device to the receiving surface of the accessory device; and
control the one or more electromagnets based, at least in part, on the detected proximity.

18. The system of claim 17, wherein the proximity sensor is further configured to activate the one or more electromagnets upon determining that the housing element is within a first range of the receiving surface.

19. The system of claim 17, wherein the proximity sensor is further configured to deactivate the one or more electromagnets upon determining that the housing element is beyond a second range of the receiving surface.

20. The system of claim 10, wherein the mobile computing device is configured to inductively transmit or receive at least one of a power or data signal, and wherein the circuitry to communicate with the mobile computing device includes circuitry to inductively communicate with the mobile computing device in order to transmit or receive the at least one power or data signal.

21. A system comprising:
a mobile computing device;
an accessory device having a receiving surface; and
wherein at least one of the mobile computing device or accessory device includes one or more electromagnets to selectively retain the other of the mobile computing device or accessory device in one or more orientations, the plurality of electromagnets being arranged in a manner which reduces magnetic flux through a center of the mobile computing device;
wherein the plurality of electromagnets includes at least one horseshoe magnet assembly comprising:
a first bar magnet and a second bar magnet coupled in parallel;
a non-magnetic spacer element coupled between the first and second bar magnets; and
a base layer coupled to a first pole of each of the first and second bar magnets, wherein the first pole of the first bar magnet is opposite in polarity than the first pole of the second bar magnet.

22. The system of claim 21, wherein the at least one of the mobile computing device or the accessory device that includes the one or more electromagnets further comprises a proximity sensor coupled to the one or more electromagnets, the proximity sensor being configured to:
detect a proximity of the mobile computing device to the receiving surface of the accessory device; and control the one or more electromagnets based, at least in part, on the detected proximity.

23. The system of claim 22, wherein the proximity sensor is further configured to activate the one or more electromagnets upon determining that the housing element is within a first range of the receiving surface.

24. The system of claim 22, wherein the proximity sensor is further configured to deactivate the one or more electromagnets upon determining that the housing element is beyond a second range of the receiving surface.

* * * * *